United States Patent
Richman et al.

(10) Patent No.: US 6,631,384 B1
(45) Date of Patent: Oct. 7, 2003

(54) INFORMATION SYSTEM AND METHOD USING ANALYSIS BASED ON OBJECT-CENTRIC LONGITUDINAL DATA

(75) Inventors: Alex Richman, Halifax (CA); Elliott M. Richman, Hailfax (CA); Mark Hudak, Halifax (CA)

(73) Assignee: Algoplus Consulting Limited, Halifax (CA)

( * ) Notice: Subject to any disclaimer, the term of this patent is extended or adjusted under 35 U.S.C. 154(b) by 176 days.

(21) Appl. No.: 09/654,911

(22) Filed: Sep. 5, 2000

(51) Int. Cl.[7] .............................................. G06F 17/30
(52) U.S. Cl. ................................................... 707/104.1
(58) Field of Search ........................... 707/1, 10, 104.1, 707/102, 500, 513; 303/126; 342/29; 600/300; 701/29, 120, 123; 705/2, 3

(56) References Cited

U.S. PATENT DOCUMENTS

| | | | | |
|---|---|---|---|---|
| 5,734,888 A | | 3/1998 | Li et al. ..................... 324/765 |
| 5,987,474 A | * | 11/1999 | Sandifer .................. 707/104.1 |
| 6,209,004 B1 | * | 3/2001 | Taylor ......................... 707/500 |
| 6,219,674 B1 | * | 4/2001 | Classen ........................ 600/300 |
| 6,278,396 B1 | * | 8/2001 | Tran ............................. 342/29 |

FOREIGN PATENT DOCUMENTS

| | | |
|---|---|---|
| GB | 2 301 685 A | 12/1996 |
| WO | WO 98 12669 A | 3/1998 |

OTHER PUBLICATIONS

General Accoutning Office. *Aviation Safety: FAA's New Inspection System Offers Promise, but Problems Need to be Addressed.* GAO/CED–99–183, Jun. 1999.

General Accounting Office. *Aviation Safety: Progress on FAA Safety Indicators Program Slow and Challengers remain.* GAO/IMTEC–92–57, Aug. 1992.

General Accounting Office. *Aviation Safety: Changes Needed in FAA's Service Difficulty Reporting Program.* GAO Report GAO.RCED–91–24, Mar. 1991.

General Accounting Office. *Aviation Safety: Data Problems Threaten FAA Strides on Safety Analysis System.* GAO Report GAO.AIMD–95–27, Feb. 1995.

*Register of Commercial Transport Jet Aircraft*, Matthew Austin, M.E., 1992 Locomotive Publishers, Honolulu, Hawaii.

(List continued on next page.)

*Primary Examiner*—Diane D. Mizrahi
*Assistant Examiner*—Apu M Mofiz
(74) *Attorney, Agent, or Firm*—Cassan Maclean

(57) ABSTRACT

A computerized information system and method using object-centric virtual database(s) and analyses advantageously suited to transportation safety applications, such as for the aviation industry (in which case aircraft may be the unit of observation i.e. the object class, and the individual object is an individual aircraft), as well as for health and other safety monitoring applications. A database comprises at least one set of data records, each data record pertaining to an event for an individual object and comprising a plurality of data fields, at least one of the data fields comprising an identifier identifying one individual object. A user interface component receives user-selected criteria for field values of the data fields and a selection component selects those data records which correspond to the user-selected criteria. An analysis component identifies the selected data records according to a chronological sequence of events for individual objects covered by the selected data records, whereby each individual object covered by the selected data records is associated with a longitudinal set of data records, and derives output data for the events from the longitudinal sets of data records.

15 Claims, 31 Drawing Sheets

OTHER PUBLICATIONS

*SDR Trend Monitoring Shows Potential for Future data Evaluation Feed–Back*, 3&4, 1998, Transport Canada, Ottawa.

Canadian Epidemiology Research Conference—1989, *Proceedings of the Record Linkage Sessions & Workshop*, Ottawa, Ontario, Canada, Aug. 1989.

*Aviation Quantitative Reports on Safety: Quantifying Aviation Safety*, AlgoPlus Consulting Limited, vol. 1, Nos. 1 to 11 from Apr. 15, 1997 to Oct. 1998.

Editorials: *Same information, different decisions: format counts* BMJ—Wyatt 318 (7197): 1501 Jeremy Wyatt, School of Public Policy, Univeristy College London, London, Jun. 4, 1999.

The Global Aviation Information Network (GAIN)—*USing Information Proactively to Improve Aviation Safety*, U.S. Federal Aviation Administration Office of System Safety, May 2000.

Kanafani A., Keeler T., Shathisan S.: "Airline safety posture: Evidence from Service Difficulty Reports" Journal of transportation engineering, vol. 119, No. 4, 1993.

Shooman M L: "Avionics software problem occurrence rates" SOFTWARE RELIABILITY ENGINEERING, 1996, PROCEEDINGS., SEVENTH INTERNATIONAL SYMPOSIUM ON WHITE PLAINS, NY, USA Oct. 30–Nov. 1996, LOS ALAMITOS, CA, USA, IEEE COMPUT. SOC., US, Oct. 30, 1996.

\* cited by examiner

NOTES FOR FIGURES 4A - 4D INCLUSIVE

NOTE 1   SDRLIM = TRUE => LOOK AT SDRS ONLY IN FIRST TIME PERIOD WHEN TESTING FOR USER SPECIFIED VALUES OF FIELDS (AS PER NOTE 6 BELOW)

SDRLIM = FALSE => LOOK AT ALL SDRS WHEN TESTING FOR USER SPECIFIED VALUES OF FIELDS (AS PER NOTE 5 BELOW)

NOTE 2   $1 <= X <= 5$   TIME PERIODS
FIVE TIME PERIODS ARE USED FOR THIS EXAMPLE BUT THIS NUMBER CAN EASILY BE CHANGED.

NOTE 3   SDRBEFAFT ALLOWS USER TO LOOK AT A "SUBPERIOD" OF FIRST TIME PERIOD BY

A)   SKIPPING SKIP1 DAYS AFTER SDRLIM1 AND LOOKING FOR SDRS FOR SKIP DAYS AFTER THAT POINT

OR

B)   SKIPPING SKIP1 DAYS BEFORE SDRLIMN AND LOOKING FOR SDRS FOR SKIPN DAYS BEFORE THAT POINT

OR

C)   SKIP1 & SKIPN ARE USER DEFINED

NOTE 4   OTHER USER CRITERIA MAY BE INSERTED HERE IF DESIRED

NOTE 5   SPECIFIC FIELD = OTHER, ALTERNATE, TYPE, NATURE OF CONDITION, PRECAUTIONARY PROCEDURE, SEVERITY, STAGE OF OPERATION, ATA 2 CHAR CODE AND 4 CHAR CODE

NOTE 6   CURRENT TEST INVOLVES CHECKING IF AC HAS ANY SDR WITH USER SPECIFIED VALUES OF FIELDS (AS PER NOTE 5 ABOVE)

IF DESIRED, THIS COULD BE MODIFIED TO REQUIRE A MINIMUM AND 10 MAXIMUM # SDRS WITH USER SPECIFIED VALUES OF FIELDS (AS PER NOTE 5 ABOVE)

FIG. 4E

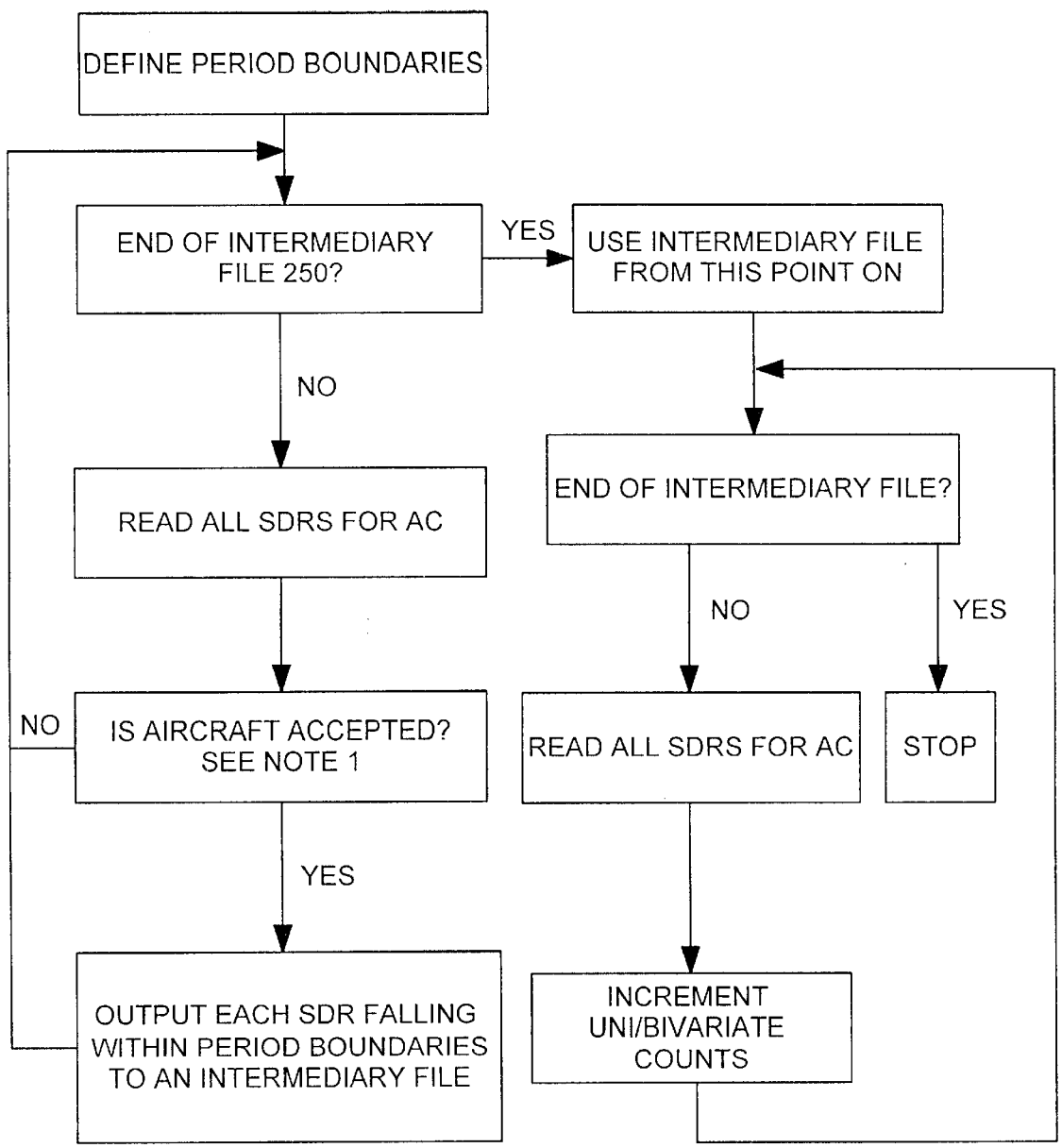

NOTE 1
-ALL AIRCRAFT IN THE STANDARD PERIOD ARE ACCEPTED.
-ALL AIRCRAFT IN COMPARISON PERIOD ARE ACCEPTED.
-AN AIRCRAFT IN AN "ALL" COMPARISON PERIOD IS ACCEPTED IF IT IS ALSO SEEN IN THE STANDARD PERIOD
-AN AIRCRAFT IN AN 'EXCEPTIONAL' COMPARISON PERIOD IS ACCEPTED IF IT IS IS AN EXCEPTIONAL AIRCRAFT SEEN IN THE STANDARD PERIOD
-ALL AC'S IN MOVING AVERAGE ARE ACCEPTED

FIG. 6A

*IF AN AIRCRAFT IN THE EXTRA COMPARISON PERIOD IS NOT ALSO AN AIRCRAFT SEEN IN THE STANDARD PERIOD, IT IS NOT ANALYZED.
**IF AN AIRCRAFT IN THE EXTRA COMPARISON PERIOD IS NOT ALSO AN EXCEPTIONAL AIRCRAFT SEEN IN THE STANDARD PERIOD, IT IS NOT ANALYZED.

FORMING MOVING AVERAGES FROM COMPARISON PERIODS

| CP1 | CP2 | CP3 | CP4 | CP5 | CP6 | CP7 |

MA1 = CP1, 2, 3

MA2 = CP2, 3, 4

MA3 = CP3, 4, 5

MA4 = CP4, 5, 6

MA5 = CP5, 6, 7

CP = COMPARISON PERIOD
MA = MOVING AVERAGE

FIG. 6C

FOR AC3 = AC31 TO AC3N

FOR OTH = OTH1 TO OTHN

FOR UNI = UNI1 TO UNIN $$\text{RATIO} = \frac{\text{NORM (AC3, OTH)}}{\text{NORM (AC3ALL, OTH)}}$$

EXP (AC3, OTH, UNI) = RATIO x OBS (AC3ALL, OTH, UNI)

NEXT UNI

NEXT OTH

NEXT AC3

---

FOR AC3 = AC31 TO AC3N

FOR OTH = OTH1 TO OTHN

FOR UNI = UNI1 TO UNIN $$\text{PRIORITY (AC3, OTH, UNI)} = \frac{\text{OBS (AC3, OTH, UNI)}}{\text{EXP (ACE, OTH, UNI)}} \times 100$$

NEXT UNI

NEXT OTH

NEXT AC3

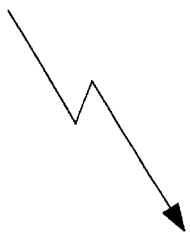

EG: OTHER STATISTICAL ANALYSES PERFORMED HERE
         LOWER/HIGHER CONFIDENCE
         LOWER/HIGHER CONFIDENCE LIMITS

FIG. 7D

NUMBER OF SDRS INAIRCRAFT
NUMBER OF SDRS WITHIN USER-SPECIFIED DAYS BEFORE OR AFTER EACH UEL
NATURE OF CONDITION (NC) "COMBO CODE" FOR ALL SDRS IN AIRCRAFT
PRECAUTIONARY PROCEDURE (PP) COMBO CODE FOR ALL SDRS IN AIRCRAFT
NUMBER OF UELS (TYPE = 1) IN A GIVEN MONTH OF ANY YEAR
NUMBER OF UELS (TYPE = 1) IN AIRCRAFT
SHORTEST INTERVAL BETWEEN ANY TWO UELS (TYPE = 1) IN AIRCRAFT
NUMBER OF MAJORS (TYPE = 2) IN AIRCRAFT
SHORTEST INTERVAL BETWEEN ANY TWO MAJORS (TYPE = 2) IN AIRCRAFT
NUMBER OF ROUTINES (TYPE = 3) IN AIRCRAFT
SHORTEST INTERVAL BETWEEN ANY TWO ROUTINES (TYPE = 3) IN AIRCRAFT
NUMBER OF NMNRS (TYPE = 4) IN AIRCRAFT
SHORTEST INTERVAL BETWEEN ANY TWO NMNRS (TYPE = 4) IN AIRCRAFT
NUMBER OF SDRS IN AIRCRAFT FOR USER-SPECIFIED YEAR
NUMBER OF UELS (TYPE = 1) IN AIRCRAFT FOR USER SPECIFIED CALENDAR YEAR
NUMBER OF MAJORS (TYPE= 2) IN AIRCRAFT FOR USER SPECIFIED CALENDAR YEAR
NUMBER OF ROUTINES (TYPE = 3) IN AIRCRAFT FOR USER SPECIFIED CALENDAR YEAR
NUMBER OF NMNRS (TYPE = 4) IN AIRCRAFT FOR USER SPECIFIED CALENDAR YEAR
OPERATOR NUMBER OF FIRST SDR IN USER-SPECIFIED CALENDAR YEAR
NATURE OF CONDITION OF FIRST SDR IN USER-SPECIFIED CALENDAR YEAR
INTERVAL BETWEEN AIRCRAFT'S 1ST SDR AND ITS LAST SDR
1ST SHORTEST INTERVAL (DAYS) BETWEEN TWO SDRS IN AIRCRAFT
2ND SHORTEST INTERVAL (DAYS) BETWEEN TWO SDRS IN AIRCRAFT
3RD SHORTEST INTERVAL (DAYS) BETWEEN TWO SDRS IN AIRCRAFT
LONGEST INTERVAL (DAYS) BETWEEN TWO SDRS IN AIRCRAFT
INTERVAL BETWEEN AIRCRAFT'S 1ST UEL AND ITS LAST UEL
1ST SHORTEST INTERVAL (DAYS) BETWEEN TWO UELS IN AIRCRAFT
2ND SHORTEST INTERVAL (DAYS) BETWEEN TWO UELS IN AIRCRAFT
3RD SHORTEST INTERVAL (DAYS) BETWEEN TWO UELS IN AIRCRAFT
LONGEST INTERVAL (DAYS) BETWEEN TWO UELS IN AIRCRAFT
INTERVAL BETWEEN AIRCRAFT'S 1ST MAJOR AND ITS LAST MAJOR
1ST SHORTEST INTERVAL (DAYS) BETWEEN TWO MAJORS IN AIRCRAFT
2ND SHORTEST INTERVAL (DAYS) BETWEEN TWO MAJORS IN AIRCRAFT
3RD SHORTEST INTERVAL (DAYS) BETWEEN TWO MAJORS IN AIRCRAFT
LONGEST INTERVAL (DAYS) BETWEEN TWO MAJORS IN AIRCRAFT
INTERVAL BETWEEN AIRCRAFT'S 1ST ROUTINE AND ITS LAST ROUTINE
1ST SHORTEST INTERVAL (DAYS) BETWEEN TWO ROUTINES IN AIRCRAFT
2ND SHORTEST INTERVAL (DAYS) BETWEEN TWO ROUTINES IN AIRCRAFT
3RD SHORTEST INTERVAL (DAYS) BETWEEN TWO ROUTINES IN AIRCRAFT
LONGEST INTERVAL (DAYS) BETWEEN TWO ROUTINES IN AIRCRAFT
INTERVAL BETWEEN AIRCRAFT'S 1ST NMNR AND ITS LAST NMNR
1ST SHORTEST INTERVAL (DAYS) BETWEEN TWO NMNRS IN AIRCRAFT
2ND SHORTEST INTERVAL (DAYS) BETWEEN TWO NMNRS IN AIRCRAFT
3RD SHORTEST INTERVAL (DAYS) BETWEEN TWO NMNRS IN AIRCRAFT
LONGEST INTERVAL (DAYS) BETWEEN TWO NMNRS IN AIRCRAFT

FIG. 10B

NUMBER OF YEARS WITH 0 (1, 2, 3, 4, 5, 6 OR 7) SDRS
NUMBER OF YEARS WITH 0 (1, 2, 3, 4, 5, 6 OR 7) UELS
NUMBER OF YEARS WITH 0 (1, 2, 3, 4, 5, 6 OR 7) MAJORS

EPISODE DEPENDENT VARIABLES ("X" BEING USER SELECTABLE)

DURATION IN DAYS OF EPISODE X
COMBO CODE OF EPISODE X
NATURE OF CONDITION OF FIEST RELATED SDR IN EPISODE X
PRECAUTIONARY PROCEDURE OF FIRST RELATED SDR IN EPISODE X
DOD OF FIRST RELATED SDR IN EPISODE X
INTERVAL BETWEEN FIRST AND SECOND RELATED SDR IN EPISODE X
NUMBER OF SDRS IN EPISODE X
SHORTEST INTERVAL BETWEEN 2 ANY SDRS INSIDE EPISODE X
NUMBER OF UELS IN EPISODE X
SHORTEST INTERVAL BET ANY TWO UELS IN EPISODE X
NUMBER OF MAJORS IN EPISODE X
SHORTEST INTERVAL BET ANY TWO MAJORS IN EPISODE X
NUMBER OF ROUTINES IN EPISODE X
SHORTEST INTERVAL BET ANY TWO ROUTINES IN EPISODE X
NUMBER OF NMNRS IN EPISODE IN EPISODE X
SHORTEST INTERVAL BET ANY TWO NMNRS IN EPISODE X
    (NOTE: THE ABOVE VARIABLES ARE OUTPUT FOR EACH EPISODE UP TO THE XTH EPISODE.)
INTERVAL BETWEEN EPISODE X AND EPISODE X-1 (EG: IF X=3 THEN THE INTERVAL IS MEASURED BETWEEN THE FIRST EPISODE AND THE SECOND AND ANOTHER INTERVAL IS MEASURED BETWEEN THE SECOND EPISODE AND THE THIRD).

WINDOW DEPENDENT VARIABLES

NUMBER OF SDRS IN WINDOW
SHORTEST INTERVAL BET ANY TWO SDRS IN WINDOW
NUMBER OF RELATED SDRS IN WINDOW
SHORTEST INTERVAL BET ANY TWO RELATED SDRS IN WINDOW
NUMBER OF EPISODES IN WINDOW
SHORTEST INTERVAL BET ANY EPISODES IN WINDOW
NATURE OF CONDITION OF FIRST RELATED SDR IN WINDOW
PRECAUTIONARY PROCEDURE OF FIRST RELATED SDR IN WINDOW
NUMBER OF UELS IN WINDOW
SHORTEST INTERVAL BET ANY TWO UELS IN  WINDOW
NUMBER OF MAJORS IN WINDOW
SHORTEST INTERVAL BET ANY TWO MAJORS IN WINDOW
NUMBER OF ROUTINES (TYPE = 3) IN WINDOW
SHORTEST INTERVAL BET ANY TWO ROUTINES (TYPE = 3) IN WINDOW
NUMBER OF NMNRS (TYPE = 4) IN WIDNOW
SHORTEST INTERVAL BET ANY TWO NMNRS (TYPE = 4) IN WINDOW

FIG. 10C

INFORMATION SYSTEM AND METHOD USING ANALYSIS BASED ON OBJECT-CENTRIC LONGITUDINAL DATA

TECHNICAL FIELD

This invention relates generally to a computerized information system and method using object-centric virtual database(s) and analyses which are advantageously suited to transportation safety applications, such as for the aviation industry (in which case the aircraft may be the unit of observation i.e. "object" referred to herein), as well as for health and other safety monitoring applications.

BACKGROUND

As is true for many transportation and health areas, the aviation industry generates a number of different reports relating to a variety of safety-related occurrences which are available to the public (either through the Internet or on request to the source). Appendix A herein sets out a summary of several sources of these reports and the meaning of various terms used in the aviation industry in relation to reporting. Individual aircraft are identified in accident reports, incident reports, mechanical reliability reports of failures (also referred to as service difficulty reports or "SDRs") and engine reliability reports. In some other available reports pertinent information is provided but not in relation to a specific aircraft. For example, as stated in Appendix A, reports in the Aviation Safety Report System (ASRS) do not identify individual aircraft. In addition, Airworthiness Directives (and the automated exemption lists which may be provided therein) stipulate generally directed requirements for inspecting and/or fixing potential problems. Similarly, National Transportation Safety Board (NTSB) recommendations to the Federal Aviation Authority (FAA) and their outcomes, as well as FAA enforcement data on regulatory violations, provide additional sources of safety-related occurrences. Examples of some other safety-related data types include pilot factors, airport and air traffic management.

There is no automated means available to analyse multiple records from such publicly available sources for objects such as individual aircraft. Nor is there available any means for performing statistical analyses of trends and/or rates of non-accident occurrences (examples of which are SDRs, engine reliability reports and incidents) on such multiple records across various files let alone the same file for an individual object such as an aircraft. Consequently, the existing aviation safety systems cannot identify single aircraft with multiple problems and, because they do not identify rates, they do not provide any measure of risk which would permit a comparison of models or operators or identification of changes in trends.

Accordingly, there is a need for means to perform longitudinal analyses on individual safety/health-related objects (such as an aircraft or a patient) to enable a comparison of different groups of objects (such as aircraft models and operators). In particular, for example, there is a need for a means of standardizing public and/or private data providing non-accident safety-related information such as mechanical difficulties, as well as operational data, relating to aircraft and for analyzing such data on an object-centric basis to identify and predict potential problem areas and risks. The term "object" includes anything physical such as an aircraft, nuclear reactor or other environmental hazard for which safety-related events are monitored as well as anything which is the subject of events such as a drug or treatment for which the events to be monitored may include reactions to the drug or a disease for which the events may include symptoms.

SUMMARY OF THE INVENTION

In accordance with the invention there is provided an information system for analyzing data comprised of events pertaining to an object class (e.g. aircraft). The system comprises a data access component configured for accessing a database comprising at least one set of data records (service difficulty reports) whereby each data record pertains to an event for an individual object (e.g. an individual aircraft) and comprises a plurality of data fields, at least one of the data fields comprising an identifier identifying one individual object. A user interface component receives user-selected criteria for field values of the data fields. A selection component is configured for selecting those of the data records which correspond to the user-selected criteria. An analysis component is configured for analyzing the data records including identifying the selected data records according to a chronological sequence of events for individual objects covered by the selected data records, whereby each individual object covered by the selected data records is associated with a longitudinal set of data records, and deriving output data for the events from the longitudinal sets of data records.

Preferably, the data fields comprise a plurality of identifiers and a preprocessor component identifies multiple sub-databases from the selected data records whereby each sub-database comprises data records identified by one of the identifiers. Preferably, a plurality of sets of data records are provided, each being derived from a different source, whereby the sets of data records are integrated to form the database. The information provided by one set of data records may be used to supplement other data records of the database and the information provided by another one of the sets of data records may be used to correct erroneous data field values in data records obtained from any source.

A graphizer output component is preferably provided for graphically displaying the output data by multi-result inter-related graphs. The analysis component may be configured for identifying chronological trends for one or more individual objects and/or data records, for surveiling the events on a chronological basis for one or more individual objects, for standardizing the data reports and individual objects as between the different originating sources thereof (e.g. based traffic patterns for each individual aircraft and the types of aircraft models of each originating source), for comparing on a chronological basis and measured from a user-selected event the events pertaining to one individual object and the events pertaining to a user-selected comparison group of objects, for normalizing the field values for a set of data fields and outputting the resulting normalized data, for identifying related data records of the data records, for identifying a statistically high number of events for an individual object within a designated time period and/or for rating the originating sources of the data records on the basis of the diligence of the originating sources in reporting events.

BRIEF DESCRIPTION OF THE DRAWINGS

The invention will now be described in greater detail with reference to the attached drawings wherein:

FIGS. 4a through 4e together form a flow chart diagram of steps performed by the selection filter component 200 of the illustrated information system;

FIGS. 6a and 6b are flow chart diagrams showing steps performed by the SURVEIL module 310 and FIGS. 6c and 6d illustrate some ways comparison periods land moving averages could be constructed which in turn are analysed by the SURVEIL module 310;

FIGS. 7a, 7b, 7c and 7d are flow chart diagrams showing steps performed by the STANDARDIZATION module 320;

FIG. 15 is a flow chart diagram showing steps performed by the COHORT module 395; and, FIGS. 16(a)–16(c) are exemplary depictions of output graphs produced by the graphizer component of the system, of which

DETAILED DESCRIPTION OF A PREFERRED EMBODIMENT

Figure 1:
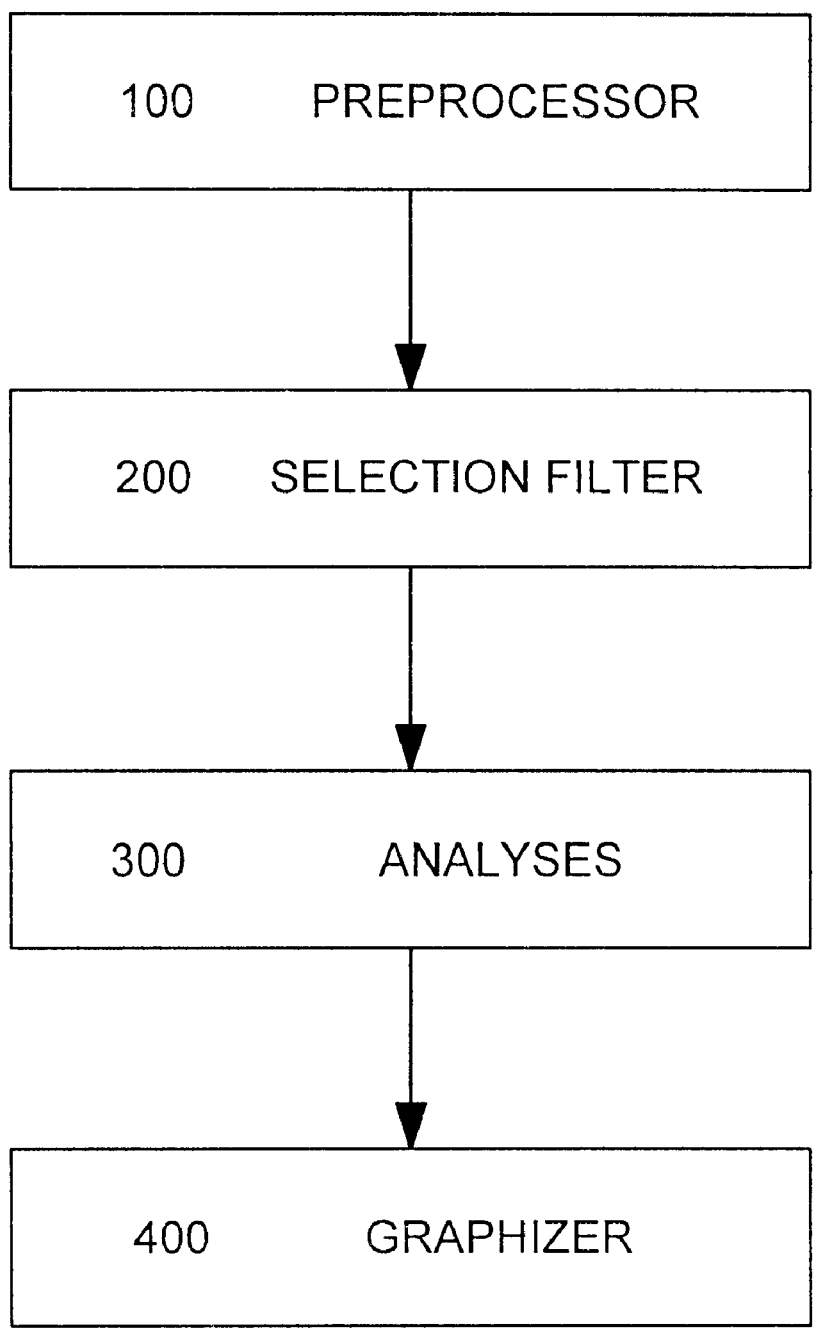
FIG. 1 is a general block diagram of the main components of an information system in accordance with the present invention, the illustrated system being an aviation information system using aircraft-centric databases and analyses.

FIG. 1 shows, in general block diagram form, the main components of an aircraft-based (i.e. aircraft-centric) aviation information system and method in accordance with the present invention. In this embodiment the object class is aircraft and an individual object is an individual aircraft. Events pertaining to individual aircraft are reported in service difficulty reports (SDRs), being data reports herein.

Figure 2:
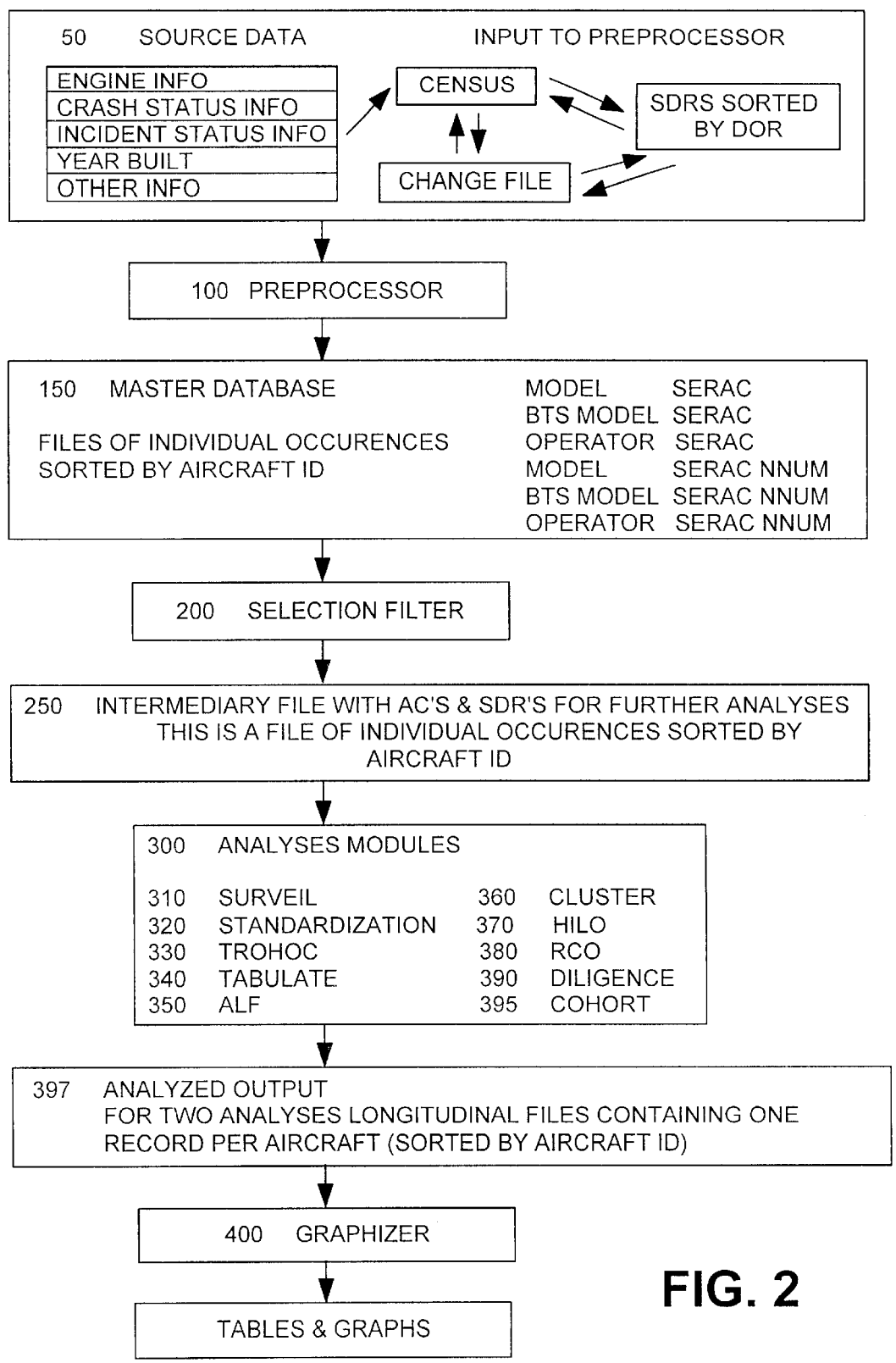
FIG. 2 is a further block diagram of the system shown by FIG. 1 with more detail shown therein with respect to the inputs and outputs of the main components.

The components 100, 200, 300, 400 are in the form of computer programs. A preprocessor component 100 manages, massages, cleans, links and sorts the data provided by SDRs, and other safety-related data from accident/incident reports and other sources (e.g. engine reliability), into six master database files 150 (see FIG. 2), as detailed below, which are developed by the preprocessor 100 from such data. A selection filter component 200 is user selected and controlled and includes a database access component for selecting aircraft and/or SDRs, according to user-specified criteria, from any one of the six master database files 150 for purposes of further analysis. The resulting selected data produces an intermediate (ie temporary) data file 250 which is used by an analyses component 300. The analyses component 300 comprises several analysis subcomponents 310, 320, 330, 340, 350, 360, 370, 380, 390 and 395 (FIG. 2) referred to herein as analysis modules. The modules 310, 320, 330, 340, 350, 360, 370 and 395 use the aircraft (referred to herein as "AC") as a basic unit of observation (i.e. the aircraft is the object) together with user inputted criteria to perform specific analyses. Analysis module 380 operates on the individual NTSB recommendations for which the courses and outcomes of FAA implementations are tracked. Analysis module 390 operates on the individual operators for which various statistical performance measures are used to derive an aggregate score. Two of the analysis modules viz, modules 330 and 350, produce longitudinal data files comprising one record per individual aircraft and, therefore, aircraft-based output. A graphizer component 400 outputs the results of analyses selected by the user and this output is provided in various formats including a multi-graphical display as shown, for example, by FIGS. 16(b) and (c).

SDRs form the workhorse from which most of the analysis modules derive results. In fact, each aircraft has a minimum of one SDR. Each SDR comprises the following fields: AC3 (Model, BTS Model and Opcode), SERAC (Serial number), NNUM (Nnumber), Kind, Year built, OTH (Opcode, Opcode and Model), DOD, DOR, ALT (BTS Model, Model and BTS Model), Nature of Condition, Precautionary Procedure, Severity, Stage of Operation, ATA, Construction number, Engine, Crash report status and Incident report status. For illustration purposes, some of the values associated with some of these fields are listed in Appendix B herein. The preprocessor component 100 categorizes, sorts and identifies each SDR according to six different formats (each format corresponding to one of the six files of a master database 150) as illustrated below in Table 1 and each aircraft is thereby associated with a set of SDRs according to a given set of identifiers (i.e. per the first column of Table 1).

TABLE 1

| AC IDENTIFIED BY | AC CATEGORIZED AND SORTED BY | AC3 | OTH | ALT |
|---|---|---|---|---|
| MODEL, SERAC | MODEL, SERAC, DOD | MODEL | OPCODE | BTS MODEL |
| BTS MODEL, SERAC | BTS MODEL, SERAC, DOD | BTS MODEL | OPCODE | MODEL |
| OPCODE, SERAC | OPCODE, SERAC, DOD | OPCODE | MODEL | BTS MODEL |
| MODEL, SERAC, NNUM | MODEL, SERAC, NNUM, DOD | MODEL | OPCODE | BTS MODEL |
| BTS MODEL, SERAC, NNUM | BTS MODEL, SERAC, NNUM, DOD | BTS MODEL | OPCODE | MODEL |
| OPCODE, SERAC, NNUM | OPCODE, SERAC, NNUM, DOD | OPCODE | MODEL | BTS MODEL |

The value sets associated with MODEL, BTS MODEL and OPCODE are listed in Appendix B herein. Each airplane's serial number is assigned by the aircraft's manufacturer and remains unchanged with the plane through its operational history. Its registration number (also known as the tail number) is assigned by the US Department of Transportation. Since a plane can be owned or operated by different owners or operators over time, its registration number can change over time. Serial and registration number assignments for USA-registered aircraft also apply to non-USA registered aircraft.

The data gathered by the preprocessor component 100 may be obtained from public or private sources or a combination of both. The most important data gathered by it in the embodiment described herein are Service Difficulty Reports (SDRS) which are reports of each particular occurrence involving a mechanical difficulty pertaining to a particular aircraft. SDRs are legally required by the Federal Aviation Administration (FAA) for each and every safety related mechanical difficulty involving any USA-registered airplane. The seriousness of the mechanical difficulties reported in SDRs range from broken in-cabin passenger light bulbs at the low end of the seriousness spectrum to engine failures and cockpit smoke/fires at the other end. Appendix B herein lists some of the values for specific information fields provide by an SDR. The FAA makes SDRs readily available to the public.

For the system embodiment described herein the SDRs are compiled into a combined safety database of the preprocessor component 100. Historical SDR data was obtained from the FM's Oklahoma City office and current SDRs are downloaded directly from the FAA's website and incorporated by the preprocessor component 100 on a regular basis. The preprocessor component 100 adds certain aircraft data to each SDR such as the year it was built, its construction number and engine type all of which are stored and updated in a Census file maintained by the system.

The Census file is a master file containing validated information for aircraft (derived from SDRs and production lists), including the serial and registration numbers of the aircraft, and this information is used to validate new records received by the system. Other information kept in the Census file includes the manufacturer's construction number for the aircraft, the year in which the aircraft was built, the model land/or version identifier for the aircraft, any other identifying feature associated with the aircraft that may be desired to be tracked such as the type of wiring of the aircraft and activity history for the aircraft such as engine replacements.

A Change file keeps track of aircraft having inaccurate or garbled identifiers and their corrected identifiers. It also keeps track of inaccurate or garbled non-identifying data values and their corrected values. Other information may be added to the Census and Change datasets if desired.

In addition to gathering report data, the preprocessor component 100 harmonizes the fields in each SDR according to system definitions (model name and version as well as operator name, etc.), deletes duplicates, corrects errors and links (ie: matches) the SDR to aircraft identification data. Such verification is done by first comparing the identifier with those in the Change file and then with the Census file. Both the Change and Census datasets are updated each time a new SDR is integrated with a master SDR file of the master database 150.

Aviation Safety Report System (ASRS) reports are anonymized and unlike the SDRs or accident/incident reports, do not identify the aircraft for which the report was generated (specifically, the operator and serial/registration numbers for the aircraft are not provided). For this reason the preprocessor component 100 maintains the ASRS data in a separate dataset from the master database 150.

Another smaller dataset is also maintained by the preprocessor component 100 of the illustrated embodiment, namely an Operator/Model Exposure and Costs (OMEC) dataset. The preprocessor component 100 tabulates departures, hours in flight, hours ramp to ramp, aircraft miles, passenger miles, aircraft days, aircraft census (mean number in service), costs and individual aircraft by age or other individual characteristic for each of the largest operators (this being about 100 operators in the embodiment described herein) and aircraft models using data collected by the Bureau of Transportation Statistics (BTS).

In addition, an Engine Reliability Dataset (ERD) is maintained by the preprocessor component 100 and this data is obtained from the ASY division of the FAA. The ERD dataset contains 1998 and 1999 engine types used for each aircraft model and by operator. It also contains engine hours and aircraft census as well as engine failures and engine changes. The ERD has two uses. Firstly, it gives more complete data on engine failures than SDRs and secondly, it gives aircraft census monthly numbers for number of aircraft and flight hours by model/version by operator.

Other public and/or private databases may be integrated into the preprocessor component 100 if and as desired. For example, private data such as Flight Oriented Quality Assurance (FOQA) data consisting of the output from the Flight Data Recorders (FDRs) (providing more data on engine performance and pilot behaviour) could be incorporated. Such added data would then be integrated into the system for use by component 300.

The selection filter component 200 selects a dataset from the database maintained by the preprocessor component 100 on the basis of user-specified criteria. The user-selectable criteria provided in the illustrated embodiment are the following:

1. Aircraft report history—permits report activity within five specified time periods and by minimum/maximum number of reports in each period.
2. Presence or absence of SDRs before the minimum date of the first specified time period from the first criteria above
3. Presence or absence of SDRs after the maximum date of the first specified time period from the first criteria above
4. Model—for example, DC9, B737, etc.
5. Version—for example, DC9-30, B737-300, etc.
6. Manufacturer—for example, Boeing, Airbus, etc.
7. Specific operators—for example, United Airlines, USAir, American Airlines, etc.
8. Operator group—major, national, regional or other.
9. SDR's—only for specified operator or all SDR's for the aircraft.
10. Type
11. Nature of condition
12. Precautionary procedure
13. Severity
14. Stage of operation
15. select 2 char ATA code on SDR basis
16. select 4 char ATA code on SDR basis
17. select AC with user selected 2 char ATA code (and accept all other SDRs in AC)
18. select AC with user selected 2 char ATA code (and reject all other SDRs in AC)
19. select AC with user selected 4 char ATA code (and accept all other SDRs in AC)
20. select AC with user selected 4 char ATA code (and reject all other SDRs in AC)
21. minimum/maximum Year built
22. minimum/maximum time between DOD and DOR
23. Select all SDRs on same day or select first SDR of similar SDRs occurring on same day
24. Construction number range 25. Crash report(s) status
26. Incident report(s) status
27. Engine manufacturer and model
28. Serial number range
29. Wiring type Users may modify the twenty nine (29) criteria listed above through the user interface. Criteria number one allows users to compare different aircraft with similar report histories. This is pertinent because some aircraft are not in continuous use during the entire time period of observation. An airplane may be withdrawn from use, stored or sold outside of the USA in which case SDRs are not legally mandated for any mechanical problems it may encounter. This first criteria provided to the user allows the user to make comparisons on the level or intensity of SDR activity by specifying a minimum and maximum number of SDRs for any user definable arbitrary period of time.

Criteria numbers two and three presented to the user through the user interface allow the user to select or ignore aircraft with SDR activity before the first period's minimum date or after the same period's maximum date. The same two criteria also allow the user to select the aircraft regardless of any SDR activity before the first period's minimum date or after the same period's maximum date.

Figure 3:
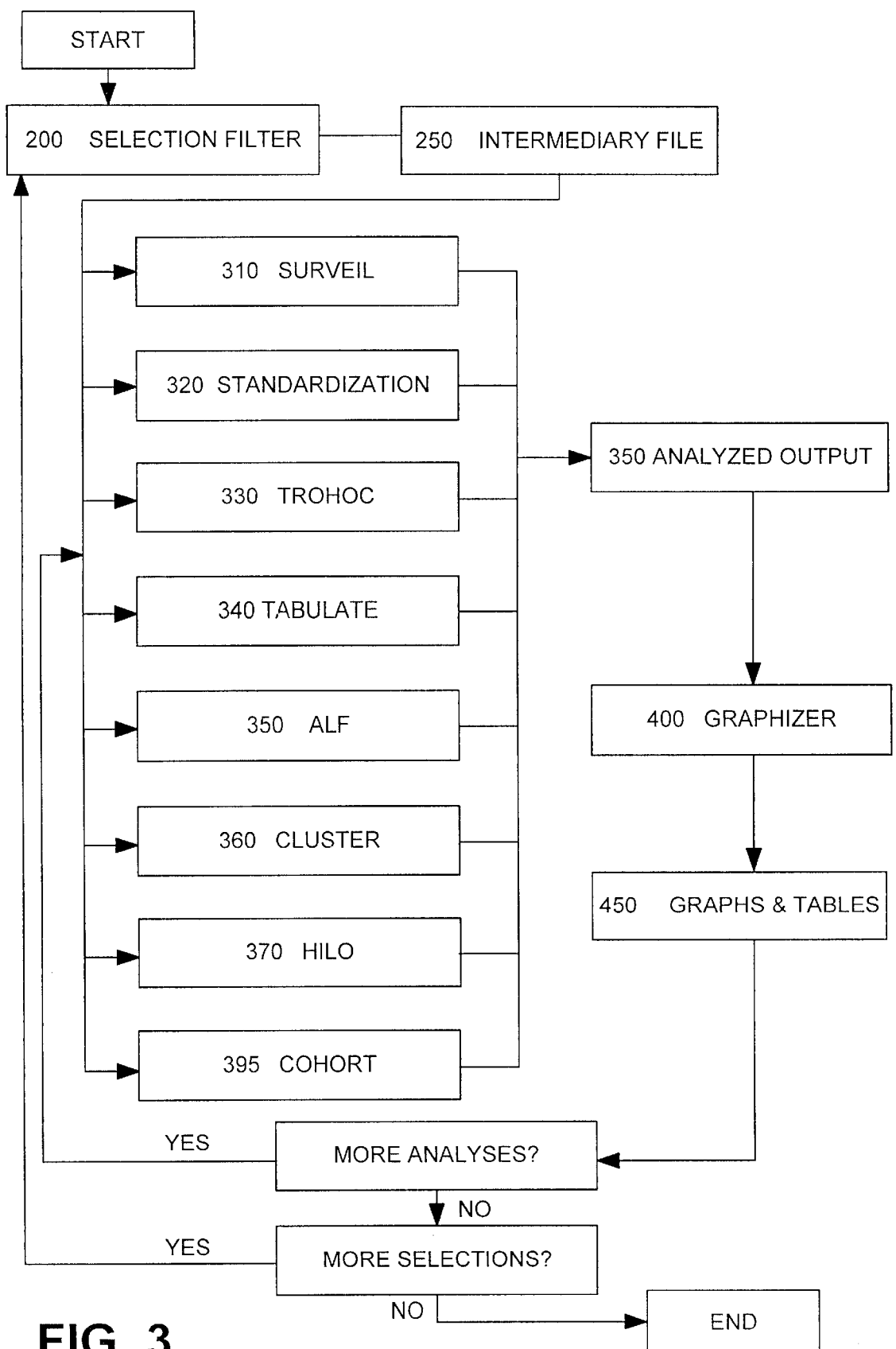
FIG. 3 is a general flow chart diagram showing steps of the information system and method from the user's selection inputs to the presentation of the output tables and graphs.
Figure 4A:
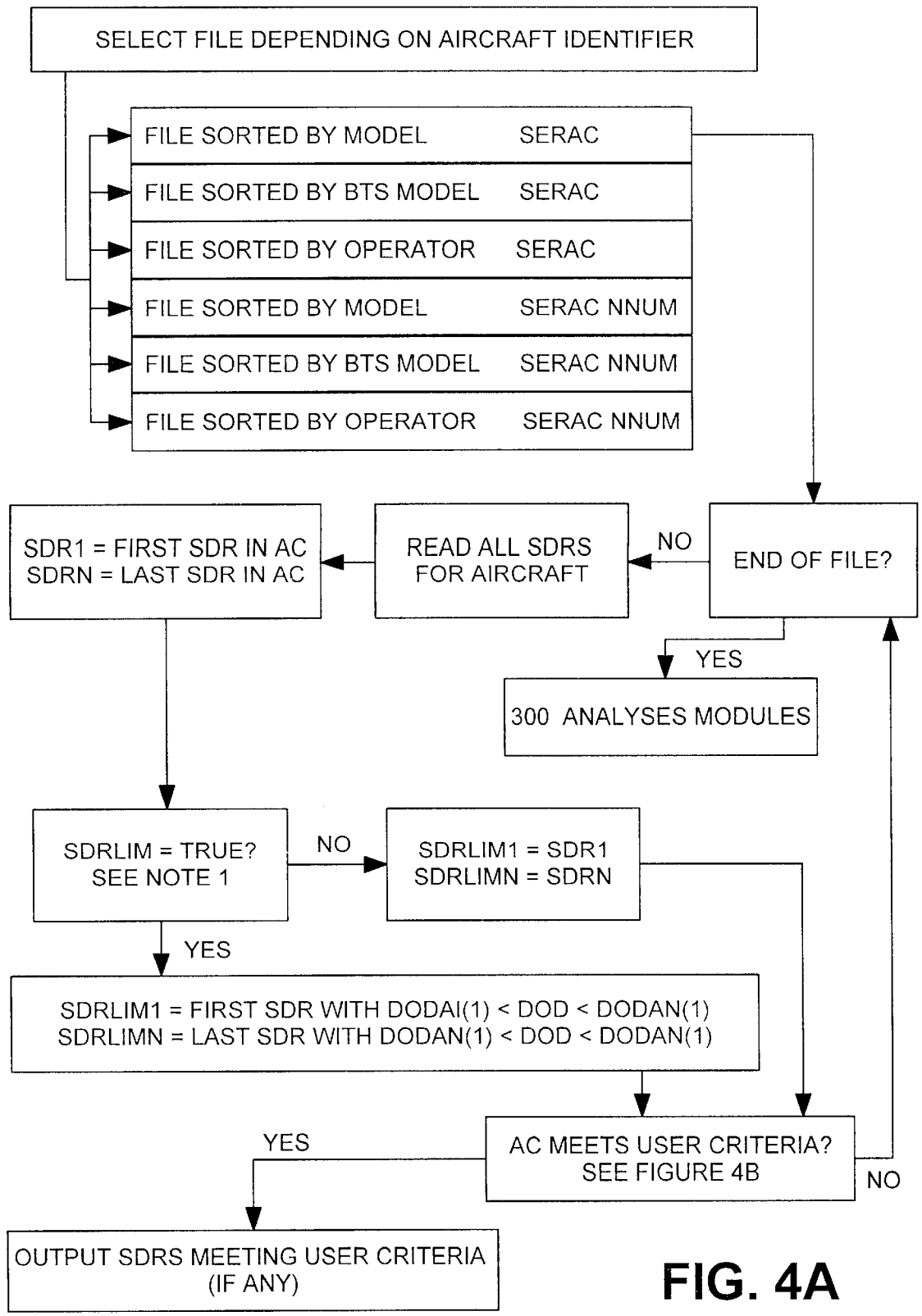
Figure 4B:
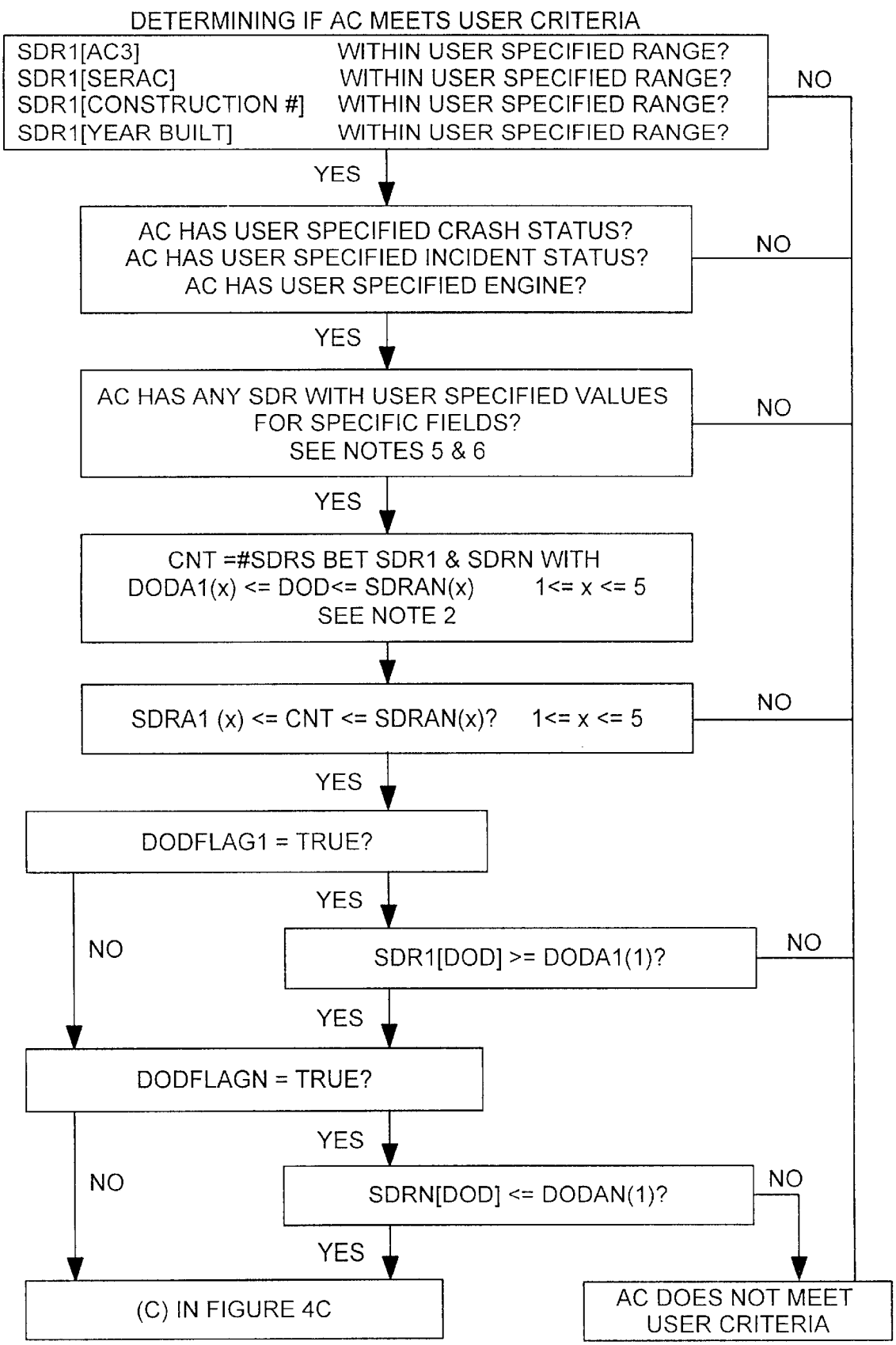
Figure 4C:
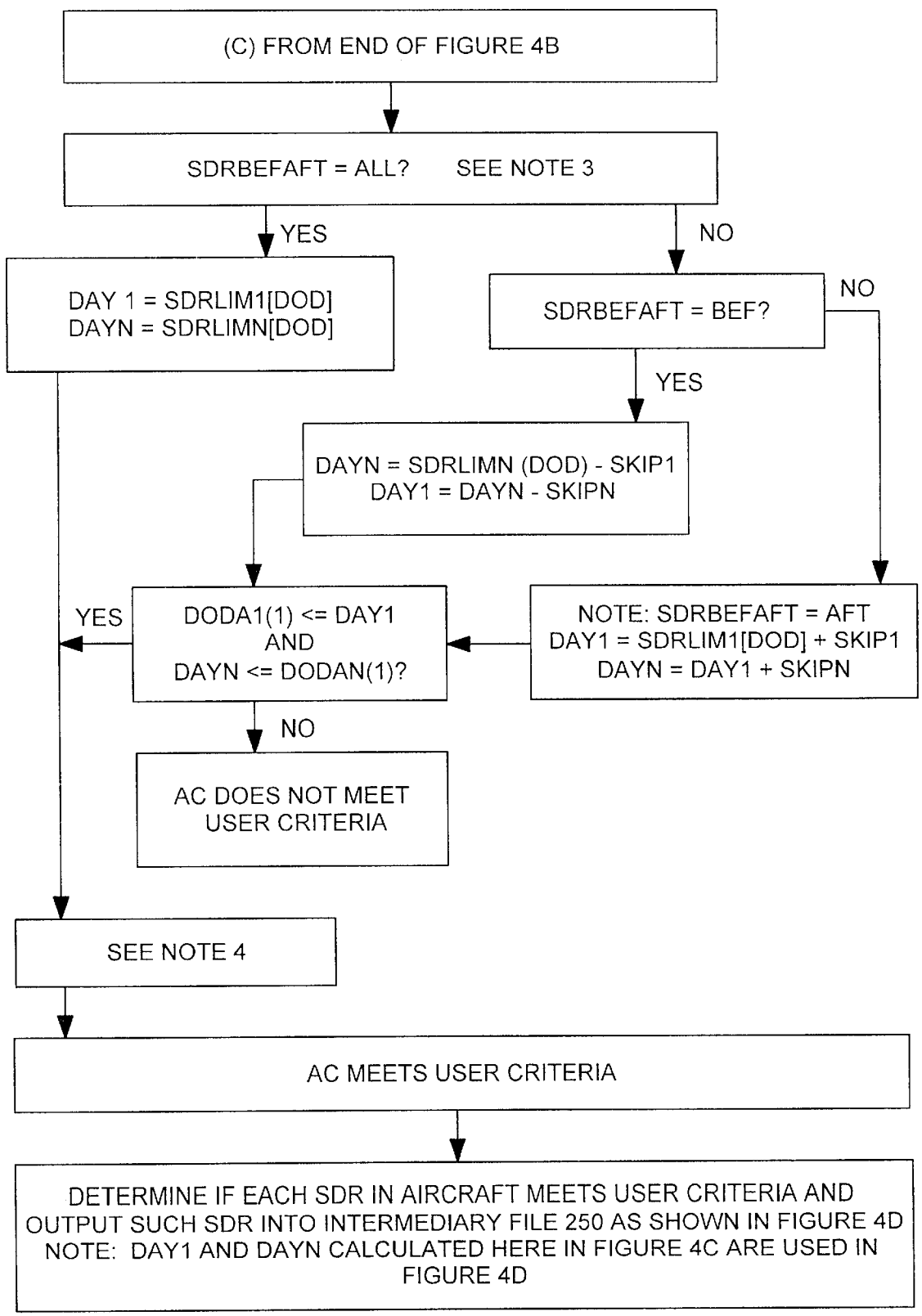
Figure 4D:
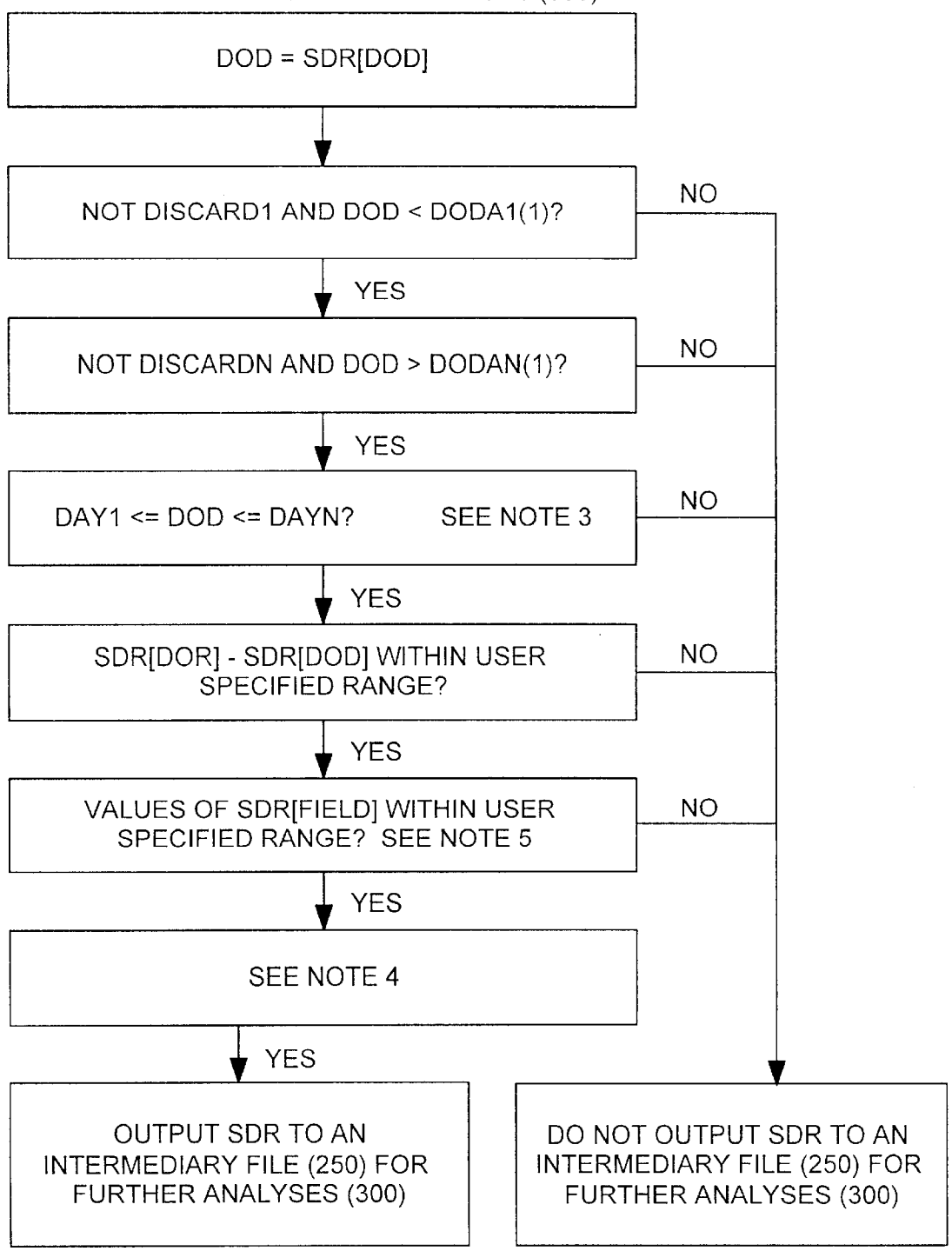

A text analysis and a keyword search are also provided as user definable (not selectable) fields via the user interface. Of course, different and/or additional selectable and definable fields could be provided by the system if desired. A general flow chart diagram showing steps of the information system and method from the user's selection inputs to the presentation of the output tables and graphs is provided by FIG. 3.

The selection filter component 200 creates an intermediate (i.e. temporary) data file containing a collection of aircraft all meeting an input set of user-specified criteria. A user interface component (e.g. a graphical user interface (GUI)) receives, from the user, a set of selectable criteria as set out above (i.e. items listed as 1–29 and the text analysis and a key word search) which the selection filter component 200 uses to select the specific file of the master database 150 which is linked to such aircraft and also the aircraft and SDRs meeting such criteria. The selection filter compiles the resulting data identified from the user-specified criteria into an intermediate data file 250. FIGS. 4a through 4e together form a flow chart diagram of the steps performed by the selection filter component 200 of this embodiment.

The analysis modules 310–370 and 395 each include a longitudinalizer function which gathers all the SDRs having the same identifying data, per column 1 of Table 1, into virtual storage. At this point the analysis module (i.e. one of 310–370 or 395) has a virtual aircraft with virtual SDRs, representing a chronological sequence of events for an individual aircraft. The analysis module then analyses that virtual aircraft and temporarily stores the results of the analysis in memory. The virtual aircraft with its virtual SDRs are then cleared from the computer's memory and the program module repeats the cycle by gathering the SDRs for the next aircraft. The analysis results for each aircraft are collated or compared and when all of the aircraft in the intermediate file 250 have been analysed accordingly the analyses of all the aircraft are output into another intermediary file 397 to be presented to the user by means of the graphizer 400.

The analyses component 300 includes a GUI which allows the user to select values for variables which are specific to each analysis module which is to perform. The user selects the analysis modules which the user wishes to run and they are run (performed) in the system in numerical order from module 310 to module 395. Each of the analysis modules 310 through 370 and 395 analyses the intermediary file 250 produced by the selection component 200. These modules (also referred to as subcomponents) use the aircraft (AC) as the basic unit of observation and two of these also produce aircraft-centric output as illustrated in Table 2 below.

TABLE 2

| SUB COMPONENT | SUBCOMPONENT NAME | AC UNIT OF OBSERVATION | AC BASED OUTPUT |
|---|---|---|---|
| 310 | SURVEIL | Yes | No |
| 320 | STANDARDIZATION | Yes | No |
| 330 | TROHOC | Yes | Yes |
| 340 | TABULATE | Yes | No |
| 350 | ALF | Yes | Yes |
| 360 | CLUSTER | Yes | No |
| 370 | HILO | Yes | No |
| 380 | RCO | No | No |
| 390 | DILIGENCE | No | No |
| 395 | COHORT | Yes | No |

Analysis modules 310–370 and 395 are based on analysing variates which simply put, are specific values for specific fields. For example, the field TYPE has four variates, TYPE=1, TYPE=2, TYPE=3 and TYPE=4. There are two kinds of variates, namely, univariates and bivariates which are detailed below.

Univariates: These fields, which include Type, Nature of Condition, Precautionary Procedure, Stage of Operation, Severity, Year Built, AC3, OTH, ATA 2 Char and ATA 4 Char for this embodiment, are analysed by calculating aircraft-centric measurements for specific values of these specific fields.

Bivariates: These fields, which include Nature of Condition by ATA, Precautionary procedure by ATA, Severity by ATA, Precautionary Procedure by Nature of Condition, ATA by Nature of Condition, ATA by Precautionary Procedure, ATA by Severity and Nature of Condition by Precautionary Procedure for this embodiment, are analysed by calculating occurrences for specific values of these specific field pairings. Table 3 below identifies the analysis modules which use the univariates and bivariates.

TABLE 3

| SUB- COMPONENT | SUBCOMPONENT NAME | UNIVARIATE | BIVARIATE |
|---|---|---|---|
| 310 | SURVEIL | Yes | Yes |
| 320 | STANDARDIZATION | Yes | Yes |
| 330 | TROHOC | Yes | Yes |
| 340 | TABULATE | Yes | Yes |
| 350 | ALF | No | No |
| 360 | CLUSTER | Yes | Yes |
| 370 | HILO | Yes | Yes |
| 380 | RCO | No | No |
| 390 | DILIGENCE | No | No |
| 395 | COHORT | Yes | Yes |

Aircraft-centirc measurements include calculating SDRs, ACs, repeats and intervals for variates (either univariates or bivariates or both according to the user's selections). An aircraft's SDR count is a simple count of the number of SDRs the aircraft has for each variate. Table 4 below illustrates five SDRs all with the same identifying data (as per the first column of Table 1) which are linked to the same virtual aircraft (e.g. referred to herein as aircraft 1 or "AC1")

by a longitudinalizer function. An analysis module then performs aircraft-centric measurements (SDRs, ACs, repeats and intervals) on this virtual aircraft.

The first aircraft-centric measurement involves SDR measurements. The SDR measurement is calculated for each variate by counting the number of SDRs in the aircraft with that particular variate. For example, AC1 has three SDRs with TYPE=2 but no SDRs with TYPE=4.

The second aircraft-centric measurement also involves aircraft measurements.

The aircraft measurement is calculated for each variate by assigning the value one (1) for each variate for any number of SDRs with that particular variate. For example, AC1 will register one (1) AC for each of TYPE=1, TYPE=2 and TYPE=3 but none for TYPE=4.

Each of Tables 4 and 5 below show data linked to one specific aircraft.

TABLE 4

| SDR Sequence | TYPE |
|---|---|
| 1st | 1 |
| 2nd | 2 |
| 3rd | 3 |
| 4th | 2 |
| 5th | 2 |

TABLE 5

| | SDR count | AC count |
|---|---|---|
| TYPE 1 | 1 | 1 |
| TYPE 2 | 3 | 1 |
| TYPE 3 | 1 | 1 |
| TYPE 4 | 0 | 0 |

Tables 6 and 7 show how the SDR and AC counts change when the system examines two aircraft instead of one.

TABLE 6

| AC ID | SDR Sequence | TYPE |
|---|---|---|
| 1st | 1st | 1 |
| 1st | 2nd | 2 |
| 1st | 3rd | 3 |
| 1st | 4th | 2 |
| 1st | 5th | 2 |
| 2nd | 1st | 1 |
| 2nd | 2nd | 2 |
| 2nd | 3rd | 1 |
| 2nd | 4th | 4 |

TABLE 7

| | SDR count | AC count |
|---|---|---|
| TYPE 1 | 3 | 2 |
| TYPE 2 | 4 | 2 |
| TYPE 3 | 1 | 1 |
| TYPE 4 | 1 | 1 |

Figure 5:
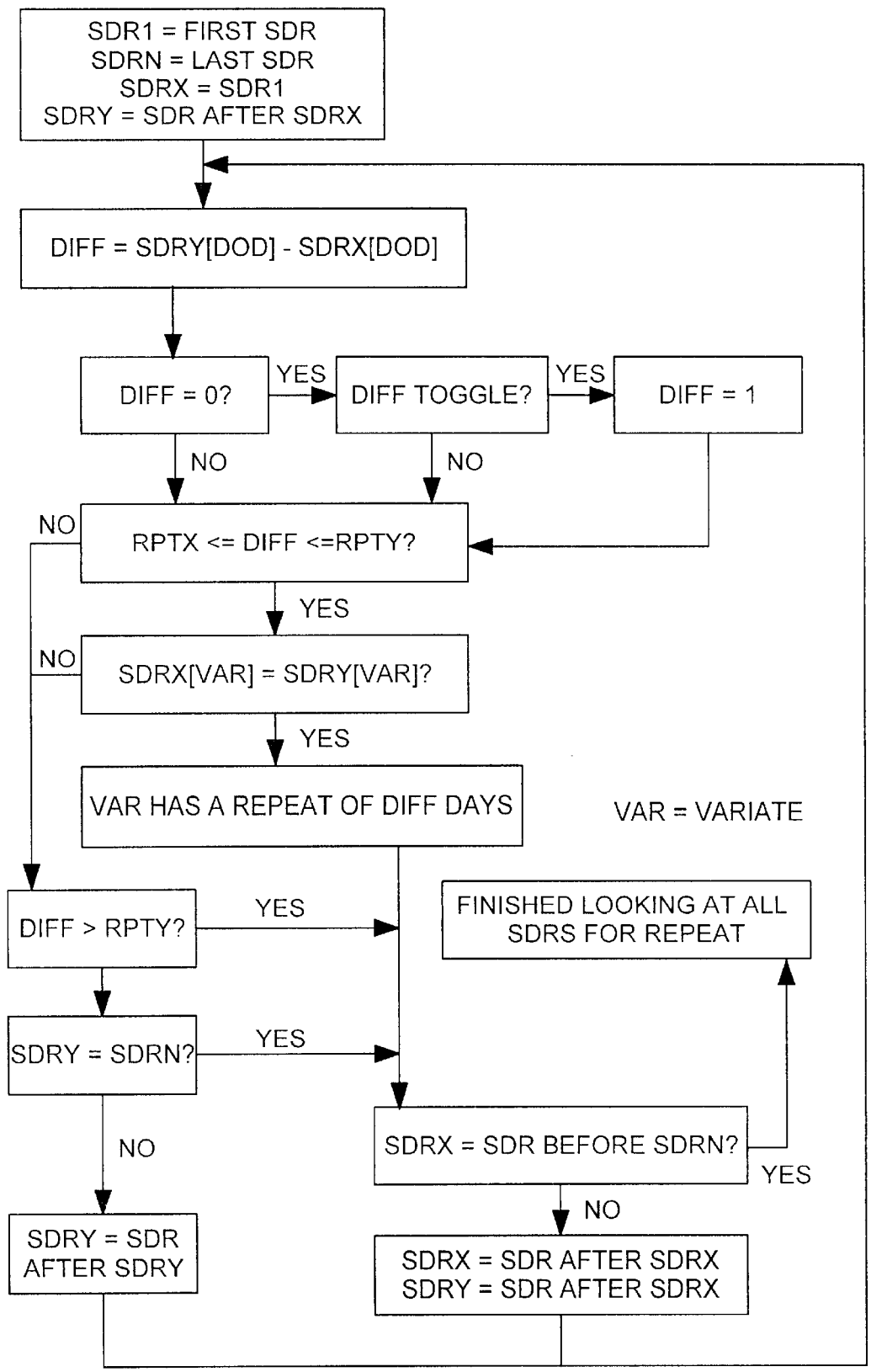
FIG. 5 is a flow chart diagram showing steps performed by the analysis modules 310, 320, 330, 340 and 360 for calculating repeats for an aircraft.

The third aircraft-centric measurement involves repeats. A repeat occurs when two SDRs having the same variate (examples of this are where two SDR's have the Variate TYPE=1 or where both have the variate PRECAUTIONARY PROCEDURE=4) have DODs (dates of difficulty) within a user-defined lapsed time, meaning that the SDRs in question are not far apart on a time line. No repeat is considered to have occurred where two SDRs have close DODs but different variates (eg where one has the variate TYPE=1 and the other has the variate TYPE=3). It is possible for a repeat to occur between an aircraft's third SDR and its eleventh SDR, for example, and this would most likely occur where an aircraft has many SDRs clustered together in a short time. To be considered a repeat the SDRs themselves are not required to be consecutive because a repeat is a measure of time and not the order of an aircraft's SDRs. FIG. 5, in the form of a flow chart, illustrates the steps performed by the analysis modules 310, 320, 330, 340 and 360 for calculating repeats for an aircraft.

The analysis component 300 permits the user, by means of the GUI, to define a minimum and maximum number of days (referred to herein as RPTX and RPTY, respectively) between the DODs for two SDRs in order to be considered a repeat. Two SDRs having DODs which are less than RPTX days apart or more than RPTY days apart are not considered to constitute a repeat. By default, in the preferred embodiment, two SDRs having DODs of the same day are defined to be exactly one day apart. However, the user may change this definition (by means of the GUI in SELECTION component 200) so that such SDRs are defined as being zero days apart. The latter definition would enable a user to distinguish between two SDRs having DODs occurring on the same day from two SDRs whose DODs occur on consecutive days.

The fourth aircraft-centric measurement involves intervals. The definition of an interval for a particular variate is defined to be the shortest repeat (applying the same boundaries as those set for repeats viz. more or equal to RPTX and less than or equal to RPTY) for that variate. As aircraft are analyzed, one by one, for a certain time period, the intervals are not accumulated. Instead, the system keeps track of the shortest interval for all aircraft for each variate.

Table 8 below illustrates some exemplary field data for an aircraft with five SDRs.

TABLE 8

| SDR Sequence | DOD | TYPE | Nature of Condition | Precautionary Procedure |
|---|---|---|---|---|
| 1st | May 01 1998 | 1 | 3 | 1 |
| 2nd | May 03 1998 | 2 | 3 | 1 |
| 3rd | May 07 1998 | 1 | 4 | 1 |
| 4th | May 14 1998 | 3 | 4 | 1 |
| 5th | May 25 1998 | 3 | 4 | 2 |

For the hypothetical aircraft data of Table 8 the data calculated for the univariates, for RPTX=2 and RPTX=15, is shown in Table 9 below.

TABLE 9

| UNIVARIATE | SDR | AC | REPEAT | INTERVAL |
|---|---|---|---|---|
| TYPE 1 | 2 | 1 | 1 | 6 |
| TYPE 2 | 1 | 1 | 0 | 0 |
| TYPE 3 | 2 | 1 | 0 | 0 |
| TYPE 4 | 0 | 0 | 0 | 0 |
| NAT. COND. 1 | 0 | 0 | 0 | 0 |
| NAT. COND. 2 | 0 | 0 | 0 | 0 |
| NAT. COND. 3 | 2 | 1 | 1 | 2 |
| NAT. COND. 4 | 3 | 1 | 1 | 7 |
| PREC. PROC. 1 | 4 | 1 | 3 | 2 |
| PREC. PROC. 2 | 1 | 1 | 0 | 0 |
| PREC. PROC. 3 | 0 | 0 | 0 | 0 |

Data calculated for an exemplary bivariate, for RPTX=2 and RPTY=15, for the aircraft of Table 8 is shown in Table 10 below.

TABLE 10

| BIVARIATE | SDR | AC | REPEAT | INTERVAL |
|---|---|---|---|---|
| PRE PROC 1 NAT COND 1 | 0 | 0 | 0 | 0 |
| PRE PROC 1 NAT COND 2 | 0 | 0 | 0 | 0 |
| PRE PROC 1 NAT COND 3 | 2 | 1 | 1 | 2 |
| PRE PROC 1 NAT COND 4 | 2 | 1 | 1 | 7 |
| PRE PROC 2 NAT COND 1 | 0 | 0 | 0 | 0 |
| PRE PROC 2 NAT COND 2 | 0 | 0 | 0 | 0 |
| PRE PROC 2 NAT COND 3 | 0 | 0 | 0 | 0 |
| PRE PROC 2 NAT COND 4 | 1 | 1 | 0 | 0 |

Table 11 below shows which analysis modules use which aircraft-centric measurements (SDRs, ACs, repeats and intervals).

TABLE 11

| ANALYSIS MODULE | SDR | AC | REPEAT | INTERVAL |
|---|---|---|---|---|
| 310 - SURVEIL | Yes | Yes | Yes | Yes |
| 320 - STANDARDIZATION | Yes | Yes | Yes | Yes |
| 330 - TROHOC | Yes | Yes | Yes | Yes |
| 340 - TABULATE | Yes | Yes | No | No |
| 350 - ALF | No | No | No | No |
| 360 - CLUSTER | Yes | Yes | Yes | Yes |
| 370 - HILO | Yes | Yes | No | No |
| 380 - RCO | No | No | No | No |
| 390 - DILIGENCE | No | No | No | No |
| 395 - COHORT | Yes | Yes | No | No |

The analysis modules 310–395 will now be described. The SURVEIL module 310 produces and analyses time trends to compare events within a user-specified standard period (SP) and at least one user-specified comparison periods (CP). The standard period starts on a user specified calendar date and may be as long as the user wishes. The time element may be measured in days, weeks, months or years. All standard and comparison periods have the same length. The specified number of comparison periods can vary and, at one extreme, could cover the duration of the whole dataset from database 150 selected by the user via the user interface in selection filter 200. As an example, five years of comparison periods could comprise 5 periods of 365 days, 20 periods of 91 days or 60periods of 30 days (usually preceding the standard period).

Figure 6B:
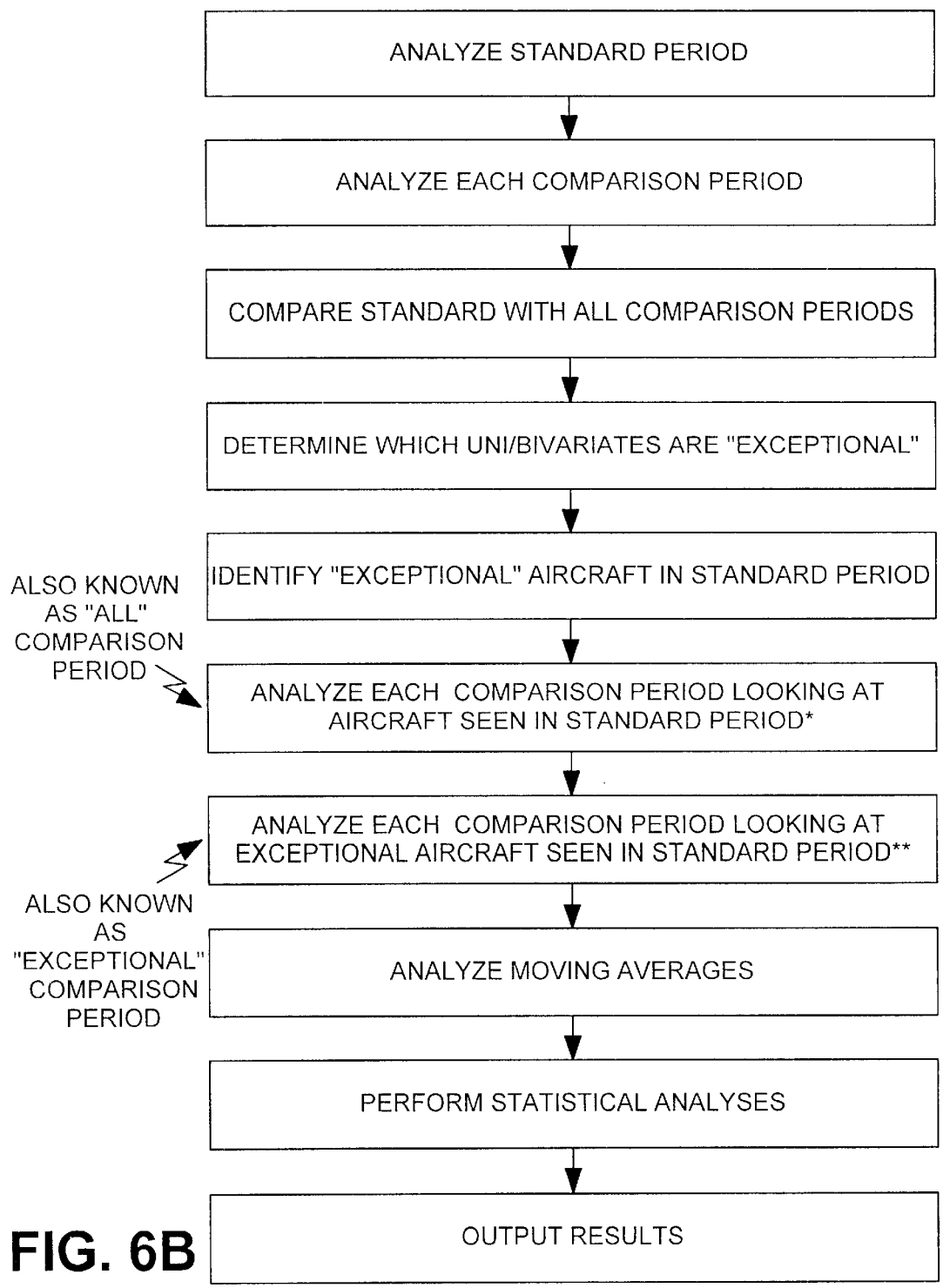
Figure 6D:
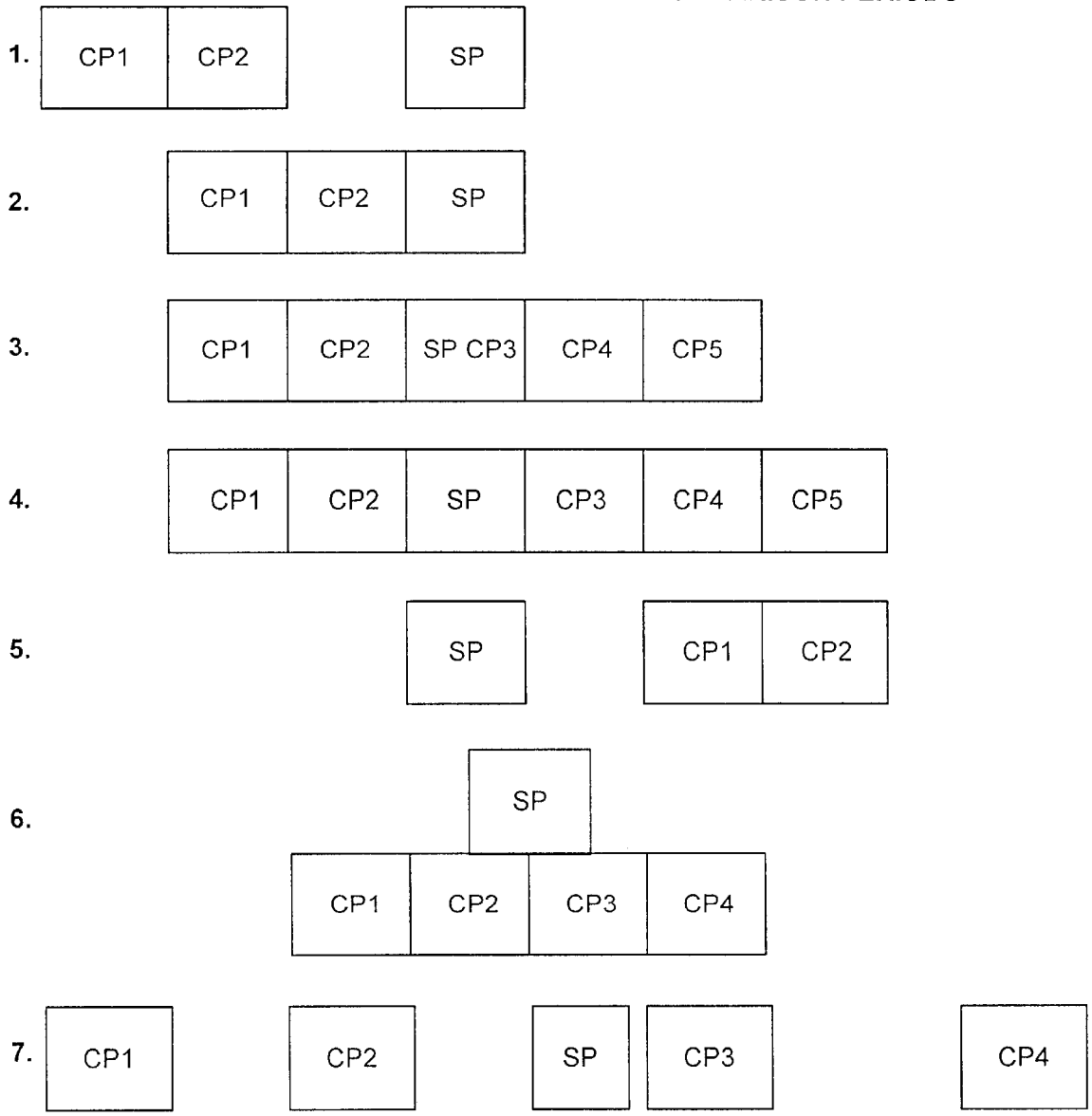
Figure 7A:
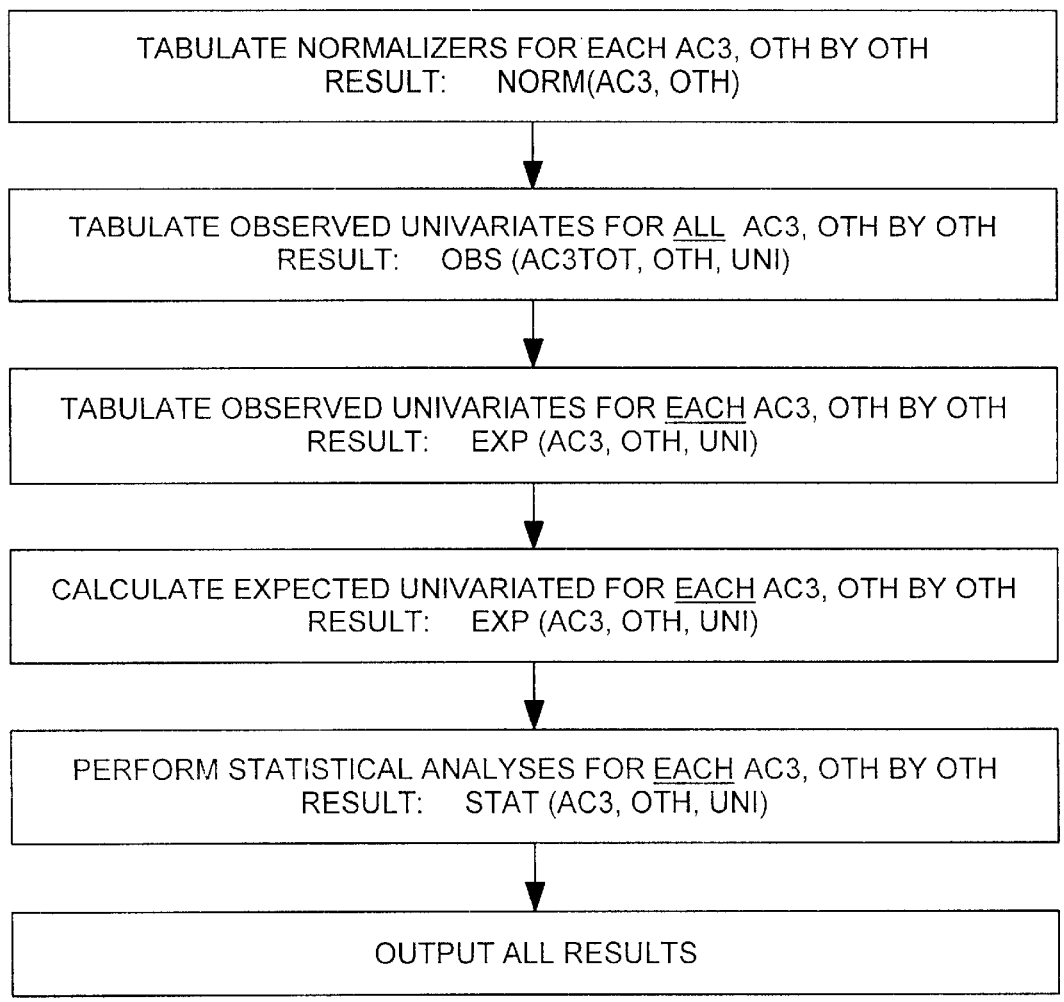
Figure 7B:
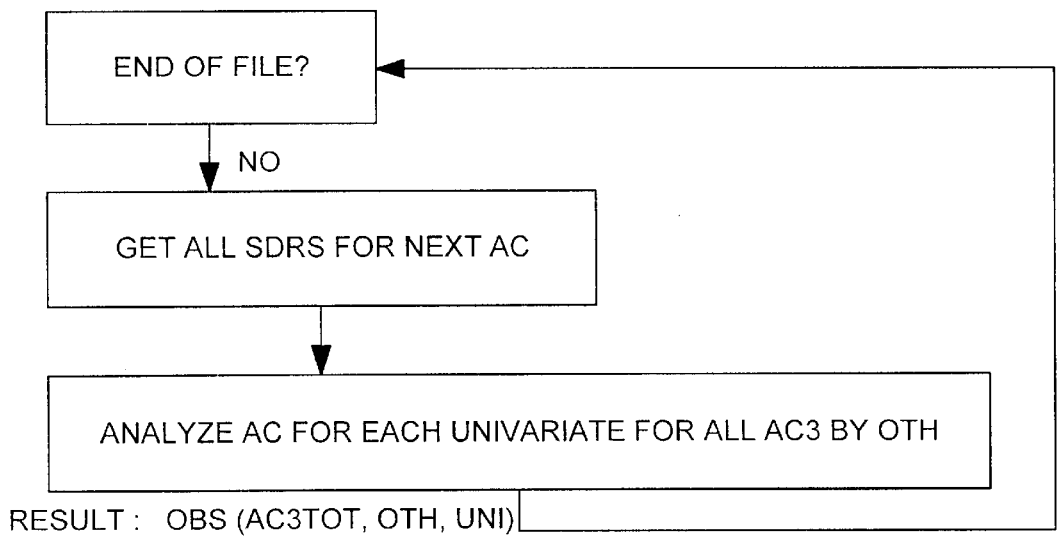
Figure 7C:
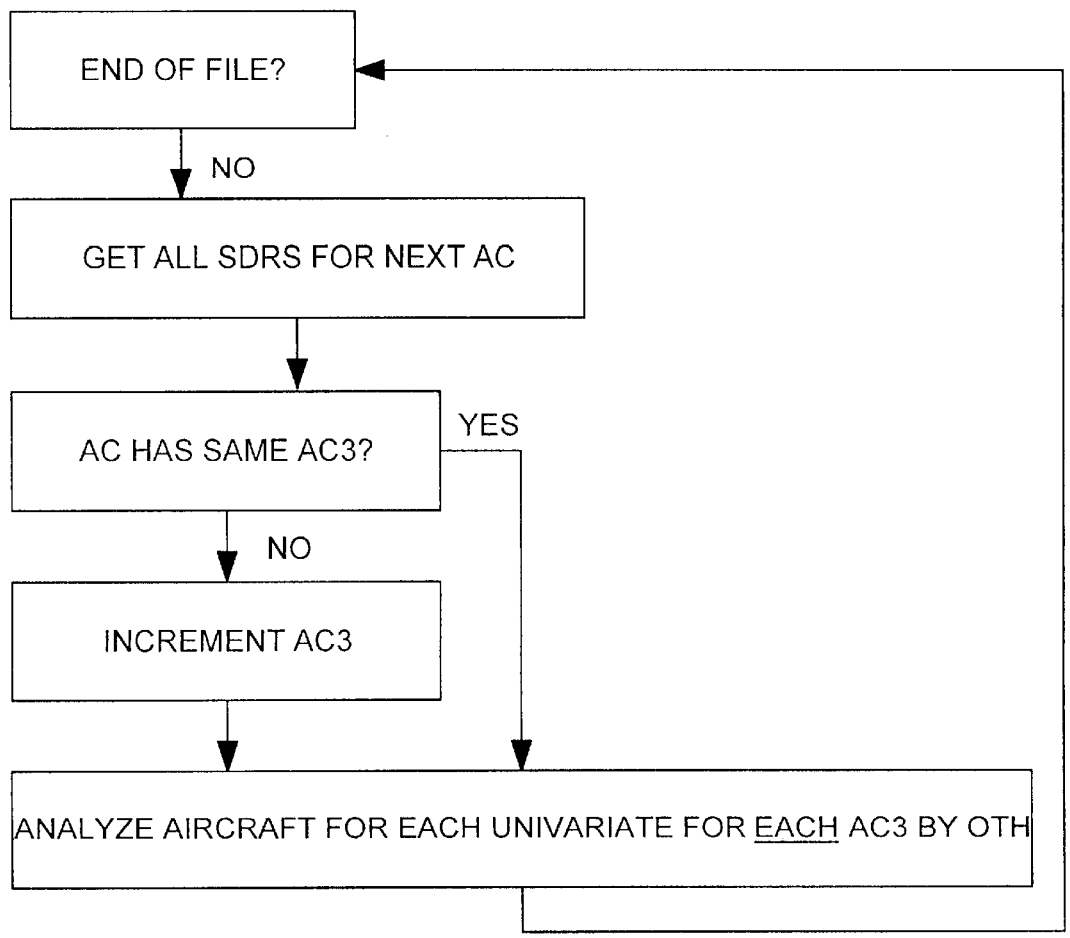

A variate is defined to be exceptional if the aircraft-centric measurement for that variate is higher in the standard period compared to a user-defined minimum number of comparison periods. In other words, the variate's aircraft-centric measurement is "exceptionally high" (from the perspective of the standard period). An exceptional aircraft is considered to be an aircraft identified in the standard period and having any such exceptional variate. A variation of this exceptionality determination involves using the term "lower" instead of "higher" in the aforementioned description. In other words, for this variation the program searches for exceptionally low aircraft-centric measurements of variates (from the perspective of the standard period). The GUI interface of the analyses component 300 allows the user to toggle between these two exceptionality rules. The flow chart of FIG. 6a shows the steps performed by the surveil module 310 to count univariate and bivariate fields and the flow chart of FIG. 6b shows the steps performed to identify exceptional univariates and bivariates. With reference to FIGS. 6a and 6b, FIG. 6c illustrates the manner by which moving averages are formed from comparison periods and FIG. 6d illustrates the relationship between standard and comparison fields. In FIGS. 6a–6c a moving average is a user defined multiple (minimum of two) of consecutive comparison periods.

With respect to two adjacent comparison periods, a system default dictates that the earlier period finishes one day before the later period starts. The user may override this default via the GUI interface of the analyses component 300 so that the earlier period finishes exactly the same day the later period starts. In such latter case, however, the same SDR may be counted twice, in two different comparison periods, particularly if the SDR straddles the two periods. Another available option is to stagger the comparison periods so that there is an overlap between one comparison period and the next.

A comparison between variates is made as follows. A distribution, by either model or operator, of the foregoing univariate or bivariate tabulations is determined for output. Various statistical calculations are made on four aircraft-centric measurements (SDRs, Acs, repeats and intervals) for each variate. The SURVEIL module 310 also tabulates for output the activity history for aircraft and aircraft with reports in a standard period for variates not seen in any comparison period.

The STANDARDIZATION analysis module 320 standardizes SDR and aircraft data as between different operators, taking into account the differences in model mix and traffic pattern for each operator using an algorithm according the following. For leach time period the following steps are performed:

1. Normalizing data based on traffic patterns (e.g. miles, departures, aircraft hours, aircraft days or ramp to ramp hours) is tabulated in a 2-dimensional array (with subtotals for each column or row stored in appropriate array cells);

2. For each univariate/bivariate characteristic observed data (SDR, AC or REPEAT) is tabulated in a 2-dimensional array (operator by model) and subtotals for each column or row are stored in appropriate array cells;

3. For each operator and for each univariate, an aircraft-centric measurement is calculated as follows:
   i) calculate ratio (R) of normalizing data for each model divided by normalizing data for all models; and,
   ii) for each model, expected variate=R multiplied by the observed variate for all operators;

4. For each operator and for each variate characteristic the priority and statistical confidence limits are calculated as follows:
   priority=observed—expected
   lower confidence=(multiplier—square root of observed)$^2$
   upper confidence=(multiplier+square root of observed)$^2$
   lower confidence limit=lower confidence/expected
   upper confidence limit=upper confidence/expected
   The multiplier is adjusted for multiple comparisons in accordance with the well-known Bonferonni method.

5. The foregoing calculations and results are output in tabular and/or graphical format.

FIGS. 7a, 7b, 7c and 7d are flow chart diagrams showing the steps performed by the STANDARDIZATION module 320 for standardizing variates for measurements of SDR, AC, repeats and intervals. The time period of interest used by this module is the same as the first time period of the selection filter component 200. If desired, however, the illustrated algorithm could be modified to cover more time periods (such as if, for example, the user is interested to perform a standardization over a longer period of time say two or more years). As shown by these flow charts module 320 performs a standardization process for standardizing all AC3 values (i.e. for all eleven major airlines) and all OTH values (i.e. models). If desired, these steps may be modified to standardize using a specific subset of ACs (as in standardizing using nine major airlines, not all eleven) and/or a specific subset of OTH. These flow charts show the steps of standardizing AC3 based on OTH data and this, also, may be modified if desired to standardize OTH based on AC3 data (in which case all references to AC3 and OTH in the flowchart would be replaced by OTH and AC3, respectively). The STANDARDIZATION module 320 can also be applied to normalize other data such as the age of an aircraft fleet.

The TROHOC module 330 compares the performance of various aircraft models and peer aircraft (defined as aircraft of the same model which were manufactured in the same time period). The name "trohoc" used by the inventors for this component is derived from the word "cohort" in that it is the reverse spelling of "cohort" and the reverse of the cohort process. A cohort is a group that is assembled together and followed forwards (into the future) over a period of time. For example, a cohort of patients can be followed through a course of treatment starting from the present and be monitored over time into the future. A trohoc, as referred to herein, is this cohort process performed in reverse. Specifically, the trohoc process provides that after a specified event, the previous histories of those objects which are affected by or involved with the event are compared with the previous histories of those objects which were not affected by or not involved with the same event.

The TROHOC module 330 compares SDR data between one aircraft and a group of peer aircraft and the comparison group are of the same model/version, age and operator, when numbers permit. For accident purposes, activity is considered for data from the earliest SDR for the accident aircraft until the date of the accident itself. The comparison group is selected on the basis of having SDRs before the earliest SDR for the accident aircraft and SDRs after the date of the accident. SDR reports are analysed for the same time period i.e. between the date of the earliest SDR for the accident aircraft and the date of the accident and, therefore, there is exactly the same time exposure for the accident aircraft and the comparison group.

Figure 8A:
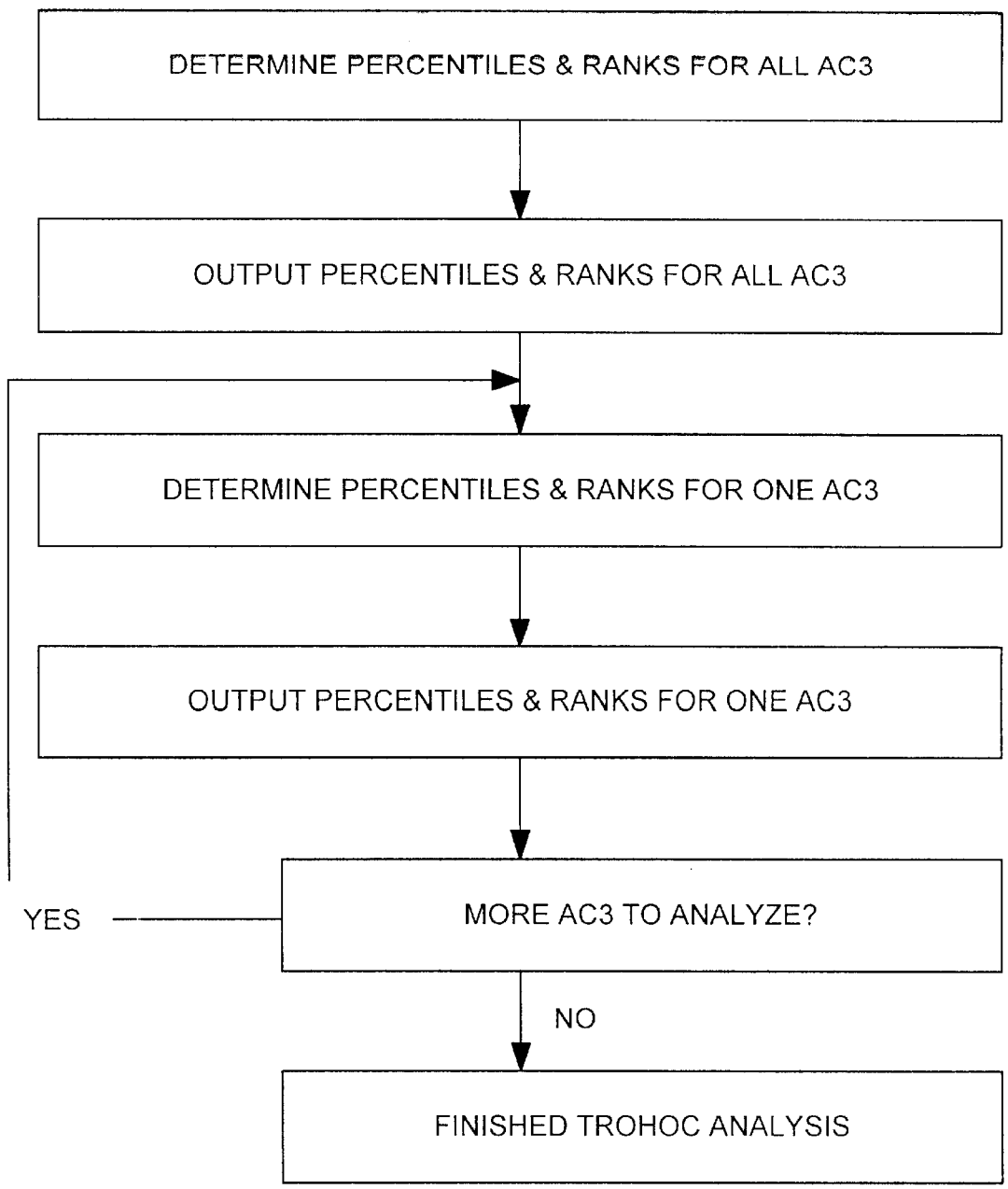
FIGS. 8a and 8b are flow chart diagrams showing steps performed by the TROHOC module 330.
Figure 8B:
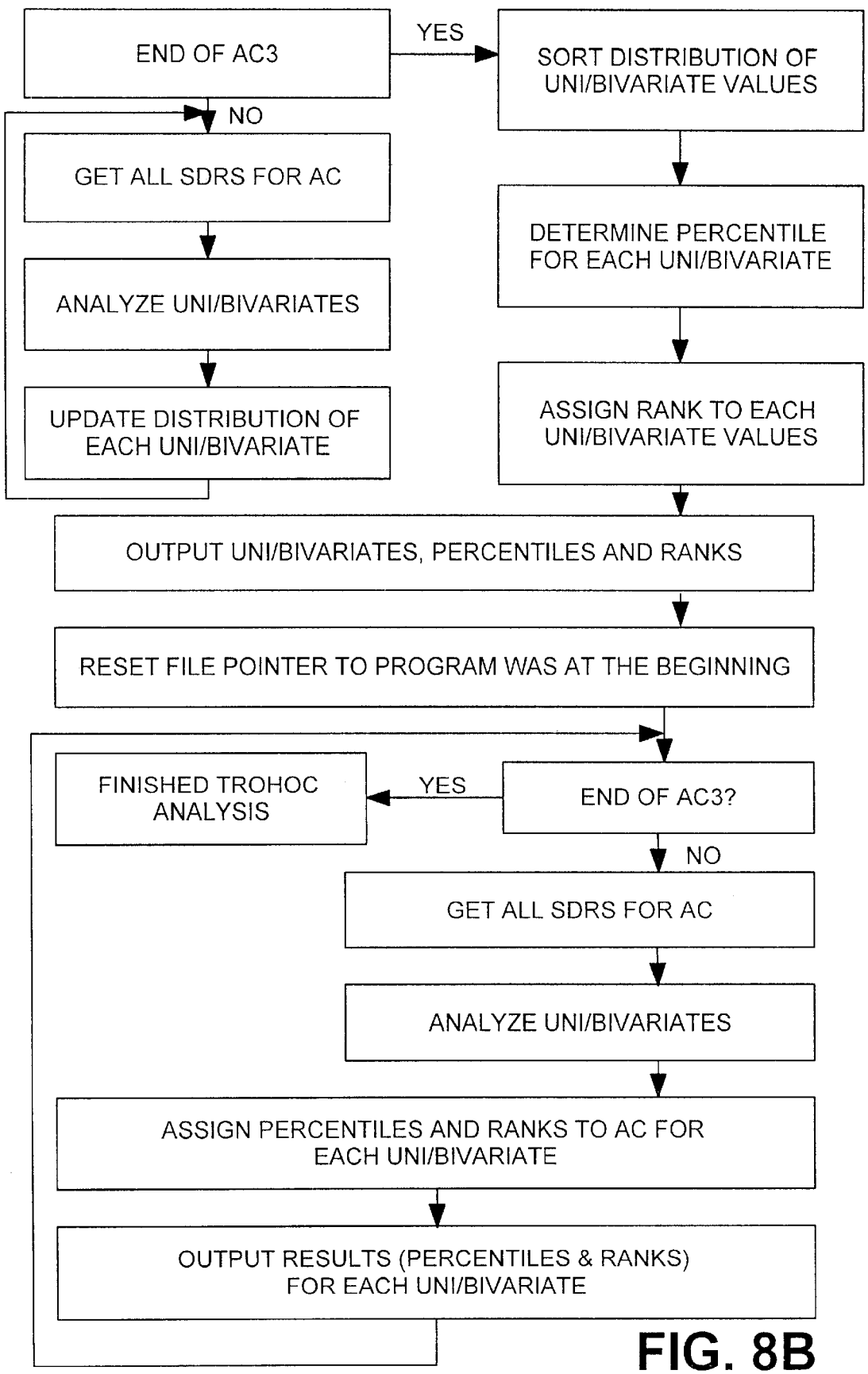

As illustrated in FIGS. 8a and 8b, the TROHOC module 330 calculates rank and percentile values for each aircraft for each variate relative to all aircraft. An exceedance percentage value is selectable by the user, for example 75%, and this value identifies the number of variates for which each aircraft exceeds other aircraft. For an individual aircraft a determination is made of the number of variates above the selected exceedance value and the number of exceedances calculated for that aircraft are output for the user whereby the number of exceedances for a specific aircraft is provide for statistical comparison with an exceedance distribution calculated for the comparison group. Such comparisons can also be applied to non-accident situations (e.g. for a comparative assessment of one model with others or of an aircraft proposed for purchase with others).

Using the outputs of the SURVEIL and TROHOC modules 310, 330 statistical norms are determined. The user specifies the level for which norms are desired. For example, the norm may be that achieved by 90% or less of aircraft or the norm may be that achieved by 99% of aircraft. The highest values found in the user-defined percentage of aircraft are determined for each variate for specific aircraft models: (i) the number of SDR's per year; (ii) the mean time between occurrences; and, (iii) the number of repeat occurrences in a user-specified number of days (for example, 30 days). These norms are useful to provide benchmarks for identifying 'exceptional' aircraft.

Figure 9:
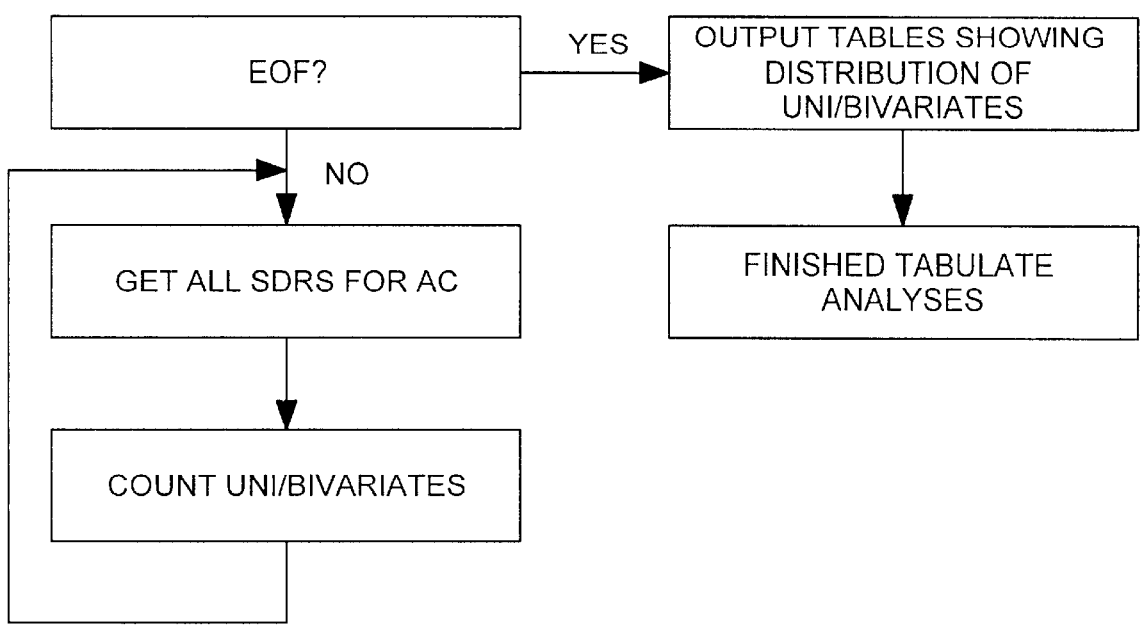
FIG. 9 is flow chart diagram showing steps performed by the TABULATE module 340.

The TABULATE module 340 is provided to enable any operator (whether US or foreign) to apply U.S. statistical norms to identify exceptional aircraft in its own fleet of aircraft. This module provides authoritative data for assessing the mechanical reliability of an operator's fleet and provides confidentiality in that a foreign operator may utilize this module without having to divulge its own data on occurrences of mechanical problems, defects or malfunctions affecting safety. As illustrated by FIG. 9 the steps performed by this module include the following:

1. Input data is received from the user (through the GUI), namely, the number and type of models in the user/operator's fleet and the level of statistical rarity sought.
2. The Service Difficulty Reports for the same models are analysed.
3. A data file is generated from the analysis for that user/operator.
4. Further input data is received from the user/operator in the form of a filled-in table for each of the variates in which they have interest.
5. The values expected for each variate are calculated from the US statistical norms (as identified above the values are the number of SDR's per year, the mean time between occurrences and the number of repeat occurrences in a user-specified number of days such as 30 days).

The ALF module 350 identifies related SDRs on the basis of user-specified criteria including kind, nature of condition, precautionary procedure, severity, stage of operation, the time between DOD and DOR, year built, ATA 2 CHAR, ATA 4 CHAR and a key word search. SDRs meeting the user-specified criteria are classified as related SDRs while those that do not are considered to be unrelated. An episode is defined by the module to be a collection of related SDRs for which each pair of subsequent related SDRs are a given number ("x") of days apart or less (and the "x day" period is referred to as a demarcation period). The length of a demarcation period is measured by user selected time units (TU's) by days, weeks, months, quarters and/or years. The demarcation periods (also referred to herein as windows) have various starting and ending points and hence various lengths. All windows are user definable and can have "a" number of time units (TU) in days, weeks, months, quarters or years, "b" number of SDRs, "c" number of related SDRs (i.e. excluding unrelated SDRs), "d" number of unrelated SDRs (i.e. excluding related SDRs), "e" number of episodes up to and including the day immediately before the xth episode starts, "f" number of episodes up to and including the day the xth episode starts, "g" number of episodes up to and including the day the xth episode ends. Further, a window can start or finish at the following points (for any of the foregoing lengths): an arbitrary date, nth SDR, m TU before/after nth SDR, nth last SDR, m TU before/after nth last SDR, nth SDR before/after an arbitrary date, m TU before/after nth SDR before/after an arbitrary date, mth SDR of the nth episode, mth SDR of the nth episode before/after an arbitrary date, mth SDR of the nth episode before/after an arbitrary date, k TU before/after mth SDR of the nth episode, k TU before/after mth SDR of the nth episode before/after an arbitrary date, whereby the values of the dates, k, m, n and x are user-definable and selectable.

Figure 10A:
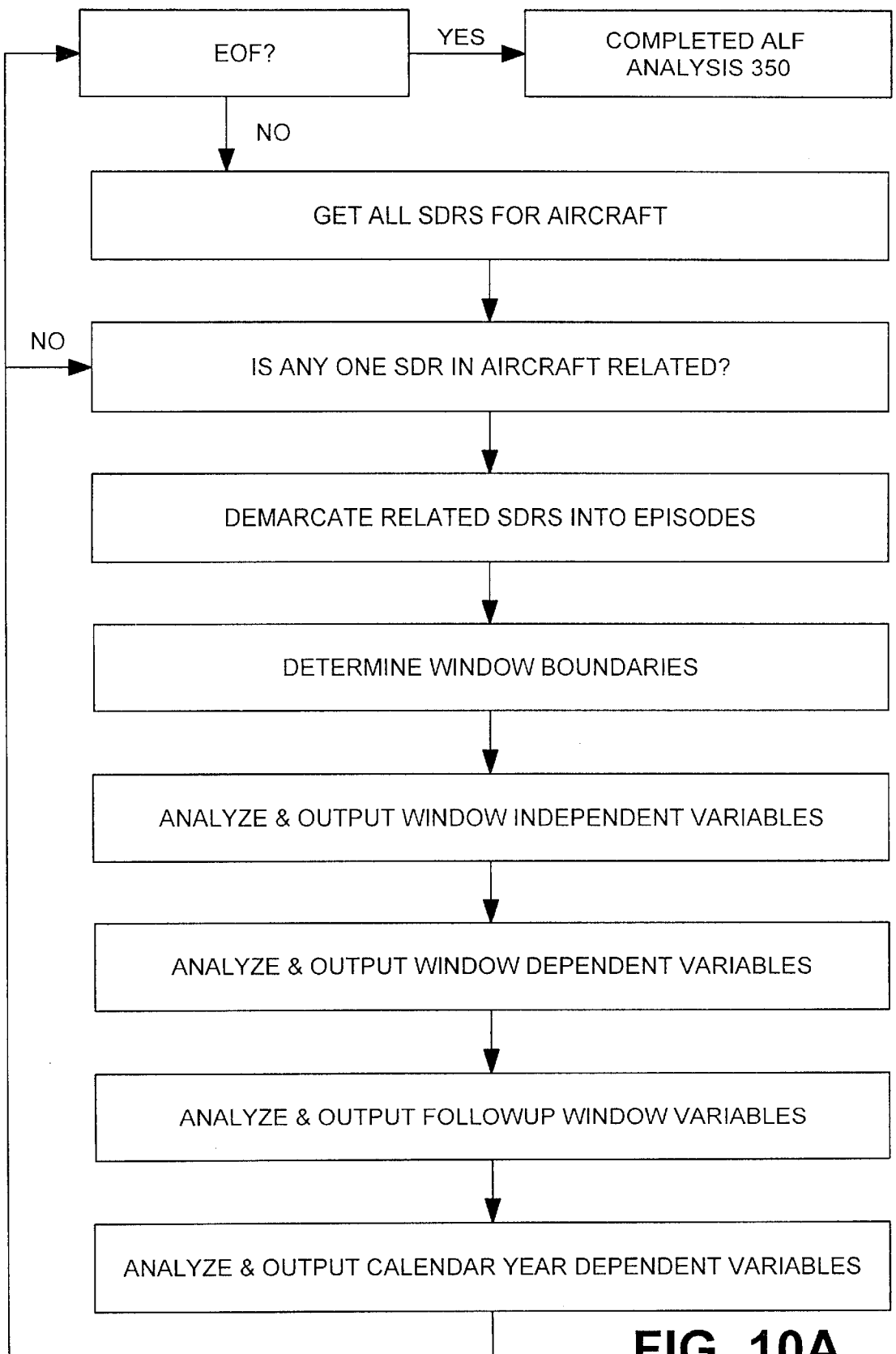
FIG. 10(a) is a flow chart diagram showing steps performed by the ALF module 350 and FIGS. 10(b) and 10(c) display an exemplary descriptive listing of output produced by this module.

As illustrated by FIG. 10(a) the ALF module 350 performs analyses on the basis of SDRs, ACs, episodes and windows. FIGS. 10(b) and 10(c) display a descriptive listing of sample output produced by the ALF module.

Figure 11A:
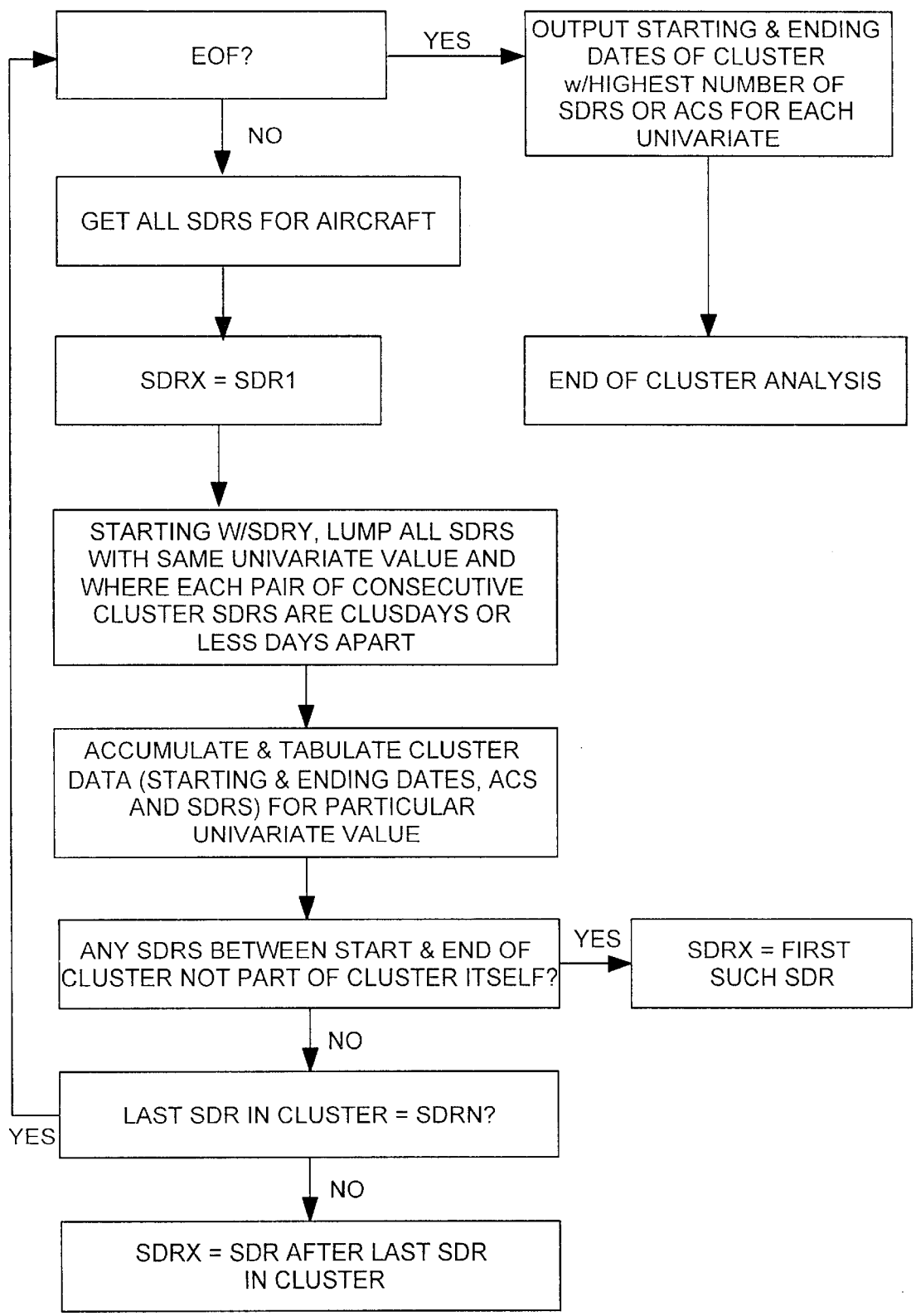
FIGS. 11a and 11b are flow chart diagrams showing steps performed by the CLUSTER module 360, with FIG. 11a providing an overall view of the process and FIG. 11b providing a more detailed view thereof.
Figure 11B:
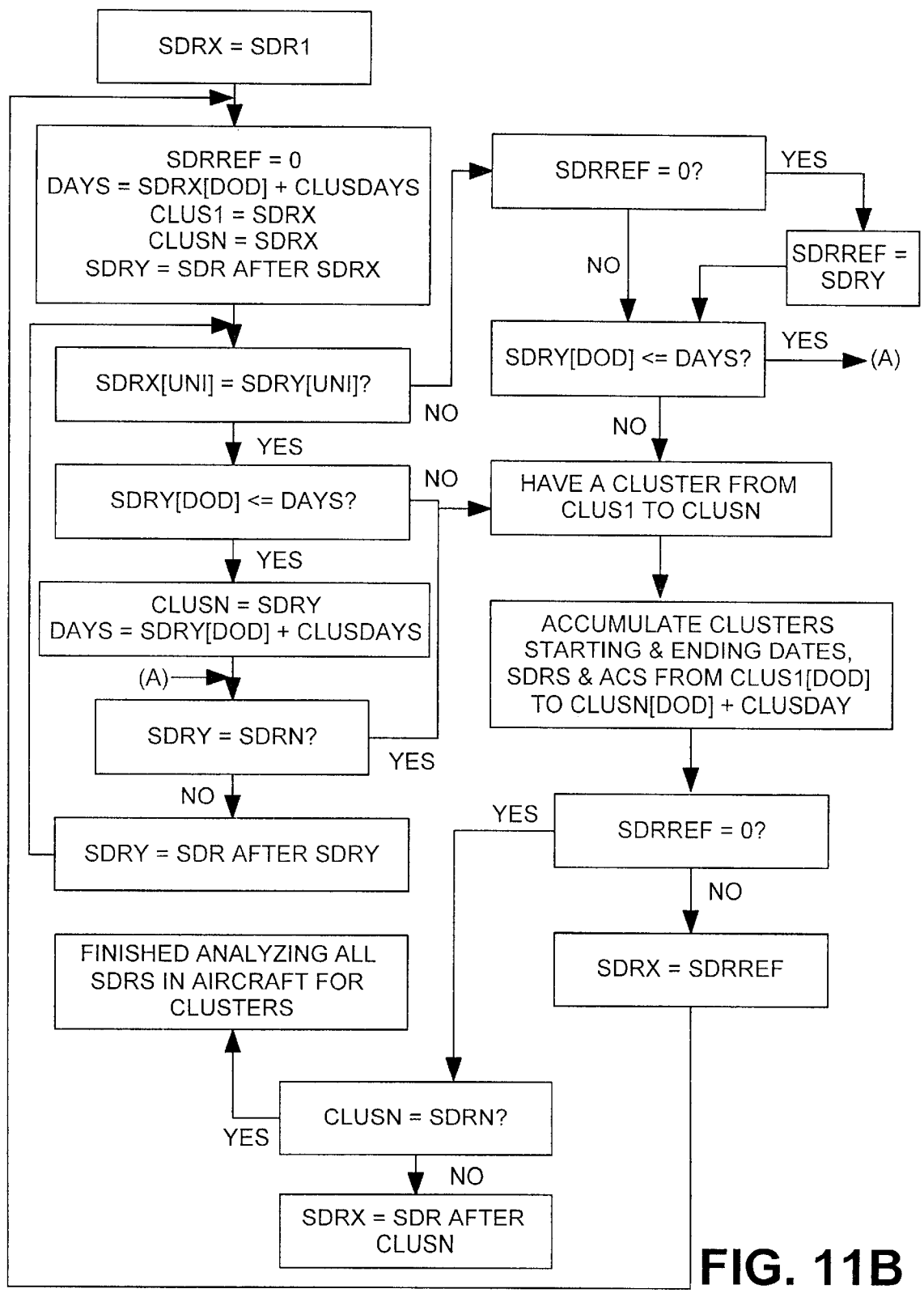

The CLUSTER module 360 identifies a statistically unusually high number of mechanical problems and/or incidents within relatively short periods of time, the length of which is user defined and specified, the steps performed by this cluster being illustrated by FIGS. 11a and 11b. A cluster is defined to be a number of SDRs (minimum of one) with the same variate where each SDR is no more than a user selectable number of days away from its subsequent SDR. For example, if each cluster is defined to be three days long, the aircraft covered by Table 12 below would have the clusters shown in Table 13 below. For the data of this example, the module determines and outputs "May 05–07, 1998" as the aircraft's cluster since this particular cluster contains three SDRs and three is more than any other cluster. Similarly, the module determines and outputs for each uni/bivariate the cluster having the highest number.

TABLE 12

| SDR Sequence | SDR DOD |
|---|---|
| 1st | May 01, 1998 |
| 2nd | May 02, 1998 |
| 3rd | May 05, 1998 |
| 4th | May 06, 1998 |
| 5th | May 07, 1998 |

TABLE 13

| Cluster (each 3 days long) | Number of SDRs |
|---|---|
| May 01–03, 1998 | 2 |
| May 02–04, 1998 | 1 |
| May 03–05, 1998 | 1 |
| May 04–06, 1998 | 2 |
| May 05–07, 1998 | 3 |
| May 06–08, 1998 | 2 |
| May 07–09, 1998 | 1 |
| May 08–10, 1998 | 0 |

Figure 12:
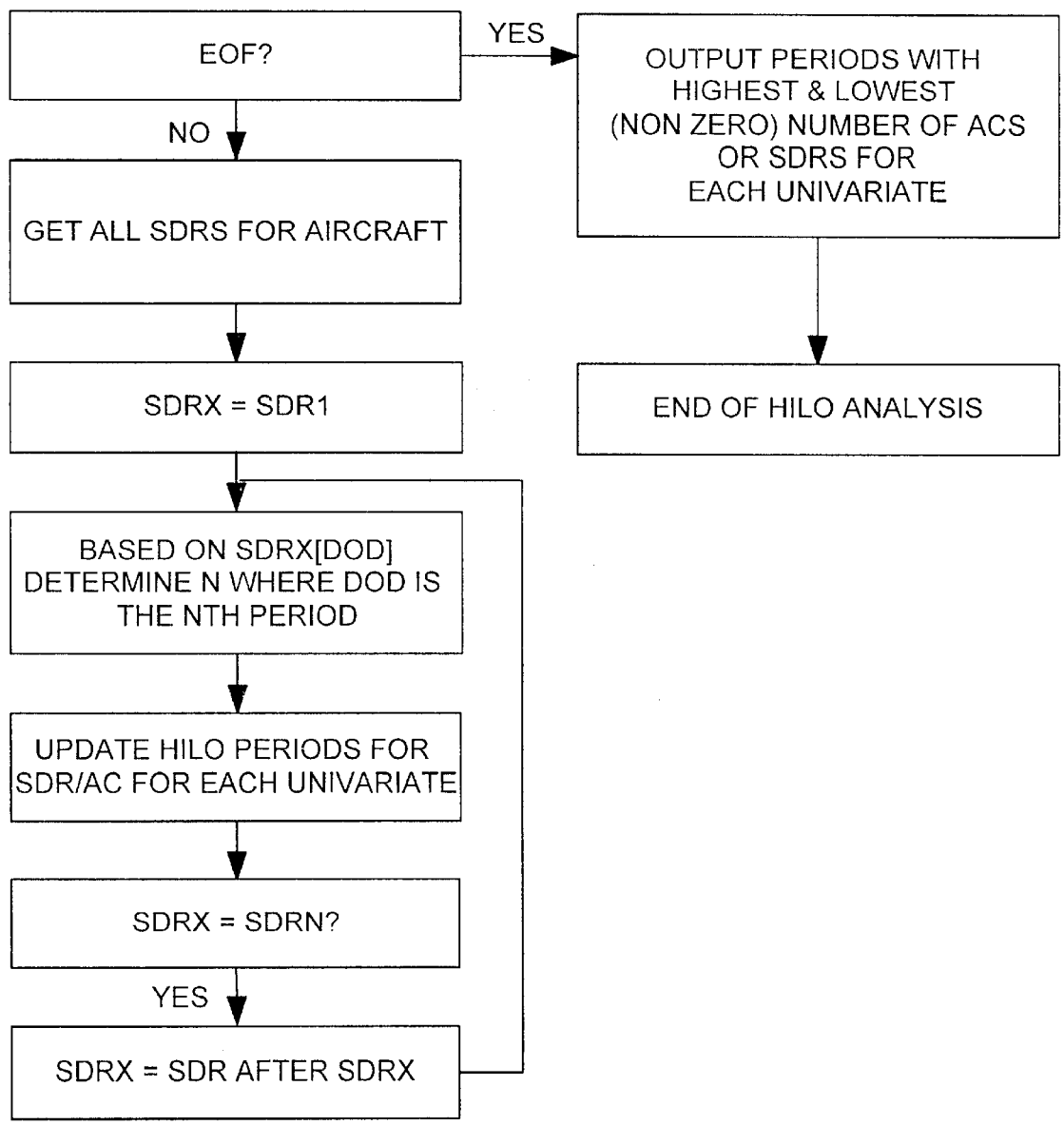
FIG. 12 is a flow chart diagram showing steps performed by the HILO module 370.

The HILO module 370 determines from all aircraft in the intermediary file 250 the high and low numbers of SDRs over relatively long periods of time, and the steps performed by this module are illustrated by FIG. 12.

Figure 13:
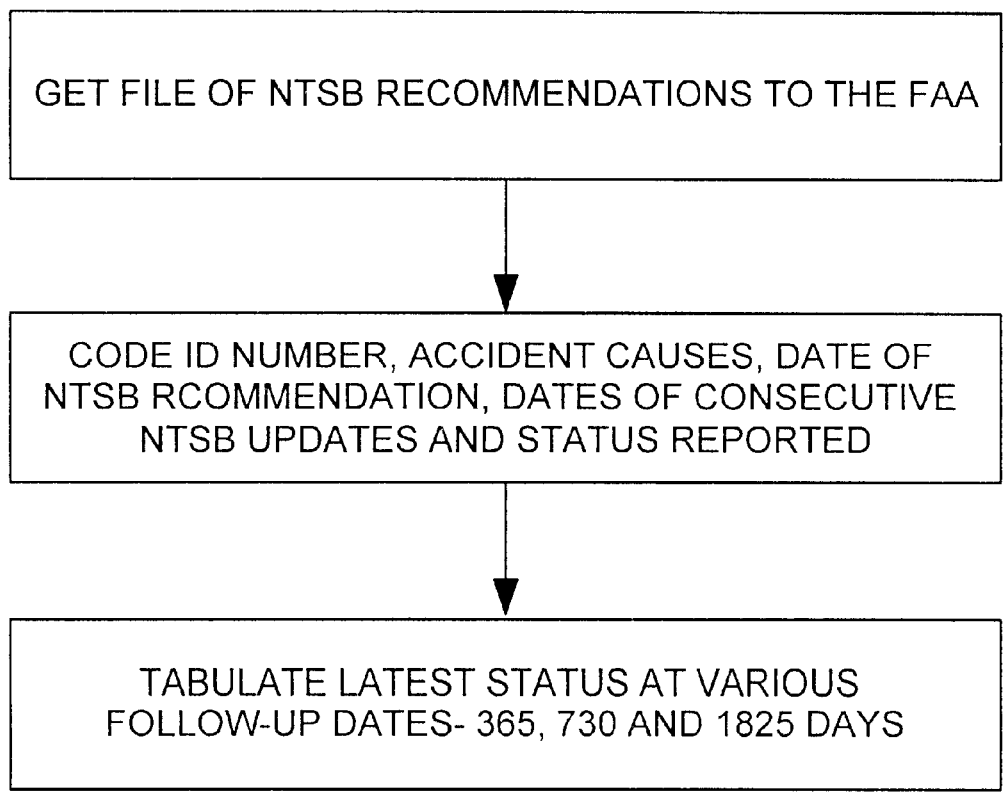
FIG. 13 is a flow chart diagram showing steps performed by the RCO module 380.

The National Transportation Safety Board (NTSB) investigations of accidents and major incidents result in recommendations. A cumulative database of NTSB recommendations to the FAA since 1963 is available to the public and this database includes the date of the occurrence, the date and identifying number of the recommendation, the date and content of the FAA responses, the NTSB assessments of the response as acceptable or unacceptable and whether the NTSB considers the issue open or closed. This database covers all recommendations and their status at successive periods (i.e. 1, 2 and 5 years). The RCO module 380 analyses this data and outputs, in a standardized format, the time trends relating to the numbers of recommendations and also the status of the recommendations (either open or closed and satisfactory or unsatisfactory). This module also systematically compares short term and long term results. FIG. 13 is a flow chart illustration of steps performed by the RCO module 380.

Operators vary in the extent and nature of the problems they report and this is referred to herein as being variability in the diligence of reporting. The DILIGENCE module 390 systematically quantifies the diligence of operators. The following is a description of the operation of this module:

1. The source data used by this module is a TROHOC output file (i.e. produced by the TROHOC module 320) which summarizes the reports for each aircraft.
2. The module considers six variables for each aircraft which reflect the operator's level of carefulness and regularity in preparing SDR's:
   (a) PEMULT—the extent of multiple responses. The report form has 4 fields for Precautionary Procedures and 3 fields for Nature of Condition. More diligent operators will tend to complete more than one field.
   (b) SEVOCCUR—the proportion of more severe occurrences. More diligent operators will tend to submit not only more severe occurrences but less severe occurrences. There are two components:
      i) Ratio of unscheduled landings to all precautionary procedures.
      ii) Ratio of more severe part defects (detailed in the "Severity" variable) to all part defects.
   (c) CDBIGNO—the intensity of reporting maintenance checks. The "D check" is a major check every three-and-a-half years during which aircraft are essentially taken apart and put back together with many components replaced. This value is determined from the largest number of inspection/maintenance reports submitted in any 60-day period.
   (d) SDRLONGINT—The longest interval between the dates of two consecutive SDR's.
   (e) DAYSTOEND—The number of days between the date of the latest SDR submitted and the end of the period analyzed.
   (f) PROPAC—The proportion of all aircraft for which any SDR is submitted.
3. The statistical distributions for each of these variables are calculated and cut-off points are determined from the tails of the distributions. Scores, based on these cut-off points, are assigned to each of the 6 variables for each aircraft.
4. The scores for each aircraft are summed.
5. The distribution of scores for all aircraft for a specific operator is calculated.
6. The score distributions (median and variance) are used to calculate rankings for each of the operators (i.e. the ranks being low, medium and high diligence).

Figure 14:
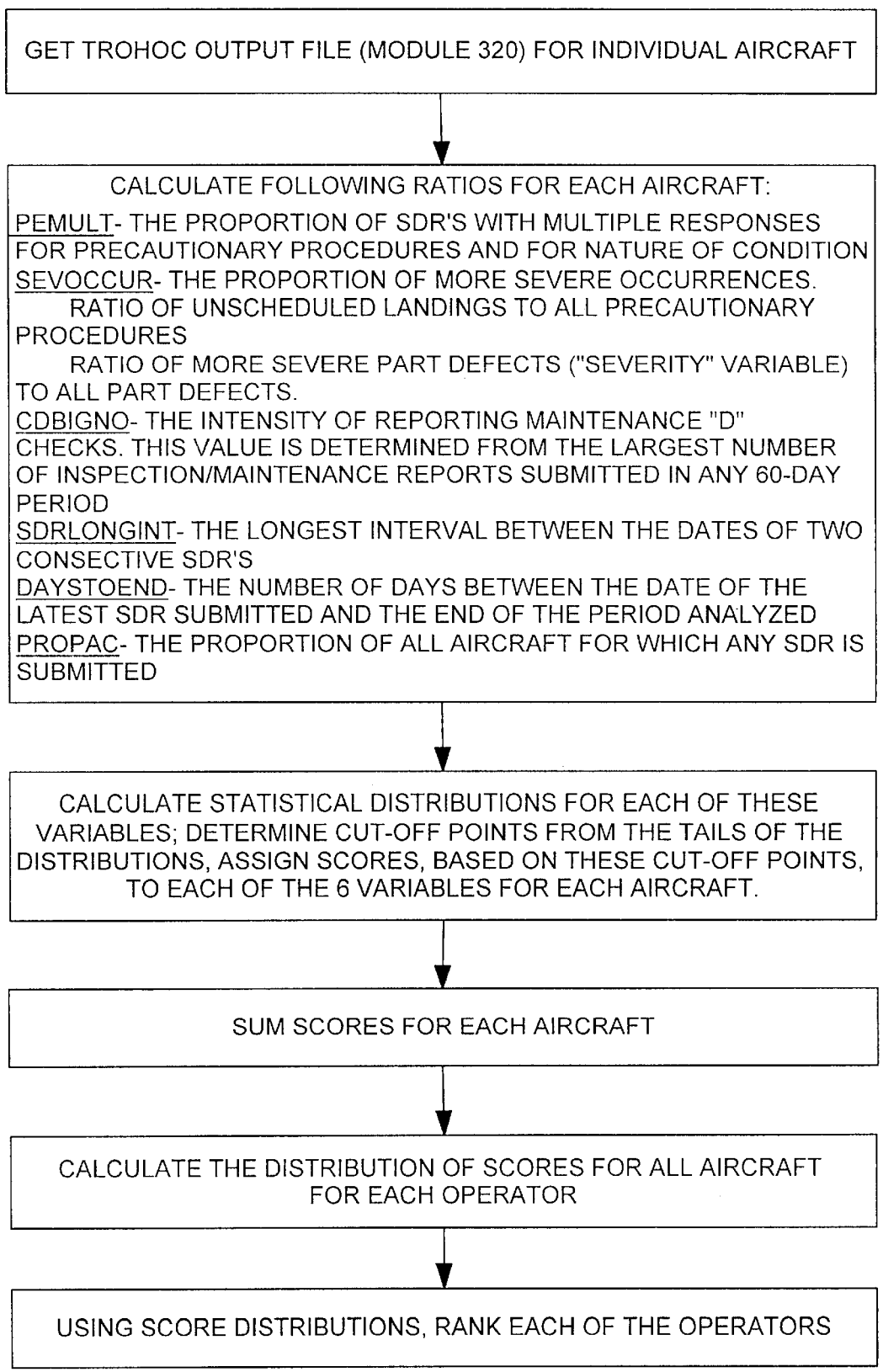
FIG. 14 is a flow chart diagram showing steps performed by the DILIGENCE module 390.
Figure 15:
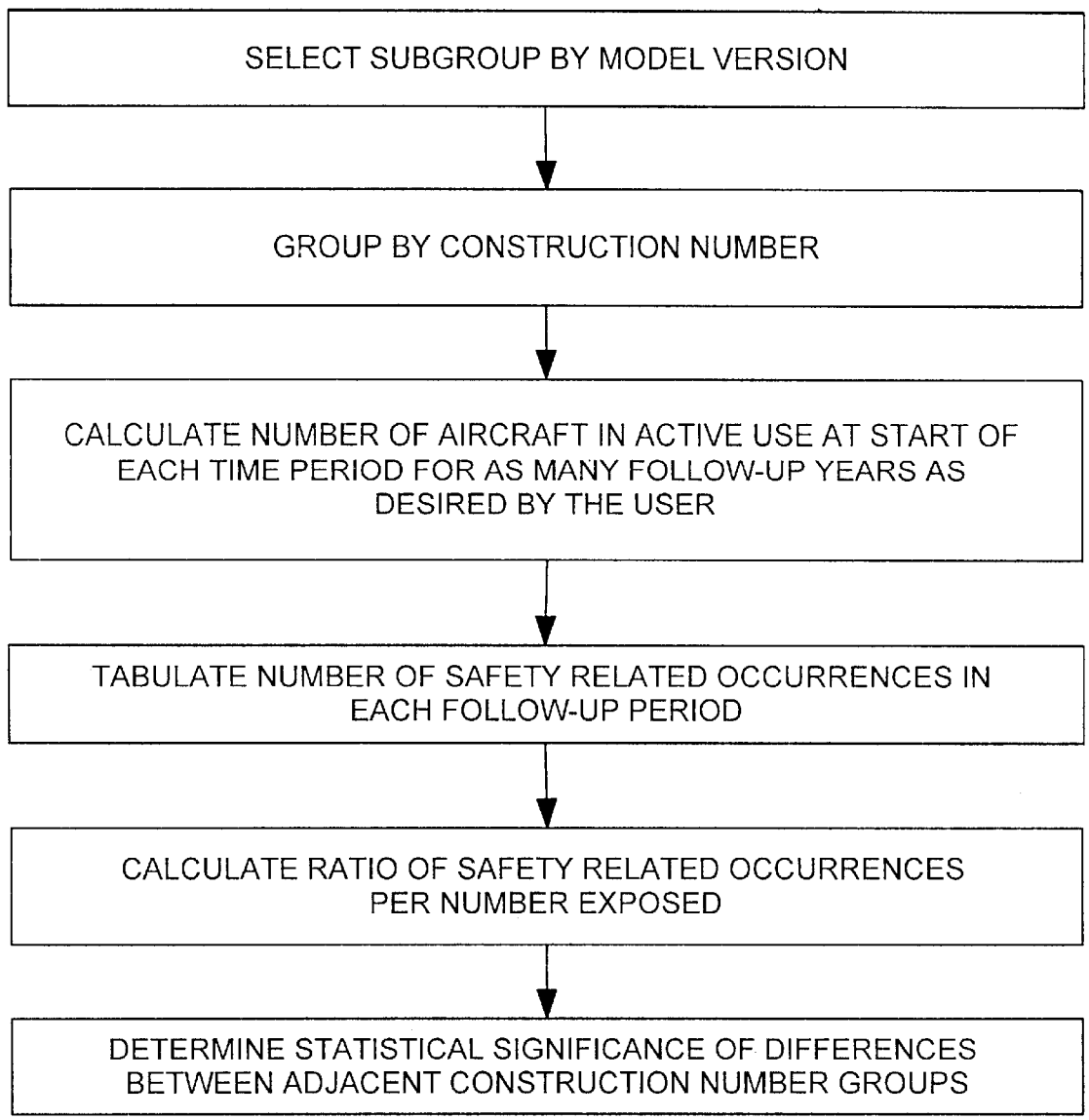

FIG. 14 is a flow chart illustration of steps performed by the DILIGENCE module 390.

The COHORT analysis module 395 counts the number of occurrences in successive time periods for equipment grouped by construction number. This module is used to address the fact that production line problems may affect equipment assembled during the same time period. These problems may be due to either labor unrest or short-term problems in component manufacture or quality control. More specifically, equipment assembled during one time period may be less reliable than equipment assembled in previous or subsequent time periods. Equipment failure may occur at various follow-up intervals, months, years or even decades in the future but the failure may not be directly identified as a cause of a problem since the original defect may contribute relatively early to a multi-factorial causal chain.

Analyses must focus on equipment categorized by their chronological dates on the production line specified by the year delivered or by their construction number. The COHORT analysis module 395 groups aircraft by construction number and examines the number of safety-related occurrences in subsequent time periods. The analysis can be world-wide for accidents (whether total hull-loss or substantial damage). U.S. data can be used for Incidents and for Service Difficulty Reports. The purpose of this module is to detect sub-groups with significantly higher rates of safety-related occurrences in comparison to earlier or later sub-groups. The rates are calculated on the basis of the number of aircraft in active use. Aircraft withdrawn from use are withdrawn from the denominator.

The following steps are performed by the COHORT module 395:

7. Select subgroup: Model version.
8. Group by construction number.
9. Calculate number of aircraft in active use at start of each time period for as many follow-up years as desired by the user.
10. Tabulate number of safety related occurrences in each follow-up period.
11. Calculate ratio of safety related occurrences per number exposed.
12. Determine statistical significance of differences between adjacent construction number groups.

Figure 16A:
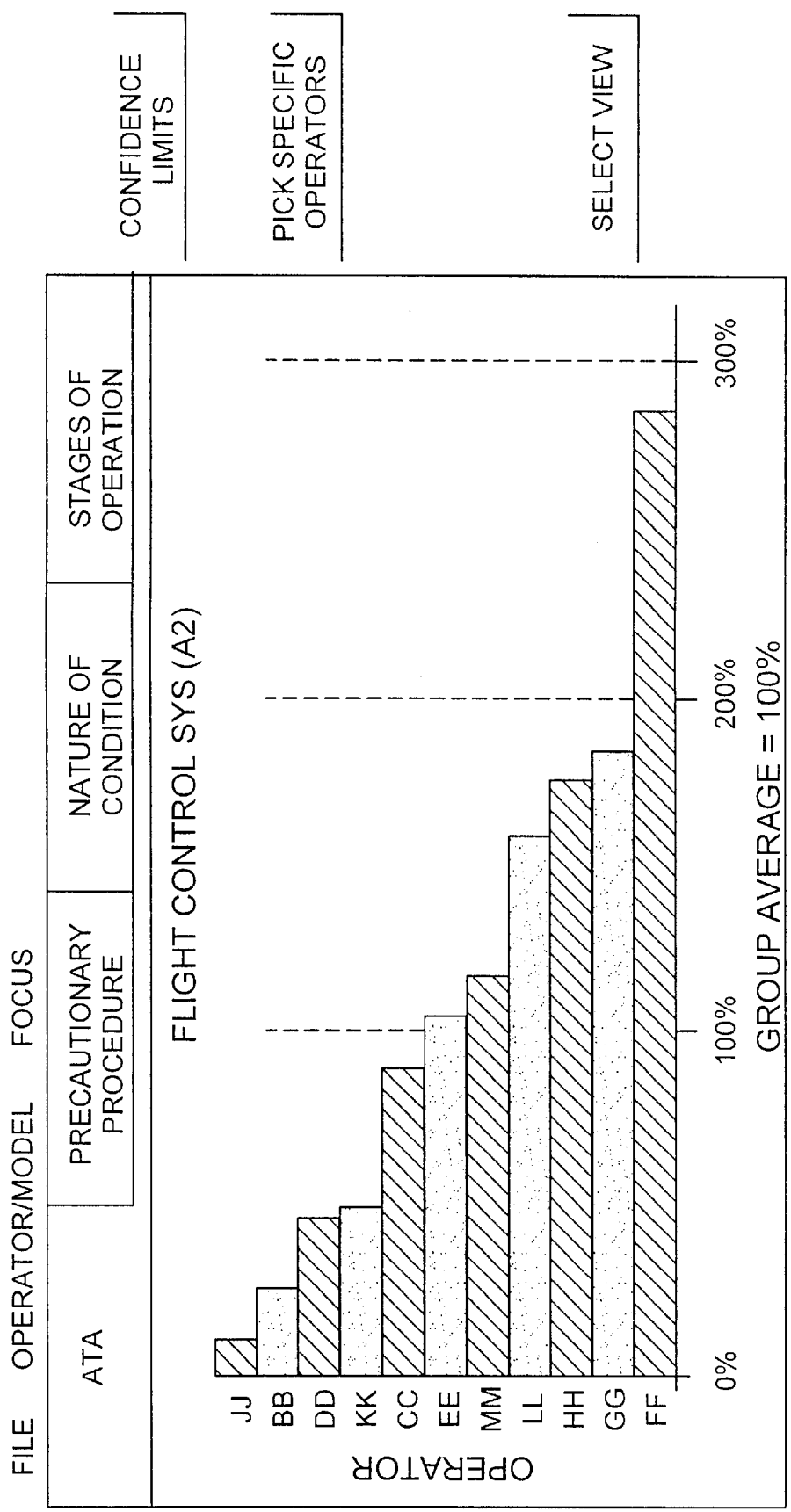
FIG. 16(a) is a single graphic output.
Figure 16B:
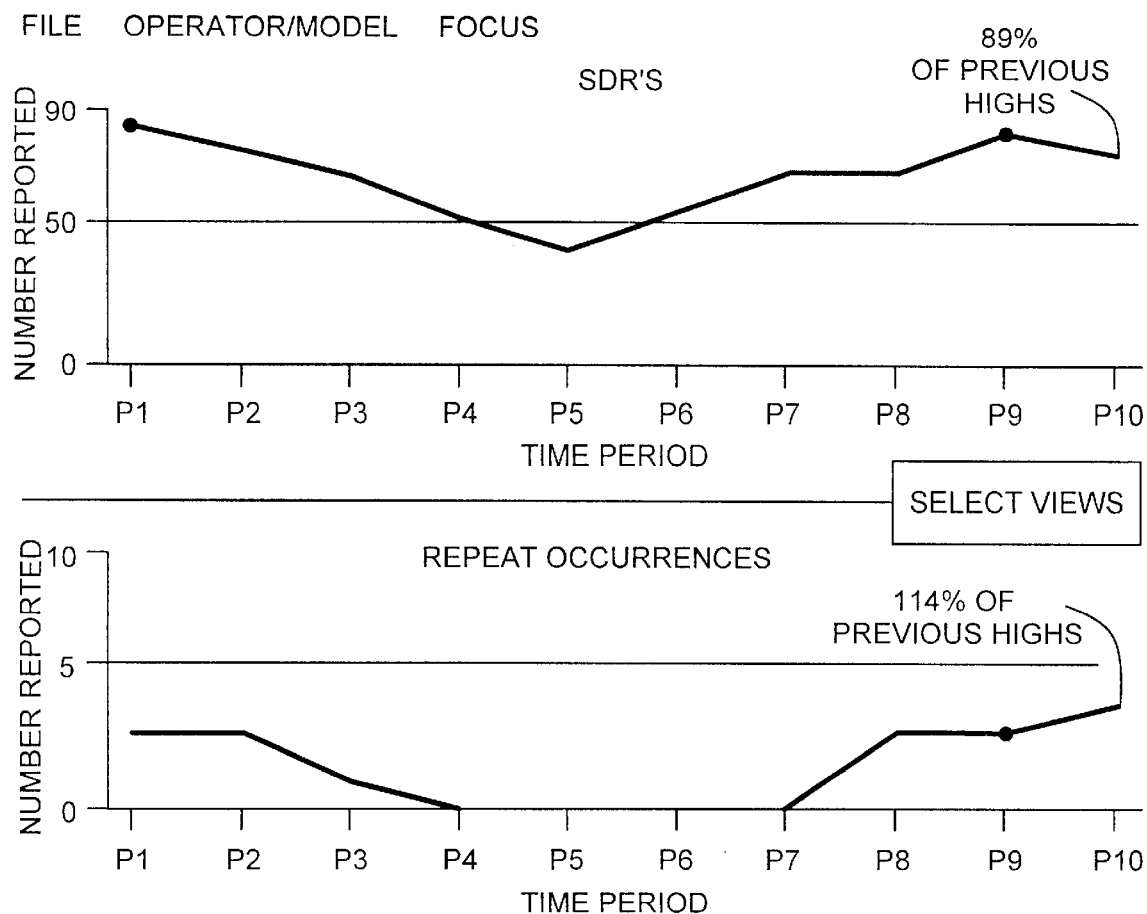
FIG. 16(b) is a two-graph output and FIG. 16(c) is a three-graph output.
Figure 16C:
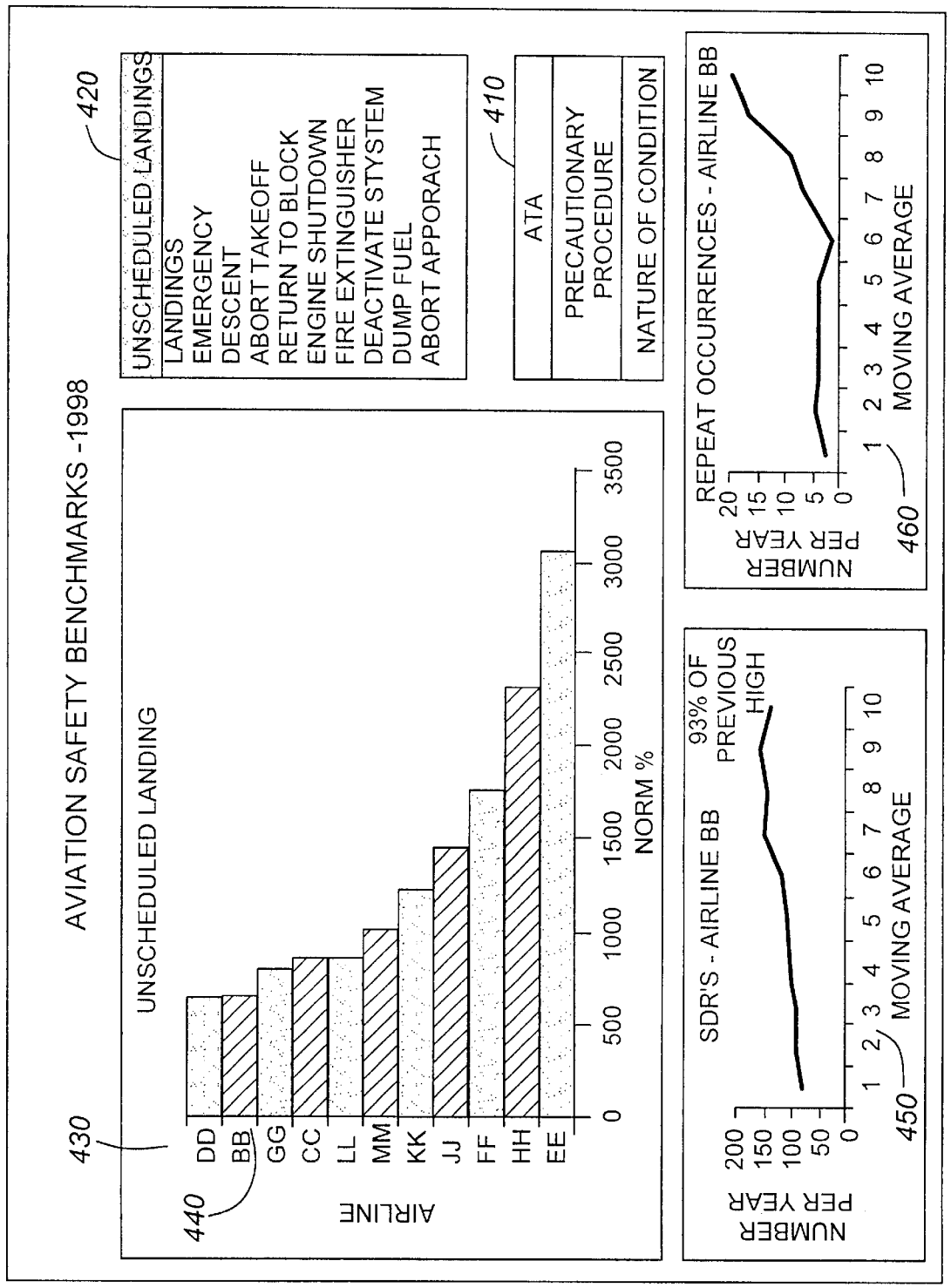

The graphizer component 400 provides the calculated data to the user in tabular, text and/or graphic display form (the latter being produced by condensing large data tables into graphs). A multi-result inter-related graphic display is provided by this component as illustrated in FIG. 16(*c*), in which three separate graphs are shown on a single screen (this number of graphs being suitable for notebook computer screen sizes, but a larger number of graphs could be accommodated by larger screen sizes). The graphizer component provides to the user, within this graphic display, a menu of datasets for selection of a desired dataset (see window 410 which provides a choice of ATA, Precautionary Procedure and Nature of Condition datasets). Corresponding to the selected dataset 410, a further menu of data subsets 420 is provided to the user for selection of a data subset (the selected subset shown being Unscheduled Landing).

The graphizer component generates a graphical presentation (being the main graph) 430 of the global output data set produced by the analyses component 300 for the selected data set and subset. From that main graph 430 the graphizer component receives from the user, by highlighting (i.e. a point and click means of selection), a selection of one or more related data subsets 440 and, in response, generates additional graphical presentations 450, 460 for each such data subset. As shown by FIG. 16(*c*) the additional graphical presentation(s) are displayed together on the same screen display. In preparing the main graph 430 and subgraph(s) 450, 460 for display the graphizer component formats each graphical presentation to an appropriate size and position for collective viewing. As illustrated by FIG. 16(*c*), the main graph 430 shows the ranking of each selectable subgraph data set (e.g. by operator) and the subgraph(s) shows greater detail for specific elements of the selected data subset (i.e. in this illustration, for the selected operator BB).

For the illustrated embodiment, an initial screen is provided to the user which permits the user to select criteria from a number of menus including menus covering Operator/Model (e.g. 11 major operators or 15 models), Focus (e.g. Service Difficulty Reports, Accidents/incidents and Engine reliability), ATA (mechanical component), Precautionary procedure (e.g. unscheduled landing), Nature of condition (e.g. smoke) and Stage of Operation (e.g. take-off). FIG. 16(*a*) shows an output graph generated by the graphizer 400 for a selection by the user of the ATA menu item "Flight Control Sys (A2)", this graph representing data for the "flight control sys" reports by the eleven (11) operators identified within each operator bar (e.g. the second bar from the top representing operator "BB"). In this graph the percentages shown represent the number of smoke reports for each of the 11 operators, normalized by model and number of departures, with the group average being 100%. The two-graph display of FIG. 16(*b*) shows time trends for SDRs and the number of repeat occurrences, wherein the highlighted circle shows the ratio of the latest number to the two previous high numbers (and the two previous high numbers are shown by large dots).

The foregoing description of the preferred embodiment describes aircraft-centric measurements of the present information system and method because the illustrated embodiment relates to the field of analyzing aviation safety data. However, these measurements and analyses can be equally applied to other fields such as health and product safety. For example, a patient may be the object and records of doctors' reports (i.e. from patient visits to doctors or hospitalizations), rather than SDRs, might then form the basis on which analyses are conducted. In the health field, there are multiple sources of data which, without the benefit of the present system and method, are not readily collated to follow the longitudinal side effects, course and outcomes of various medical treatments. The present system and method can thereby provide the surveillance and monitoring means which is needed to detect epidemics or other undesirable outcomes and to identify risk factors.

The terms algorithm, function, module and component herein are interchangeable and are used generally herein to refer to any set of computer-readable instructions or commands such as in the form of software, without limitation to any specific location or means of operation of the same, and without limitation as to the format, style, organization or size of the command sets to be selected for any particular embodiment.

It is to be understood that the specific elements of the information system and method described herein are not intended to limit the invention defined by the appended claims. From the teachings provided herein the invention could be implemented and embodied in any number of alternative computer program embodiments by persons skilled in the art without departing from the claimed invention.

APPENDIX A

DEFINITIONS AND EXPLANATIONS OF TERMS USED IN THE DESCRIPTION HEREIN AND IN THE SYSTEM'S DATA SOURCES

Accident An occurrence associated with the operation of an aircraft which takes place between the time any person boards the aircraft with the intention of flight and until such time as all persons have disembarked, and in which any person suffers death or serious injury or in which the aircraft receives substantial damage. Substantial damage means damage or failure which adversely affects the structural strength, performance or flight characteristics of the aircraft, and which would normally require major repair or replacement of the affected component. Engine failure or damage limited to the engine if only one engine fails or is damaged, bent failings or cowling, dented skin, small puncture holes in the skin or fabric, ground damage to rotor or propeller blades, and damage to landing gear, wheels, tires, flaps, engine accessories, brakes or wingtips are not generally considered "substantial damage".

Accident Rates Accident counts alone are not reliable indicators of the relative safety of airlines/operators, aircraft types, or segments of the air transportation industry because, all other things being equal, an airline with 500 airplanes will probably have more accidents than an airline with 10 airplanes. Similarly, the more frequently used aircraft types would tend to be involved in accidents more than the less frequently used types. The method most commonly used to address these issues is to calculate accident rates in terms of accident counts divided by some measure of aviation activity; i.e., accident counts divided by flight hours, departures, miles, etc.

ASRS (Aviation Safety Report System) A voluntary, confidential and anonymous incident reporting system used to identify hazards and safety discrepancies in the National Airspace System. It is also used to formulate policy and to strengthen the foundation of aviation human factors safety research. It was started in 1976 as a means for the FAA to obtain reports of deficiencies and discrepancies before accidents or incidents occur. Pilots, air traffic controllers, flight attendants, mechanics, ground personnel, and others involved in aviation operations can submit reports to the ASRS when they are involved in, or observe, an incident or situation in which they believe aviation safety was compromised. The FAA provides limited immunity from regulatory enforcement action to reporters as an incentive to report incidents. The ASRS identifies the airport and, since January 1994, the aircraft model, but not the registration, serial number or airline. The program encourages submissions by granting those who file reports anonymity and limited immunity. The ASRS database contains reports submitted from 1988 to present.

ATA Refers to the Air Transport Association Joint Aviation Statistical code (statistical classification) indicating the mechanical component where the difficulty on the aircraft occurred. Also referred to as JASC—Joint Aviation Statistical Code.

ATC Refers to air traffic control.

BTS Bureau of Transportation Statistics (USA).

Category of Operation Aviation operators are categorized by the federal regulation that govern their conduct. The major categories in the NTSB database are:
Air Carriers (Scheduled Part 121 and Part 127 operators)
Charter Air Carriers (Non-scheduled Part 121 operators)
Commuter Airlines (Scheduled Part 135 operators)
Air Taxis (Non-scheduled Part 135 operators)

Departures The number of aircraft take-offs actually performed in domestic and international scheduled and non-scheduled passenger/cargo and all-cargo revenue services.

Enforcement Action The FM publishes a quarterly compilation of enforcement actions against regulated aviation entities that are closed with a civil penalty or issuance of a certificate for suspension or revocation. At the end of each quarter of the calendar year, the FAA compiles a data run for all enforcement actions against aviation entities that involve safety and security issues and result in a civil penalty or issuance of a suspension or revocation order. Some security cases may be reported in the quarter following the quarter in which the action was closed. For purposes of this report, cases are considered to be closed after an order has issued that is no longer appealable or when a civil penalty is imposed. However, for other record-keeping purposes in the Enforcement Information System a case is considered closed only after some other event occurs, e.g., payment of a civil penalty or a determination that the penalty is not collectable or, in the case of suspension or revocation, surrender of the certificate.

Engine Utilization/Reliability The air carrier aircraft and engine utilization report covers engine shutdowns and removals identified by air carrier, aircraft model and engine model.

FAA Airworthiness Directives The FM issues alerts about unsafe conditions that are newly discovered. These directives specify the date by which implementation of corrective action is required.

FAA Incident Data System The FM Incident Data System contains incident data records for all categories of civil aviation. Incidents are events that do not meet the aircraft damage or personal injury thresholds contained in the NTSB definition of an accident. For example, the database contains reports of collisions between aircraft and birds while on approach to or departure from an airport. While such a collision may not have resulted in sufficient aircraft damage to reach the damage threshold of an NTSB accident, the fact that the collision occurred is valuable safety information that may be used in the establishment of aircraft design standards or in programs to deter birds from nesting in areas adjacent to airports. The FAA Incident Data System contains events that occurred between 1978 and the present.

Fatal injury Any injury which results in death within 30 days of the accident.

GAO General Accounting Office

Hours Flown The airborne hours in domestic and international scheduled and non-scheduled revenue service, computed from the moment an aircraft leaves the ground until it touches the ground again.

Incident A potentially hazardous event which, although not meeting the aircraft-damage or personal-injury thresholds for an accident (as defined by the NTSB), is associated with the operation of an aircraft and affects or could affect the safety of operations.

JASC See ATA

Longitudinal Analysis By following up individual objects (in this example, individual aircraft).

Miles Flown The miles (computed in airport-to-airport distances) for each inter-airport trip actually completed in domestic and international revenue services, scheduled and non-scheduled. In cases where the inter-airport distances are inapplicable, aircraft miles flown are determined by multplying the normal cruising speed for the aircraft type by the airborne hours.

Model Mix Refers to the factor that no two airlines fly identical aircraft fleets on identical routes. Some tend to fly larger aircraft on long routes while others fly smaller aircraft more frequently on shorter routes.

NASDAC (National Aviation Safety Data Analysis Center) The Federal Aviation Administration (FAA) promotes the open exchange of safety information in order to continuously improve aviation safety. To further this basic objective, the FAA has established the National Aviation Safety Data Analysis Center (NASDAC). It is expected that, eventually, this facility will be made available for use throughout the aviation safety community. The center is currently located in the headquarters building of the United States Federal Aviation Administration. NASDAC works towards simplifying and automating aviation data analysis processes and expands access to data and information.

Nature of Condition Symptoms or problems identified from a Service Difficulty Report and identified by 24 values e.g. warning indicator, fluid loss, etc.

Near Mid-Air Collision (NMAC) An NMAC is an incident associated with the operation of an aircraft in which a possibility of a collision occurs as a result of proximity of less than 500 feet to another aircraft or a report from a pilot or flight crew member stating that a collision hazard existed between two or more aircraft. The NMAC reporting system was revised substantially in 1992.

NTSB The National Transportation Safety Board (NTSB) is a United States independent federal agency charged by Congress with investigating every civil aviation accident in the United States. The NTSB determines the probable cause of accidents, and issues safety recommendations aimed at preventing future accidents. The NTSB accident/incident database contains investigation reports from 1983 to present.

NTSB Safety Recommendations to the FAA With FAA Responses The NTSB makes safety recommendations to all elements of the transportation industry. Recipients of a recommendation have to respond formally to the recommendation and specify what action is or is not being taken and why. There is an NTSB database which contains the aviation safety recommendations, the FAA responses, the subsequent correspondence and NTSB's appraisal of the response. NTSB uses the information it gathers during accident investigations and the determination of probable cause to make safety recommendations to all elements of the transportation industry. While the recipient of a recommendation does not have to implement the proposed action, it does have to formally respond to the recommendation and specify what action is or is not being taken and why. This database contains NTSB's recommendations to the FAA and the FAA's responses. It is an historical record of correspondence between the NTSB and the FAA. The NTSB Safety Recommendations database includes recommendations that were written between 1963 and the present.

Occurrence An event, other than an accident, that affects or could affect the safety of aviation operations and that is investigated by the FAA.

OMEC The Operator/Model Exposure and Costs dataset (used by the standardization analysis module 320).

Operational Deviation (OD) An occurrence where applicable separation minima, as referenced in the operational error (OE) definition below were maintained, but:
  (1) less than the applicable separation minima existed between an aircraft and protected airspace without prior approval,
  (2) an aircraft penetrated airspace that was delegated to another position of operation or another facility without prior coordination and approval,
  (3) an aircraft penetrated airspace that was delegated to another position of operation of another facility at an altitude or route contrary to the altitude or route requested and approved in direct coordination or as specified in a Letter of Agreement, pre-coordination or internal procedure,
  (4) an aircraft, vehicle, equipment, or personnel encroached upon a landing area that was delegated to another position of operation without prior coordination and approval.

Operational Error (OE) An occurrence attributable to an element of the air traffic control system which results in less than the applicable separation minima between two or more aircraft, or between an aircraft and terrain or obstacles as required by Handbook 7110.65 and supplemental instructions. Obstacles include vehicles/equipment/personnel on runways, or aircraft lands or departs on a runway closed to aircraft operations after receiving air traffic authorization.

Operator The individual, firm, or airline that causes the aircraft to be scheduled, moved or dispatched.

Pilot Deviation (PD) The actions of a pilot which result in the violation of a Federal Aviation Regulation (FAR) or a North American Aerospace Defense Command (NORAD) Air Defense Identification Zone (ADIZ) tolerance.

Precautionary Procedure Responds to the urgent condition where there is a concern about the safety of the aircraft or people on board. A precautionary procedure differs from normal procedures, but is less than an emergency or distress procedure which requires immediate assistance due to serious and/or imminent danger. Identified by 15 values eg. unscheduled landing, engine shutdown, etc.

Production Lists These detail aircraft characteristics (serial number, construction number, year built, engines), their operators and current status (in service, stored, written off or scrapped) and are provided in print and electronic form.

RCO Recommendation course and outcomes.

Registration Number An aircraft must be registered to be flown legally in the U.S. The FAA assigns a unique identification number to each registered aircraft called a registration number (commonly referred to a the "N Number" since all U.S. registration numbers start with "N"). The registration number is unique only among the population of currently registered aircraft and may be reused if an aircraft is destroyed or, for other reasons, its registration is allowed to lapse.

Remarks (SDR) Descriptive data provided in a Service Difficulty Report describing the conditions subsequent to or leading up to a reported problem, and may identify the cause for a malfunction and/or the emergency measures executed.

Runway Incursion Any occurrence at an airport involving an aircraft, vehicle, person, or object on the ground that creates a collision hazard or results in loss of separation with an aircraft taking off, intending to take off, landing or intending to land.

Separation Minima The minimum longitudinal, lateral, or vertical distances by which aircraft are spaced through the application of air traffic control procedures.

Serious Injury Any injury which:
  1. requires hospitalization for more than 48 hours, commencing within 7 days from the date the injury was received;
  2. results in a fracture of any bone (except simple fractures of fingers, toes or nose);
  3. causes severe hemorrages, nerve, muscle or tendon damage;
  4. involves any internal organ or;
  5. involves second or third degree burns or any burns affecting more than 5 percent of the body surface.

Service Difficulty Report (SDR) Passenger aircraft of ten seats or more must report the occurrence or detection of each failure, malfunction or defect concerning specified events or anything else that has endangered or may endanger safe operations. The Flight Standards Service Difficulty Program objective is to achieve prompt and appropriate correction of conditions adversely affecting continued airworthiness of aeronautical products, through the collection of Service Difficulty and Malfunction or Defect Reports. The FAA's Service Difficulty Reporting program originated in the early 1970's with the earliest records currently available dating June, 1974.

Severity Identified by 7 values e.g. seldom, uncommon, frequent.

Stage of Operation Used to identify the operation state (i.e. when) and has 18 values e.g. approach, climb, cruise, descent, etc.

Traffic Refers to the Bureau of Transportation Statistics—Airline Traffic Statistics. The airline activity spreadsheet available on the Aviation Safety Information Web site contains, by airline, the number of departures, flight hours and miles performed in domestic and international, commercial service during the most recent five calendar years. These are the activity measures that are used most frequently by government and industry to calculate accident or incident rates for the principal segments of the air transportation system.

Traffic Denominators Factors which take into account the fact that more accidents occur during takeoff and landing than during other phases of flight and, therefore, the selection of the measure of aviation activity that is used to calculate rates will bias the results. For example, an airline that flies longer routes has fewer takeoffs and landings per hour and is thus favored by use of hours as the measure of activity, while an airline that flies shorter routes is favored by the use of departures as the measure of activity.

Traffic Exposure Refers to days of operation, departures, hours of aircraft flight, hours (gate to gate), and miles.

Turbojet Aircraft An aircraft having a jet engine in which the energy of the jet operates a turbine which in turn operates the air compressor.

Turboprop Aircraft An aircraft having a jet engine in which the energy of the jet operates a turbine which drives the propeller.

Type A hierarchical classification of four values, namely, UEL, major, routine, NMNR (not major, not routine), which may also be referred to as "kind".

Unsafe or illegal Action/Condition During an Event Indicates whether the primary problem is with the aircraft, flight crew, ATC, airport, navigational aids, publications or weather.

Unscheduled Landing Types

Passenger precipitated (illness, premature labor or disruptive behavior)

Diversions due to weather

Known or suspected mechanical difficulties or malfunctions (SDR's)

Vehicle/Pedestrian Deviation (VPD) An entry or movement on an airport movement area by a vehicle operator or pedestrian that has not been authorized by air traffic control (includes aircraft operated by a non-pilot).

APPENDIX B

VALUES OF THE FIELDS OF SERVICE DIFFICULTY REPORTS (SDRS):

TYPE (4 values)
  UEL (Unscheduled Emergency Landing)
  MAJOR
  ROUTINE
  NMNR (Not major, not routine)
NATURE OF CONDITION (23 values)
  VISIBLE FLAME
  SMOKE
  FOREIGN OBJECT
  INFLIGHT SEPARATION
  VIBRATION
  CONTROLS AFFECTED
  MULTIPLE FAILURES
  POWER SOURCE LOSS
  FLIGHT ALTITUDE INDICATOR
  WARNING INDICATION
  FLUID LOSS
  SYSTEM TEST BAD
  OVERTEMP
  FALSE WARNING
  OTHER
  NO WARNING INDICATION
  ENGINE POWER LOSS
  OTHER SYSTEM AFFECTED
  CASE PENETRATION
  INADEQUATE QUALITY
  FLAMEOUT
  STOPPAGE
  SIGNIFICANT FAILURE
PRECAUTIONARY PROCEDURE (14 values)
  UNSCHEDULED LANDING
  EMERGENCY DESCENT
  ABORT TAKEOFF
  RETURN TO BLOCK
  ENGINE SHUTDOWN
  FIRE EXTINGUISHER
  OXYGEN MASK
  DEACTIVATE SYSTEM
  DEPRESSURIZATION
  DUMP FUEL
  INONE
  ABORT APPROACH
  OTHER
  AUTOROTATION
SEVERITY (6 values)
  SELDOM
  UNCOMMON
  OCCASSIONAL
  COMMON
  FREQUENT
  OVER 24 MO
STAGE OF OPERATION (17 values)
  AIR AMBULANCE
  AEROBATIC
  AGRICULTURE
  APPROACH
  CLIMB
  CRUISE
  DESCENT
  EXTERNAL LOAD
  FIRE FIGHTING
  HOVERING
  INSPECTION/MAINTENANCE
  LANDING
  MAPPING/SURVEY
  NOT REPORTED
  TAKEOFF
  TAXI
  UNKNOWN
YEAR BUILT (5 values)
  1900–1901 YEAR BUILT
  1902–1968 YEAR BUILT
  1969–1978 YEAR BUILT
  1979–1988 YEAR BUILT
  1989–1999 YEAR BUILT
DOD-DOR (7 values)
  DOR-DOD
  0 DOR-DOD
  1–3 DOR-DOD
  4–11 DOR-DOD
  12–26 DOR-DOD 27–55 DOR-DOD
56–112 DOR-DOD
113+DOR-DOD
PARETO (18 values)
　0 SDRS
　1 SDRS
　2 SDRS
　3 SDRS
　4 SDRS
　5 SDRS
　6 SDRS
　7 SDRS
　8 SDRS
　9 SDRS
　10 SDRS
　11–14 SDRS
　15–24 SDRS
　25+SDRS
　4+SDRS
　3+SDRS
　2+SDRS
　1+SDRS
MODEL (112 values)
　BOEING 107
　BOEING 234
　BOEING 707
　BOEING 720
　BOEING 727
　BOEING 737
　BOEING 747
　BOEING 757
　BOEING 767
　BOEING 777
　DOUGLAS C118
　DOUGLAS DC3
　DOUGLAS C54 (DC4)
　DOUGLAS DC6
　DOUGLAS DC7
　DOUGLAS DC8
　DOUGLAS DC9
　DOUGLAS MD88 (DC9)
　DOUGLAS DC10
　DOUGLAS MD11 (DC11)
　DOUGLAS MD90
　AIRBUS 300
　AIRBUS 310
　AIRBUS 320
　AIRBUS 330
　AIRBUS 340
　LOCKHEED 1011 TRISTAR
　LOCKHEED 132
　LOCKHEED 188
　LOCKHEED 382
　DEHAVILLAND DHC2
　DEHAVILLAND DHC3
　DEHAVILLAND DHC6
　DEHAVILLAND DHC7
　DEHAVILLAND DHC8
　AEROSPATIALE AS262
　AEROSPATIALE AS355
　AEROSPATIALE AS365
　AEROSPATIALE ATR42
　AEROSPATIALE ATR72
　AEROSPATIALE CONCORDE
　BAE ONE-ELEVEN
　BAG BAE146
　BAE HP137
　BAG JETSTM
　BAE ATP
　BOLKMS BK117
　BOLKMS BO105
　EMBRAER 110
　EMBRAER 120
　FOKKER F27 FRIENDSHIP
　FOKKER F28 FELLOWSHIP
　SAAB SF340
　SHORTS (STBROS) SD3
　SWEARINGEN SA226
　SWEARINGEN SA227
　AMD DASSAULT FALCON
　BEECH 1900
　BEECH C45
　BEECH 58
　BEECH 99
　BEECH 100
　BEECH 200
　CASA C212
　CANADAIR CL600
　CANADAIR CL44
　CURTISS C46
　CONVAIR 240
　CONVAIR 340
　CONVAIR 440
　CONVAIR APJC
　DORNIER 228
　DORNIER 328
　FAIRCHILD FH27
　FAIRCHILD FH227/SA227
　NIHON YS11
　AGUSTA A109
　BNORM BN2A
　BRAERO BAE125
　BRAERO HS748
　CESSNA 172
　CESSNA 207
　CESSNA 208
　CESSNA 402
　CESSNA 404
　CESSNA 550
　HUGHES 369
　HWKSLY DH114
　LEAR 24
　LEAR 25

LEAR 35
MARTIN 404
MTSBSI MU2B
PIPER PA232
PIPER PA313
PIPER PA31
SNIAS AS350
WESTLD WESTLAND
SKRSKY S76 COPTER
BELL 205 COPTER
BELL 206 COPTER
BELL 212 COPTER
BELL 214 COPTER
BELL 222 COPTER
BELL 230 COPTER
BELL 407 COPTER
BELL 412 COPTER
GULFSTREAM G1159
GULFSTREAM G159
AIRBUS 319
EMBRAER 145
DEFAULT
BTS MODEL (118 values)
  DHAV DHC2
  DHAV DHC3
  DHAV DHC4
  DOUG DC2 (EXPECT NONE)
  DOUG DC3 & C47
  DOUG DC4 & C54
  DOUG DC6 DEFAULT
  DOUG DC6A
  DOUG DC6B
  DOUG DC7B
  DOUG DC7C
  LKHEED1049 DEFAULT
  LKHEED1049H
  DHAV DHC81
  DHAV DHC83
  DHAV DHC6
  LKHEED188
  LKHEED382
  DHAV DHC7
  BOEING7375XX
  BOEING7374XX
  BOEING7373XX W/LR (EXPECT NONE)
  BOEING7373XX W/O LR
  BOEING7372XX W/O C & 1XX
  BOEING7372XX W/C
  BOEING7572XX
  BOEING7672XX
  BOEING7673XX
  BOEING777
  DOUG DC91 DEFAULT
  DOUG DC915F
  DOUG DC93
  DOUG DC94
  DOUG DC95
  DOUG DC987
  DOUG DC98 DEFAULT & MD88
  DOUG MD9
  AIRBUSA300B4 & 300F
  AIRBUSA3102
  AIRBUSA3103
  AIRBUSA3202
  AIRBUSA300B2
  AIRBUSA330 (EXPECT NONE)
  BOEING7271XX W/O C
  BOEING7271XXW/C
  BOEING7272XX
  DOUG DC101
  DOUG DC102 (EXPECT NONE)
  DOUG DC103 W/O CF
  DOUG DC104
  DOUG DC103 W/CF (EXPECT NONE)
  DOUG MD11
  BOEING7071XX W/O B
  BOEING7071XX W/B
  BOEING7072XX (EXPECT NONE)
  BOEING7073XX W/O B W/O C
  BOEING7073XX W/B
  BOEING7073XX W/C
  BOEING7074XX
  BOEING7200 W/O B
  BOEING7200 W/B
  BOEING7471XX
  BOEING7472XX & 3XX
  BOEING747 W/C
  BOEING7474XX
  BOEING747 W/F
  BOEING747 W/SP
  DOUG DC81 (EXPECT NONE)
  DOUG DC82
  DOUG DC83
  DOUG DC84
  DOUG DC85
  DOUG DC8F5
  DOUG DC861
  DOUG DC863F
  DOUG DC862
  DOUG DC863 DEFAULT
  DOUG DC871
  DOUG DC872
  DOUG DC873 DEFAULT
  DOUG DC873F
  AIRBUSA340
  BOEING107 & 114
  BOEING234
  BOEING7070XX
  BOEING707 DEFAULT
  BOEING720 DEFAULT
  BOEING7270XX
  BOEING727 DEFAULT
  BOEING7370XX BOEING737 DEFAULT
BOEING7470XX
BOEING747 DEFAULT
BOEING7570XX
BOEING757 DEFAULT
BOEING7670XX
BOEING767 DEFAULT
BOEING DEFAULT
AIRBUSA300 DEFAULT
AIRBUSA310 DEFAULT
AAIRBUSA319
AIRBUSA320 DEFAULT
AIRBUS DEFAULT (EXPECT NONE)
DHAV DHC1
DHAV DHC82
DHAV DHC8 DEFAULT
DHAV DEFAULT
DOUG DC7 DEFAULT
DOUG DC8 DEFAULT
DOUG DC92
DOUG DC9 DEFAULT
DOUG DC10 DEFAULT"
DOUG DEFAULT"
LKHEED10113
LKHEED1011 DEFAULT
LKHEED132
LKHEED DEFAULT
UNDEF MANUFACTURER
OPERATOR CODE (225 values)
  AALA AMERICAN
  UALA UNITED
  DALA DELTA
  USAA USAIR
  NWAA NORTHWEST
  CALA CONTINENTAL
  FDEA FEDERAL EXPRESS
  TWAA TRANS WORLD
  SWAA SOUTHWEST
  AWXA AMERICA WEST
  IPXA UPS
  COMA COMAIR
  ASAA ALASKA
  HZMA HORIZON
  AMTA AMERICAN TRANS
  EIAA EVERGREEN INT
  SRAA SOUTHERN AIR TRANSPORT
  HALA HAWAIIAN
  MWEA MIDWEST EXPRESS
  TSAA ALOHA
  TWRA TOWER
  MRKA MARKAIR
  TAOA USAIR SHUTTLE"
  WRLA WORLD AW
  RIVA CARNIVAL AL
  CLCA CHALLENGE AC
  DHLA DHL AW
  RRXA EMERY WORLDWIDE AL
  IXKA KIWI INT
  ORJA RENO
  VJ6A VALUJET (NOW AIRTRAN)
  MZZA CONTINENTAL MICRONESIA
  EALA EASTERN
  HEEA PETROLEUM HELICOPTER
  ZZDA AIRTRAN (WAS VALUJET)
  GTIA SPIRIT
  W8PA OKLAHOMA MAY 99
  P2EA VANGUARD
  AAA ALLEGHENY
  KT3R OKLAHOMA MAY 99
  AWI HUGHES AIR WEST
  F3LA FRONTIER
  VFSA OKLAHOMA MAY 99
  NCA NORTH CENTRAL
  GUUA GULFSTREAM INT
  K3HA KIWI INT
  SABA OKLAHOMA MAY 99
  TC8A TRANS CONTINENTAL
  H3R OKLAHOMA MAY 99
  PNSA PENINSULA
  EQGA OKLAHOMA MAY 99
  SOU SOUTHERN AW
  WAA WIEN AIR ALASKA
  BDHA OKLAHOMA MAY 99
  FXLA FINE
  APN OKLAHOMA
  BJNA TEM ENTERPRISES
  PAIA PIEDMONT AL
  PAAA PAN AMERICAN WORLD
  FALA FRONTIER AL
  BNFA BRANIFF AW
  TXIA TEXAS INT AL
  OZAA OZARK AL
  WALA WESTERN AL
  NALA NATIONAL AL
  ANEA AIR NEW ENGLAND
  WTAA WESTAIR COMMUTER A
  ABXA ABX A
  MALA MESABA AV
  PCAA PENNSYLVANIA COMMUTE
  RMXA OMNIFLIGHT HELICOPTERS
  SIMA SIMMONS AL
  BRIA BRITT AW
  ZIAA ZANTOP INT
  RAIA TRANS STATES AL
  AWAA AIR WISCONSIN AL
  RAAA REEVE ALEUTIAN AW
  EISA EXPRESS ONE INT
  P5CA POLAR AC
  MIDA MIDWAY AL
  PLGA BUSINESS EXPRESS
  CKSA AMERICAN INT
  PAYA TRANS WORLD EXPRESS
  VTZA ATLANTIC COAST NVEA AMERICAN EAGLE
ARWA ARROW A
SCNA SUN COUNTRY AL
MGMA MGM GRAND A
ASPA ASPEN AW
RYNA RYAN INT
EMAA EMERALD A
REXA EXPRESS AL
RIAA RICH INT
NACA NORTHERN AC
RAXA ROSENBALM AV
KTIA KEY AL
TCAA TRANS CONTINENTAL AL
PREA PRECISION VALLEY AVI
SPAA SIERRA PACIFIC AL
ERAA ERA AV
FWTA FLORIDA WEST AL
A6WA AIR WISCONSIN AL
IXXA AIR TRANSPORT INT
BUFA BUFFALO AW
S2YA ASTRAL
GRAA GREAT AMERICAN AW
GAIA KITTY HAWK AC
MASA MESA AL
COEA EMPIRE AL
TALA TRANS AIR LINK
RAYA OKLAHOMA
PDLA PRESIDENTIAL AW
GATA GULF AIR TRANSPORT
MVAA MISSISSIPPI VALLEY AL
HERA HERMENS A
IMPA IMPERIAL AL
CAPS OKLAHOMA
AFLA MIDWAY AL
FLTA FLIGHT TRAILES
GWAT OKLAHOMA
AORA OKLAHOMA
ALTT OKLAHOMA
ALGA OFFSHORE LOGISTICS
AIAA ATORIE A
PATX OKLAHOMA
CCDA CASCADE AW
HPJA APOLLO AW
ONEA AIR ONE
EIAS OKLAHOMA
REPA REPUBLIC AL
AMWA AIR MIDWEST
NAXA OKLAHOMA
HNAA HENSON AV
SWIA SKYWEST AL
PCTA PORTS OF CALL
FTLA FLYING TIGER LINE
MTRA METROFLIGHT
PSAA PACIFIC SOUTHWEST
C2XA CONTINENTAL EXPRESS
BHAA BAR HARBOR AW
ACLA AIRCAL
TIAA TRANSAMERICA AL
SALA SUBURBAN AL
ASOA ATLANTIC SOUTHEAST AL
PSAX OKLAHOMA
PEXA PEOPLE EXPRESS
PEXA PEOPLE EXPRESS
VNAA JETSTREAM INT
FAVA AVAIR
EMXA METRO EXPRESS
TAGA ORION AIR
CHQA CHAUTAUQUA AL
TIAS TRANSAMERICA
CAIA COMMAND AW
FTLS FLYING TIGER
CPLA CHAPARRAL AL
WWMA WINGS WEST AL
PBAA PROVINCETOWN BOSTON AL
GLBA GREAT LAKES AV
NYAA NEW YORK AL
CROA CROWN AW
SAAS OKLAHOMA
WRNA TRADEWINDS
SUNA SUN AIRE LINES
ACAX OKLAHOMA
MEJA MERLIN EXPRESS
ISAA INTERSTATE AL
ZIAX OKLAHOMA
RMAA ROCKY MOUNTAIN AW
RIOA RIO AW
IASA INTERNATIONAL AIR SERV
FLEA FLORIDA EXPRESS
AIAX OKLAHOMA
BRTA BRITT AL
FECT OKLAHOMA
R7MA ROCKY MOUNTAIN HOLIDAYS
UF6A UFS I
FLAA CAMAIR INT
PQAA PUERTO RICO INT AL
SMBA SEDALIA MARSHALL BOONVIL
ONAS OKLAHOMA
JJBA CHAMPLAIN ENTERPRISE
WRTA WRIGHT AL
RANA RANSOME A
TRBA EXECUTIVE
MAAA MIDSTATE AL
SWAX OKLAHOMA
RDLS OKLAHOMA
ANAA ANA
GPPA OKLAHOMA
RAIX OKLAHOMA
RAHT OKLAHOMA
FECZ OKLAHOMA
SCIA SCENIC AL
PCTX PORTS OF CALL
SMMA SUMMIT AL A4JA OKLAHOMA MAY 99
ACA OKLAHOMA MAY 99
ACZA OKLAHOMA MAY 99
AETA OKLAHOMA MAY 99
ARWR OKLAHOMA MAY 99
ASRA OKLAHOMA MAY 99
B4MR OKLAHOMA MAY 99
CAPA OKLAHOMA MAY 99
CICA PARADISE ISLAND
EF2R OKLAHOMA MAY 99
GEMA OKLAHOMA MAY 99
HCMA HELICOPTER CONSULTANT
IU6R OKLAHOMA MAY 99
JAMA OKLAHOMA MAY 99
MACA OKLAHOMA MAY 99
MIAS OKLAHOMA MAY 99
PCSA OKLAHOMA MAY 99
PIOA OKLAHOMA MAY 99
PSA OKLAHOMA MAY 99
RDLA OKLAHOMA MAY 99
RJEF OKLAHOMA MAY 99
SBWS OKLAHOMA MAY 99
SWJA OKLAHOMA MAY 99
SWXA OKLAHOMA MAY 99
TWUA OKLAHOMA MAY 99
VG5R OKLAHOMA MAY 99
VSTA OKLAHOMA MAY 99
Y2PA USA JET
ZYWA WEST MICHIGAN AIR CARE
DFLT DEFAULT
ATA 2 CHARACTER CODES (50 values)
  SERV PLACARD MARKING
  SERV FUEL OIL COOLANT
  HELICOPTER VIBRATE
  AIR CONDITIONING
  JAUTO PILOT
  COMMUNICATIONS SYSTEM
  ELECTRICAL POWER SYSTEM
  INTERIOR EQUIPMENT
  FIRE PROTECTION
  FLIGHT CONTROL SYSTEM
  FUEL SYSTEM
  HYDRAULIC SYSTEM
  ANTI-ICE SYSTEM
  INSTRUMENTS
  LANDING GEAR
  LIGHTING SYSTEM
  NAVIGATION SYSTEM
  OXYGEN SYSTEM
  PNEUMATIC SYSTEM
  VACUUM SYSTEM
  WATER/WASTE SYSTEM
  CENTRAL MAINT COMPUTER
  AIRBORNE APU SYSTEM
  PRACTICE/STRUC/BALLOON
  DOORS
  FUSELAGE
  NACELLE/PYLON STRUCTURE
  EMPENNAGE STRUCTURE
  WINDOW/WINDSHIELD SYSTEM
  WING STRUCTURE
  PROPELLER SYSTEM
  MAIN ROTOR SYSTEM
  MAIN ROTOR DRIVE
  TAIL ROTOR
  TAIL ROTOR DRIVE SYSTEM
  ROTORCRAFT FLIGHT CONTROL
  POWER PLANT
  ENG TURBINE/TURBOPROP
  ENG FUEL & CONTROL
  IGNITION SYS
  ENG BLEED AIR SYSTEM
  ENG CONTROLS
  ENG INDICATING SYSTEM
  ENG EXHAUST
  ENG OIL SYSTEM
  ENG START
  TURBINE SYSTEM RECIP ONLY
  WATER INJECTION
  ACCESSORY GEAR BOXES
  ENGINE RECIPROCATING
ATA 4 CHARACTER CODES (448 values)
  PLACARDS AND MARKINGS
  FUEL SERVICING
  OIL SERVICING
  HYDRAULIC FLUID SERVICING
  COOLANT SERVICING
  HELICOPTER VIB NOISE ANALYSIS
  HELICOPTER VIBRATION ANALYSIS
  HELICOPTER NOISE ANALYSIS
  AIR CONDITIONING SYSTEM
  COMPRESSOR SYSTEM
  AIR DISTRIBUTION SYSTEM
  AIR DISTRIBUTION FAN
  PRESSURIZATION CONTROL SYSTEM
  PRESSURE CONTROLLER
  PRESSURE INDICATOR
  REGULATOR-OUTFLOW VALVE
  PRESSURE SENSOR
  HEATING SYSTEM
  COOLING SYSTEM (AIR VAPOR CYCLE)
  TEMPERATURE CONTROL SYSTEM
  TEMPERATURE CONTROLLER
  CABIN TEMPERATURE INDICATOR
  CABIN TEMPERATURE SENSOR
  HUMIDITY CON OL SYSTEM
  AUTO FLIGHT SYSTEM
  AUTOPILOT SYSTEM
  AUTOPILOT COMPUTER
  ALTITUDE CONTROLLER
  FLIGHT CONTROLLER
  AUTOPILOT TRIM INDICATOR
  AUTOPILOT MAIN SERVO
  AUTOPILOT TRIM SERVO SPEED-ATTITUDE CORRECTION SYSTEM
AUTO THROTTLE SYSTEM
AERODYNAMIC LOAD ALLEVIATING
COMMUNICATIONS SYSTEM
HF COMMUNICATION SYSTEM
UHF COMMUNICATION SYSTEM
VHF COMMUNICATION SYSTEM
DATA TRANSMISSION AUTO CALL
PA & ENTERTAINMENT SYSTEM
INTERPHONE
AUDIO INTEGRATING
STATIC DISCHARGE SYSTEM
AUDIO & VIDEO MONITORING
ELECTRICAL POWER SYSTEM
ALTERNATOR-GENERATOR DRIVE SYSTEM
AC GENERATION SYSTEM
AC GENERATOR-ALTERNATOR
AC INVERTER
PHASE ADAPTER
AC REGULATOR
AC INDICATING SYSTEM
DC GENERATION SYSTEM
BATTERY OVERHEAT WARNING SYSTEM
BATTERY CHARGER
DC RECTIFIER-CONVERTER
DC GENERATOR-ALTERNATOR
STARTER-GENERATOR
DC REGULATOR
DC INDICATING SYSTEM
EXTERNAL POWER SYSTEM
AC POWER DISTRIBUTION SYSTEM
DC POWER DISTRIBUTION SYSTEM
EQUIPMENT FURNISHINGS
FLIGHT COMPARTMENT EQUIPMENT
PASSENGER COMPARTMENT EQUIP
BUFFET GALLEYS
LAVATORIES
CARGO COMPARTMENTS
AGRICULTURAL EXTERNAL LOAD SYSTEM
EMERGENCY EQUIPMENT
LIFE JACKET
EMERGENCY LOCATOR BEACON
PARACHUTE
LIFE RAFT
ESCAPE SLIDE
ACCESSORY COMPARTMENTS
BATTERY BOX STRUCTURE
ELECTRONIC SHELF SECTION
FIRE PROTECTION SYSTEM
DETECTION SYSTEM
SMOKE,DETECTION
FIRE,DETECTION
OVERHEAT,DETECTION
EXTINGUISHING SYSTEM
FIRE BOTTLE,FIXED
FIRE BOTTLE,PORTABLE
FLIGHT CONTROL SYSTEM
CONTROL COLUMN SECTION
AILERON CONTROL SYSTEM
AILERON TAB CONTROL SYSTEM
RUDDER CONTROL SYSTEM
RUDDER TAB CONTROL SYSTEM
RUDDER ACTUATOR
ELEVATOR CONTROL SYSTEM
ELEVATOR TAB CONTROL SYSTEM
STABILIZER CONTROL SYSTEM
STABILIZER POSITION IND SYSTEM
STABILIZER ACTUATOR
TE FLAP CONTROL SYSTEM
TE FLAP POSITION IND SYSTEM
TE FLAP ACTUATOR
DRAG CONTROL SYSTEM
DRAG CONTROL ACTUATOR
GUST LOCK-DAMPER SYSTEM
LE FLAP CONTROL SYSTEM
LE FLAP POSITION IND SYSTEM
LE FLAPACTUATOR
FUEL SYSTEM
FUEL STORAGE
FUEL DISTRIBUTION
FUEL FILTER-STRAINER
FUEL PUMPS
FUEL SELECTOR SHUTOFF VALVE
FUEL TRANSFER VALVE
FUEL DUMP
FUEL INDICATION SYSTEM
FUEL QUANTITY INDICATOR
FUEL QUANTITY SENSOR
FUEL TEMPERATURE
FUELPRESSURE
HYDRAULIC POWER SYSTEM
HYDRAULIC, MAIN SYSTEM
ACCUMULATOR, MAIN
FILTER, MAIN
PUMP, MAIN
HANDPUMP, MAIN
PRESSURE RELIEF, MAIN
RESERVOIR, MAIN
PRESSURE REGULATOR,MAIN
HYDRAULIC, AUXILIARY SYSTEM
ACCUMULATOR, AUXILIARY
FILTER, AUXILIARY
PUMP, AUXILIARY
HANDPUMP, AUXILIARY
PRESSURE RELIEF, AUXILIARY
RESERVOIR, AUXILIARY
PRESSURE REGULATOR, AUXILIARY
HYDRAULIC, INDICATING SYSTEM
PRESSURE INDICATOR
PRESSURE SENSOR
QUANTITY INDICATOR
QUANTITY SENSOR ICE RAIN PROTECTION SYSTEM
AIRFOIL ANTI-ICE, DEICE
INTAKE ANTI-ICE,DEICE
PITOT STATIC ANTI-ICE
WINDOWS WINDSHIELDS & DOORS
ANTENNA RADOME ANTI-ICE
PROP ROTOR ANTI-ICE, DEICE
WATER LINE ANTI-ICE
ICE DETECTION
INDICATING RECORDING SYSTEM
INSTRUMENT PANEL
INDEP INSTRUMENT (CLOCK,ETC)
DATA RECORDERS (FLIGHT MAINT)
CENTRAL COMPUTERS (EG EICAS)
CENTRAL WARNING
CENTRAL DISPLAY
AUTOMATIC DATA
LANDING GEAR SYS
LANDING GEAR WHEEL FAIRING
MAIN LANDING GEAR
MAIN LANDING GEAR ATTACH SEC
EMERGENCY FLOATATION SECTION
MAIN GEAR STRUT AXLE TRUCK
NOSE TAIL LANDING GEAR
NOSE TAIL GEAR ATTACH SECTION
NOSE TAIL GEAR STRUT AXLE
GEAR EXTENSION AND RETRACT SYSTEM
LANDING GEAR DOOR RETRACT SEC
LANDING GEAR DOOR ACTUATOR
LANDING GEAR ACTUATOR
LANDING GEAR SELECTOR
LANDING GEAR BRAKES SYSTEM
ANTI-SKID SECTION
BRAKE
MASTER CYLINDER BRAKE VALVE
TIRE CASING
TUBE
WHEEL SKI FLOAT
LANDING GEAR STEERING SYSTEM
STEERING UNIT
SHIMMY DAMPER
LG POSITION AND WARNING
AUX GEAR (TAIL ROTORCRFT SKID)
LIGHTING SYSTEM
FLIGHT COMPARTMENT LIGHTING
PASSENGER COMPARTMENT LIGHTING
CARGO COMPARTMENT LIGHTING
EXTERIOR LIGHTING
EMERGENCY LIGHTING
NAVIGATION SYSTEM
FLIGHT ENVIRONMENT DATA
PITOT STATIC SYSTEM
AIR TEMPERATURE THRUST LIMIT
RATE OF CLIMB
AIRSPEED MACH INDICATING
HIGH SPEED WARNING
ALTIMETER, BAROMETRIC ENCODER
AIR DATA COMPUTER
STALL WARNING SYSTEM
ATTITUDE & DIRECTION
ATTITUDE GYRO & INDICATION
DIRECTIONAL GYRO & INDICATION
MAGNETIC COMPASS
TURN AND BANK RATE OF TURN
INTEGRATED FLIGHT DIRECTOR SYSTEM
LANDING AND TAXI AIDS
LOCALIZER VOR SYSTEM
GLIDE SLOPE SYSTEM
MICROWAVE LANDING SYSTEM
MARKER BEACON SYSTEM
HEADS UP DISPLAY SYSTEM
WIND SHEAR DETECTION SYSTEM
INDE POSITION DETERMINING SYSTEM
INERTIAL GUIDANCE SYSTEM
WEATHER RADAR SYSTEM
DOPPLER SYSTEM
GROUND PROXIMITY SYSTEM
AIR COLLISION AVOIDANCE (TCAS)
NON RADAR WEATHER SYSTEM
DEPENDENT POSITION DETERMINING
DME/TACAN SYSTEM
ATC TRANSPONDER SYSTEM
LORAN SYSTEM
VOR SYSTEM
ADF SYSTEM
OMEGA NAVIGATION SYSTEM
GLOBAL POSITIONING SYSTEM
FLT MANAGEMENT COMPUTING SYSTEM
OXYGEN SYSTEM
CREW OXYGEN SYSTEM
PASSENGER OXYGEN SYSTEM
PORTABLE OXYGEN SYSTEM
PNEUMATIC SYSTEM
PNEUMATIC DISTRIBUTION SYSTEM
PNEUMATIC INDICATING SYSTEM
VACUUM
VACUUM DISTRIBUTION SYSTEM
VACUUM INDICATING SYSTEM
WATER AND WASTE SYSTEM
POTABLE WATER SYSTEM
WASH WATER SYSTEM
WASTE DISPOSAL SYSTEM
AIR SUPPLY (WATER PRESS SYSTEM)
CENTRAL MAINTENANCE COMPUTER
AIRBORNE APU SYSTEM
APU ASSEMBLY AND COWL
APU CORE ENGINE
APU ENGINE FUEL AND CONTROL
APU START IGNITION SYSTEM
APU BLEED AIR SYSTEM
APU CONTROLS
APU INDICATING SYSTEM APU EXHAUST SYSTEM
APU OIL SYSTEM
STANDARD PRACTICES STRUCTURES
AIRCRAFT STRUCTURES
BALLOON/DIRIGIBLE REPORTS
DOORS/
PASSENGER/CREW DOORS
EMERGENCY EXIT
CARGO/BAGGAGE DOORS
SERVICE DOORS
GALLEY DOORS
ELECT/ELECTRONIC COM DOORS
HYDRAULIC COMPARTMENT DOORS
ACCESSORY COMPARTMENT DOORS
AIR CONDITIONING COMP DOORS
FLUID SERVICE DOORS
AUXILIARY POWER UNIT DOOR
TAIL CONE DOOR
FIXED INNER DOORS
ENTRANCE STAIRS
DOOR WARNING
LANDING GEAR DOORS
FUSELAGE
AERIAL TOW EQUIPMENT SECTION
ROTORCRAFT TAIL BOOM
FUSELAGE MAIN STRUCTURE
FRAMES (MAIN FUSELAGE)
BULK HEADS (MAIN FUSELAGE)
LONGERONS STRINGERS (MAIN FUS)
KEELS (MAIN FUSELAGE)
FLOOR BEAMS (MAIN FUSELAGE)
FUSELAGE AUXILIARY STRUCTURE
FLOOR PANELS (AUX FUSELAGE)
INTERNAL MOUNT STRUC (AUX FUS)
INTERNAL STAIRS (AUX FUS)
FIXED PARTITIONS (AUX FUS)
PLATES SKINS (AUX FUSELAGE)
FUSELAGE ATTACH FITTINGS SYS
WING ATTACH FITTINGS (ON FUS)
STAB ATTACH FITTINGS (ON FUS)
GEAR ATTACH FITTINGS (ON FUS)
DOOR HINGE (ON FUSELAGE)
EQUIP ATTACH FITTINGS (ON FUS)
ENGINE ATTACH FITTING (ON FUS)
SEAT/CARGO ATTACH FITTING
AERODYNAMIC FAIRINGS STRUCTURE
NACELLES/PYLONS STRUCTURE
MAIN FRAME (ON NACELLES PYLON)
FRAMES (ON NACELLES/PYLON)
BULKHEAD FIREWALLS (NAC PYLON)
LONGERON STRINGERS (NAC PYLON)
PLATES/SKINS (NACELLE/PYLON)
ATTACH FITTINGS (NAC PYLON)
EMPENNAGE STRUCTURE
HORIZONTAL STABILIZER
SPARS/RIBS (HORIZONTAL STAB)
PLATES/SKINS (HORIZONTAL STAB)
TAB STRUC (HORIZONTAL STAB)
ELEVATORS
SPARS/RIBS (ON ELEVATOR)
PLATES/SKINS (ON ELEVATOR)
TAB STRUCTURE (ON ELEVATOR)
VERTICAL STABILIZER
SPARS/RIBS (ON VERT STAB)
PLATES/SKINS (ON VERT STAB)
VENTRAL STRUC (ON VERT STAB)
RUDDER
SPARS/RIBS (ON RUDDER)
PLATES/SKINS (ON RUDDER)
TAB STRUCTURE (ON RUDDER)
ATTACH FITTINGS (FLT CONTROLS)
HORIZONTAL STAB ATTACH FITTING
ELEVATOR/TAB ATTACH FITTING
VERTICAL STAB ATTACH FITTING
RUDDER/TAB ATTACH FITTING
WINDOWS-WINDSHIELD SYSTEM
FLIGHT COMPARTMENT WINDOWS
PASSENGER COMPARTMENT WINDOWS
DOOR WINDOWS
INSPECTION WINDOWS
WING STRUCTURE
MAIN FRAME (ON WING)
SPAR (ON WING)
RIBS/BULKHEAD S (ON WING)
LONGERONS/STRINGERS (ON WING)
CENTER WING BOX (ON WING)
AUXILIARY STRUCTURE (ON WING)
PLATES/SKINS (ON WING)
ATTACH FITTINGS (ON WING)
FUS (ATTACH FITTING ON WING)
NAC/PYLON (FITTING ON WING)
LANDING GEAR (FITTING ON WING)
CONT SURFACE (FITTING ON WING)
FLIGHT SURFACE S (WING)
AILERONS
AILERON TABS
TRAILING EDGE FLAPS
LEADING EDGE DEVICES
SPOILERS
PROPELLER SYSTEM
PROPELLER ASSEMBLY
PROPELLER BLADE SECTION
PROP DEICE BOOT SECTION
PROP/SPINNER SECTION
PROPELLER HUB SECTION
PROPELLER CONTROLLING SYSTEM
PROP SYNCHRONIZER SECTION
PROPELLER GOVERNOR
PROPELLER FEATHER/REVERSING
PROPELLER BRAKING
PROPELLER INDICATING SYSTEM
MAIN ROTOR SYSTEM MAIN ROTOR BLADE SYSTEM
MAIN ROTOR HEAD SYSTEM
MAIN ROTOR MAST/SWASHPLATE
MAIN ROTOR INDICATING SYSTEM
MAIN ROTOR DRIVE
ENGINE/TRANSMISSION COUPLING
MAIN ROTOR GEARBOX
MAIN ROTOR BRAKE
ROTORCRAFT COOLING FAN SYSTEM
MAIN ROTOR TRANS MOUNT
ROTOR/DRIVE INDICATING SYSTEM
TAIL ROTOR
TAIL ROTOR BLADE
TAILROTOR
TAIL ROTOR INDICATING SYSTEM
TAIL ROTOR DRIVE SYSTEM
TAIL ROTOR DRIVE SHAFT
TAIL ROTOR GEARBOX
TAIL ROTOR DRIVE IND SYSTEM
ROTORCRAFT FLIGHT CON OL
MAIN ROTOR CONTROL
TILT ROTOR FLIGHT CONTROL
TAIL ROTOR CONTROL SYSTEM
ROTORCRAFT SERVO SYSTEM
POWER PLANT
ENGINE COWLING SYSTEM
COWL FLAP SYS (RECIP. ONLY)
ENG AIR BAFFLE SEC (RECIP.)
MOUNTS
FIRESEALS
AIR INTAKE
ENGINE DRAINS
ENGINE (TURBINE TURBOPROP)
REDUCTION GEAR AND SHAFT
AIR INLET SECTION (CORE ENG)
COMPRESSOR SECTION
COMBUSTION SECTION
TURBINE SECTION
ACCESSORY DRIVES
OIL SYSTEM
BYPASS SECTION
ENGINE FUEL AND CONTROL
FUEL DISTRIBUTION
FUEL OIL COOLER
FUEL HEATER
FUEL INJECTOR NOZZLE
FUEL PUMP
FUEL CONTROLLING SYSTEM
FUEL CONTROL ELECTRONIC
FUEL CONTROL CARBURETOR
TURBINE GOVERNOR
FUEL DIVIDER
FUEL INDICATING SYSTEM
FUEL FLOW INDICATING
FUEL PRESSURE INDICATING
FUEL FLOW SENSOR
FUEL PRESS SENSOR
IGNITION SYSTEM
IGNITION POWER SUPPLY
LOW TENSION COIL
EXCITER
INDUCTION VIBRATOR
MAGNETO DISTRIBUTOR
DIST (IGNITION HARNESS)
SPARK PLUGS IGNITERS
SWITCHING
ENGINE BLEED AIR SYSTEM
ENGINE ANTI-ICING SYSTEM
ENGINE COOLING SYSTEM
COMPRESSOR BLEED CONTROL
COMPRESSOR BLEED GOVERNOR
COMPRESSOR BLEED VALVE
INDICATING SYSTEM
ENGINE CONTROLS
ENGINE SYNCHRONIZING
MIXTURE CONTROL
POWER LEVER
EMERGENCY SHUTDOWN SYSTEM
ENGINE INDICATING SYSTEM
POWER INDICATING SYSTEM
ENGINE PRESSURE RATIO (EPR)
BME TORQUE
MANIFOLD PRESSURE (MP)
RPM
TEMPERATURE INDICATING SYSTEM
CYLINDER TEMP (CHT)
EGT TIT
ANALYZERS
IGNITION ANALYZER
VIBRATION ANALYZER
INTEGRATED ENGINE INST SYSTEM
ENGINE EXHAUST
COLLECTOR NOZZLE
NOISE SUPPRESSOR
THRUST REVERSER
ENG OIL SYSTEM (AIRFRAME FURNISH)
OIL STORAGE (AIRFRAME FURNISH)
ENG OIL DIST (AIRFRAME FURN)
COOLER
TEMPERATURE REGULATOR
OFF VALVE
ENGINE OIL INDICATING SYSTEM
PRESSURE
QUANTITY
TEMPERATURE
ENGINE STARTING
CRANKING
STARTER
VALVES CONTROLS
TURBINE SYSTEM (RECIP. ONLY)
POWER RECOVERY TURBINE
TURBO SUPERCHARGER WATER INJECTION
ACCESSORY GEAR-BOXES
ENGINE (RECIPROCATING)
ENGINE FRONT SECTION
ENGINE POWER SECTION
ENGINE CYLINDER SECTION
ENGINE REAR SECTION
ENGINE OIL SYSTEM

What is claimed is:

1. An information system for analysing data comprised of events pertaining to an object class wherein the object class is aircraft and an individual object is an individual aircraft having one or more identifiers unique to that individual aircraft, the system comprising:
   (a) a data access component configured for accessing a database comprising multiple, integrated sets of data records derived from different sources whereby each data record pertains to an event for an individual object and comprises data fields, the data fields comprising multiple identifiers identifying said individual object;
   (b) a user interface component for receiving user-selected criteria for field values of the data fields;
   (c) a pre-processor component configured for identifying multiple sub-databases from the data records of the database whereby each sub-database comprises data records identified by a different identifier, or a different set of identifiers, than those of the other sub-databases;
   (d) a selection component configured for selecting from one or more of the sub-databases the data records which correspond to the user-selected criteria; and,
   (e) an analysis component configured for:
      analysing the selected data records including identifying the selected data records according to a chronological sequence of events for individual objects covered by those selected data records, whereby each individual object covered by the selected data records is associated with a longitudinal set of data records; and
      deriving output data for the events from the longitudinal sets of data records.

2. An information system according to claim 1 wherein the information provided by one said set of data records is used to supplement other data records of said database.

3. An information system according to claim 2 wherein the information provided by another one of said sets of data records is used to correct erroneous data field values in data records obtained from any said source.

4. An information system according to claim 3 wherein data records are service difficulty reports each said report pertaining to one said individual aircraft.

5. An information system according to claim 4 wherein said analysis component is configured for standardizing said data reports and individual objects as between the different originating sources thereof.

6. An information system according to claim 5 wherein said standardizing is performed on the basis of the traffic patterns for each aircraft and the types of aircraft models of each said originating source.

7. An information system according to claim 2 and further comprising a graphizer output component configured for graphically displaying said output data by multi-result inter-related graphs.

8. An information system according to claim 2 wherein said analysis component is configured for identifying chronological trends for one or more said individual objects and/or data records.

9. An information system according to claim 1 wherein said analysis component is configured for surveiling said events on a chronological basis for one or more said individual objects.

10. An information system according to claim 1 wherein said analysis component is configured for comparing, on a chronological basis and measured from a user-selected event, the events pertaining to one said individual object and the events pertaining to a user-selected comparison group of said objects.

11. An information system according to claim 1 wherein said analysis component is configured for normalizing the field values for a set of data fields and outputting the resulting normalized data.

12. An information system according to claim 1 wherein said analysis component is configured for identifying related data records of said data records.

13. An information system according to claim 1 wherein said analysis component is configured for identifying a statistically high number of events for an individual object within a designated time period.

14. An information system according to claim 1 wherein said analysis component is configured for rating said originating sources of said data records on the basis of the diligence of said originating sources in reporting events.

15. A method for analyzing data comprised of events pertaining to an object class, said method comprising the steps:
   (a) accessing a database comprising at least one set of data records whereby each data record pertains to an individual said object and comprises a plurality of data fields, at least one of said data fields comprising an identifier identifying one said individual object;
   (b) receiving user-selected criteria for field values of said data fields;
   (c) selecting those of said data records which correspond to said user-selected criteria; and,
   (d) analyzing said data records including identifying said selected data records according to a chronological sequence of events for individual objects covered by said selected data records, whereby each said individual object covered by said selected data records is associated with a longitudinal set of data records, and deriving output data for said events from said longitudinal sets of data records.

* * * * *

UNITED STATES PATENT AND TRADEMARK OFFICE
CERTIFICATE OF CORRECTION

| | |
|---|---|
| PATENT NO. | : 6,631,384 B1 |
| APPLICATION NO. | : 09/654911 |
| DATED | : October 7, 2003 |
| INVENTOR(S) | : Alex Richman, Elliott M. Richman and Mark Hudak |

It is certified that error appears in the above-identified patent and that said Letters Patent is hereby corrected as shown below:

IN THE CLAIMS

Claim 2, col. 43, lines 43 and 44, delete "wherein the" and insert -- configured for using --
Claim 2, col. 43, lines 44 and 45, "is used" should be deleted;

Claim 3, col. 43, lines 46 and 47, delete "wherein the" and insert -- configured for using --;
Claim 3, col. 43, line 48, "is used" should be deleted;
Claim 3, col. 43, line 49, -- of -- should be inserted between "any" and "said" and "source" should be replaced with -- sources --;

Claim 4, col. 43 line 50, "3" should be replaced with --1 -- and -- said -- should be inserted between "wherein" and "data";
Claim 4, col. 43, line 51, delete "are" and insert -- comprise --;

Claim 7, col. 44, line 3, "2" should be replaced with -- 1 --;

Claim 8, col. 44, line 7, "2" should be replaced with --1 --;

Claim 15, col. 44, line 37, -- whereby the object class is aircraft and an individual object is an individual aircraft having one or more identifiers unique to that individual aircraft -- should be inserted between "object class" and "said method";

Claim 15, col. 44, line 39 and 40, " at least one set of data records" should be deleted;

Claim 15, col. 44 line 39 -- multiple, integrated sets of data records derived from different sources -- should be inserted between "comprising" and "whereby each";

Claim 15, col. 44, line 40, -- event for an -- should be inserted between "to an" and "individual";

Claim 15, col. 44, line 41, "a plurality of" should be deleted;

Claim 15, col. 44, lines 42 and 43 "at least one of said data fields comprising an identifier indentitying one said individual object" should be deleted;

Claim 15, col. 44, line 42 --the data fields comprising multiple identifiers indentifying said individual object -- should be inserted after "data fields"

UNITED STATES PATENT AND TRADEMARK OFFICE
CERTIFICATE OF CORRECTION

| | | |
|---|---|---|
| PATENT NO. | : 6,631,384 B1 | |
| APPLICATION NO. | : 09/654911 | |
| DATED | : October 7, 2003 | |
| INVENTOR(S) | : Alex Richman, Elliot M. Richman and Mark Hudak | |

It is certified that error appears in the above-identified patent and that said Letters Patent is hereby corrected as shown below:

IN THE CLAIMS (cont'd)

Claim 15, col. 44, line 46, -- identifying multiple sub-databases from the data records of the database whereby each sub-database comprises data records identified by a different identifier, or a different set of identifiers, than those of the other sub-databases; -- should replace (c) as issued Claim 15, col. 44, line 46, replace "(c)" with -- (d) -- ;

Claim 15, col. 44, line 46, delete "those of" ;

Claim 15, col. 44, line 48, replace "(d)" with -- (e) --;

Claim 15, col. 44, line 48, delete the first instance of "said" and replace it with -- the selected -- ;

Claim 15, col. 44, line 48, delete the second instance of "said" and replace it with -- the --;

Claim 15, col. 44, line 51, delete the first instance of "said" and replace it with -- those --

Claim 15, col. 44, line 51, delete the second instance of "said";

Claim 15, col. 44, line 52, delete "said" and replace it with -- the --;

Claim 15, col. 44, lines 53 - 55, delete ", and deriving output data for said events form said longitudinal sets of data records." and insert -- ; and --

UNITED STATES PATENT AND TRADEMARK OFFICE
CERTIFICATE OF CORRECTION

PATENT NO. : 6,631,384 B1
APPLICATION NO. : 09/654911
DATED : October 7, 2003
INVENTOR(S) : Alex Richman, Elliot M. Richman and Mark Hudak It is certified that error appears in the above-identified patent and that said Letters Patent is hereby corrected as shown below:

IN THE CLAIMS (cont'd)

Claim 15, col. 44, line 56, insert -- (f) deriving output data for said events from the longitudinal sets of data records. --

Signed and Sealed this

Twenty-second Day of May, 2007

JON W. DUDAS
*Director of the United States Patent and Trademark Office*